(12) United States Patent
Yagi et al.

(10) Patent No.: US 8,729,805 B2
(45) Date of Patent: May 20, 2014

(54) PLASMA GENERATOR AND DISCHARGE DEVICE AND REACTOR USING PLASMA GENERATOR

(75) Inventors: Takashige Yagi, Kagoshima (JP); Hiroshi Makino, Kagoshima (JP); Shingo Sato, Kagoshima (JP)

(73) Assignee: Kyocera Corporation, Kyoto (JP)

( * ) Notice: Subject to any disclaimer, the term of this patent is extended or adjusted under 35 U.S.C. 154(b) by 917 days.

(21) Appl. No.: 12/812,589

(22) PCT Filed: Jan. 19, 2009

(86) PCT No.: PCT/JP2009/050697
§ 371 (c)(1),
(2), (4) Date: Sep. 2, 2010

(87) PCT Pub. No.: WO2009/091065
PCT Pub. Date: Jul. 23, 2009

(65) Prior Publication Data
US 2010/0320916 A1 Dec. 23, 2010

(30) Foreign Application Priority Data

| Jan. 18, 2008 | (JP) | 2008-009791 |
| Jan. 18, 2008 | (JP) | 2008-009792 |
| Jan. 18, 2008 | (JP) | 2008-009793 |
| Jan. 18, 2008 | (JP) | 2008-009794 |
| Jan. 18, 2008 | (JP) | 2008-009795 |

(51) Int. Cl.
*H01J 7/24* (2006.01)
(52) U.S. Cl.
USPC ............ 315/111.21; 315/111.11; 315/111.01; 315/111.41; 315/111.81; 315/176; 313/213; 313/213.31

(58) Field of Classification Search
USPC ................ 315/111.11–111.41, 176; 313/231
See application file for complete search history.

(56) References Cited

U.S. PATENT DOCUMENTS 3,814,983 A * 6/1974 Weissfloch et al. ............. 315/39
7,632,379 B2 * 12/2009 Goto et al. ................ 156/345.44

(Continued)

FOREIGN PATENT DOCUMENTS

| JP | 2001-247485 | 9/2001 |
| JP | 2004-353066 | 12/2004 |

(Continued)

OTHER PUBLICATIONS

Japanese language office action dated Sep. 17, 2013 and its English language Statement of Relevance of Non-English References Pursuant to 37 CFR 1.98(a)(3)(i) issued in corresponding Japanese application 2009550081.

*Primary Examiner* — Douglas W Owens
*Assistant Examiner* — Srinivas Sathiraju
(74) *Attorney, Agent, or Firm* — DLA Piper LLP (US)

(57) ABSTRACT

A plasma generator has a first member 2 containing a dielectric material, and an electrode group composed of a plurality of electrodes and including a first assembly 6 partially including a plurality of electrodes and a second assembly 7 partially including a plurality of electrodes. In accordance with an AC voltage, the first assembly 6 generates a plasma in a first space 23 contacting the first member 2. In accordance with a DC voltage, the second assembly 7 generates an electric field in a second space 24 contacting the first member 2 and communicating with the first space 23. At least one or more electrodes of a portion of the first assembly 6 and at least one or more electrodes of a portion of the second assembly 7 are provided on the surface of or in the inside of the first member 2.

18 Claims, 41 Drawing Sheets

(56) References Cited

U.S. PATENT DOCUMENTS

| | | |
|---|---|---|
| 2003/0052096 A1 | 3/2003 | Crowe et al. |
| 2004/0131513 A1* | 7/2004 | Lazarovich et al. ...... 422/186.04 |
| 2006/0042545 A1* | 3/2006 | Shibata et al. ................ 118/722 |
| 2006/0201916 A1* | 9/2006 | Kurunczi ................. 219/121.43 |
| 2007/0017636 A1 | 1/2007 | Hori et al. ................ 156/345.47 |
| 2007/0086932 A1* | 4/2007 | Hallam .................... 422/186.07 |
| 2008/0179286 A1* | 7/2008 | Murokh .......................... 216/67 |
| 2012/0187840 A1* | 7/2012 | Hensley ................... 315/111.21 |

FOREIGN PATENT DOCUMENTS

| | | |
|---|---|---|
| JP | 2005026063 A | 1/2005 |
| JP | 2005-184019 | 7/2005 |
| JP | 2006-302625 | 11/2006 |

* cited by examiner

US 8,729,805 B2

PLASMA GENERATOR AND DISCHARGE DEVICE AND REACTOR USING PLASMA GENERATOR

CROSS REFERENCE TO RELATED APPLICATIONS

This application is a national stage of international application no. PCT/JP2009/050697 filed on Jan. 19, 2009, and claims priority under 35 USC 119 to Japanese application no. 2008-009791 filed on Jan. 18, 2008, Japanese application no. 2008-009792 filed on Jan. 18, 2008, Japanese application no. 2008-009793 filed on Jan. 18, 2008, Japanese application no. 2008-009794 filed on Jan. 18, 2008 and Japanese application no. 2008-009795 filed on Jan. 18, 2008, which are incorporated herein by reference.

TECHNICAL FIELD

The present invention relates to a plasma generator and a discharge device and a reactor using the plasma generator.

BACKGROUND ART

Plasma discharge is the technique utilized in wide fields such as ozone generators, electric dust collection devices, air cleaners, and harmful gas decomposition devices. As the plasma generator for using this plasma discharge, a packed-bed type plasma generator in which spherical dielectric members having 1 to 3 mm diameters are packed between two electrodes arranged in a coaxial cylindrical state and a high voltage is applied between the two electrodes to thereby generate plasma in the vicinity of contact points of the spherical dielectric members is widely known. Further, when a fluid is supplied to the packed-bed type plasma generator, the plasma and substances in the fluid react and the substances break down etc. resulting in a change of the ingredients or composition of the fluid. Due to this, the properties of the fluid can be changed (hereinafter, also referred to as "reformed").

Patent Document 1: Japanese Patent Publication (A) No. 2001-247485

However, when reforming a fluid by a packed-bed type plasma generator, it was necessary to supply the fluid in a space packed with spherical dielectric members, so there was the problem of a large pressure loss of the treated fluid. Further, if there was a particulate state impurity in the treated fluid, this particulate state impurity was removed by surface adsorption of this at the spherical dielectric members, so there was the problem of a low removal efficiency of the particulate-state impurity.

Accordingly, a plasma generator able to reduce the pressure loss of the treated fluid and able to remove the particulate state impurity in the treated fluid with a high efficiency and a discharge device and a reactor using that plasma generator have been demanded.

DISCLOSURE OF THE INVENTION

According to an aspect of a plasma generator of the present invention, the generator is provided with a first member containing a dielectric material and an electrode group including a plurality of electrodes. The electrode group comprises a first assembly including a portion of the plurality of electrodes and a second assembly including a portion of the plurality of electrodes. The first assembly generates plasma in a first space contacting the first member in accordance with an AC voltage. The second assembly creates an electric field in a second space contacting the first member and communicating with the first space in accordance with a DC voltage. At least one electrode of the first assembly and at least one electrode of the second assembly are provided on a surface or in an internal portion of the first member.

According to an aspect of a discharge device of the present invention, the device has the above plasma generator, an AC power supply connected to the first assembly, and a DC power supply connected to the assembly.

According to an aspect of a reactor of the present invention, the device has the above discharge device and a fluid supply source supplying fluid into the first space and the second space from the first space side.

According to the above aspect of the plasma generator of the present invention, a plasma generator able to reduce the pressure loss of the treated fluid and able to remove particulate state impurity in the treated fluid with a high efficiency can be realized.

According to the above aspect of the discharge device of the present invention, a discharge device able to reduce the pressure loss of the treated fluid and able to remove the particulate state impurity in the treated fluid with a high efficiency can be realized.

According to the above aspect of the reactor of the present invention, a reactor able to reduce the pressure loss of the treated fluid and able to remove the particulate state impurity in the treated fluid with a high efficiency can be realized.

BRIEF DESCRIPTION OF THE DRAWINGS

FIG. 1 is a perspective view showing an example of the configuration of a dielectric structure according to a first embodiment of the present invention.

FIG. 2 is a cross-sectional view taken along an II-II line in FIG. 1.

FIG. 3 is a cut surface obtaining by cutting the dielectric structure shown in FIG. 1 along a first electrode.

FIG. 4 is a cut surface obtained by cutting the dielectric structure shown in FIG. 1 along a second electrode.

FIG. 5 is a cut surface obtained by cutting the dielectric structure shown in FIG. 1 along a third electrode.

FIG. 6 is a perspective view showing an example of the configuration of a dielectric structure according to a second embodiment of the present invention.

[FIG. 7]

FIG. 8 is a cross-sectional view taken along a VIII-VIII line of FIG. 7A.

FIG. 9 is a cross-sectional view taken along a IX-IX line of FIG. 7A.

FIG. 10 is a cross-sectional view taken along a X-X line of FIG. 7B.

FIG. 11 is a cross-sectional view taken along a XI-XI line of FIG. 7B.

FIG. 12 is a cross-sectional view corresponding to the XII-XII line in FIG. 7A for a modification of the dielectric structure according to the second embodiment.

FIG. 13 is a cross-sectional view corresponding to the XI-XI line in FIG. 7B for a modification of the dielectric structure according to the second embodiment.

FIG. 14 is a plan view showing an example of the configuration of a dielectric structure according to a third embodiment of the present invention.

[FIG. 15]

FIG. 15B is a cross-sectional view corresponding to a VIII-VIII line of FIG. 7A in the third embodiment

[FIG. 16]

FIG. 17 is a schematic view for explaining an operation of the dielectric structure according to the third embodiment.

[FIG. 18]

FIG. 19 is a diagram for explaining the configuration of another modification of the dielectric structure according to the third embodiment.

FIG. 20 is a schematic view for explaining the operation of the dielectric structure of FIG. 19.

FIG. 21 is a perspective view showing an example of the configuration of a dielectric structure according to a fourth embodiment of the present invention.

[FIG. 22]

[FIG. 23]

[FIG. 24]

FIG. 25 is a schematic view for explaining the operation of the dielectric structure according to the fourth embodiment.

FIG. 26 is a diagram showing a modification of the dielectric structure according to the fourth embodiment.

[FIG. 27]

FIG. 28 is a diagram showing still another modification of the dielectric structure according to the fourth embodiment.

FIG. 29 is a diagram showing a dielectric structure having a plurality of through holes according to the fourth embodiment.

FIG. 30 is a schematic view for explaining the operation of the dielectric structure of FIG. 29.

FIG. 31 is a perspective view showing an example of the configuration of a dielectric structure according to a fifth embodiment of the present invention.

FIG. 32 is a top view of the dielectric structure of FIG. 31.

[FIG. 33]

FIG. 34 is a schematic view for explaining the operation of the dielectric structure of FIG. 31.

FIG. 35 is a diagram showing a dielectric structure having a plurality of through holes according to the fifth embodiment.

FIG. 36 is a cross-sectional view corresponding to a region F of FIG. 16A of the dielectric structure having dielectric particles.

FIG. 37 is a diagram showing a reactor provided with a dielectric structure, power supplies, and a power supply switching part.

FIG. 38 is a conceptual view showing a structural configuration of the reactor according to a sixth embodiment of the present invention.

FIG. 39 is a block diagram showing the configuration of an electrical system of the reactor of FIG. 38.

FIG. 40 is a cross-sectional view corresponding to FIG. 2 in a case where a fourth electrode is provided.

[FIG. 41]

BEST MODE FOR CARRYING OUT THE INVENTION

Below, a plurality of embodiments of the dielectric structure (plasma generator) of the present invention will be explained in detail with reference to the attached drawings. Note that, among the first to sixth embodiments, the same notations are attached to components having similar or the same structures (shapes and materials) and functions (actions). Among the first to fifth embodiments (except notations of FIG. 36, FIG. 38, and FIG. 39), for the components having different structures (particularly shapes), but having similar or the same functions, notations which become the same at the time of addition or subtraction of a multiple of 50 are assigned. By assigning notations corresponding to each other over a plurality of embodiments in this way, overlapped explanations will sometimes be omitted. In other words, the preferred shape, material, production method, usage method etc. explained for the component of one embodiment or a combination of those may be applied to the corresponding component of another embodiment or a combination of those.

(First Embodiment)

Figure 1:
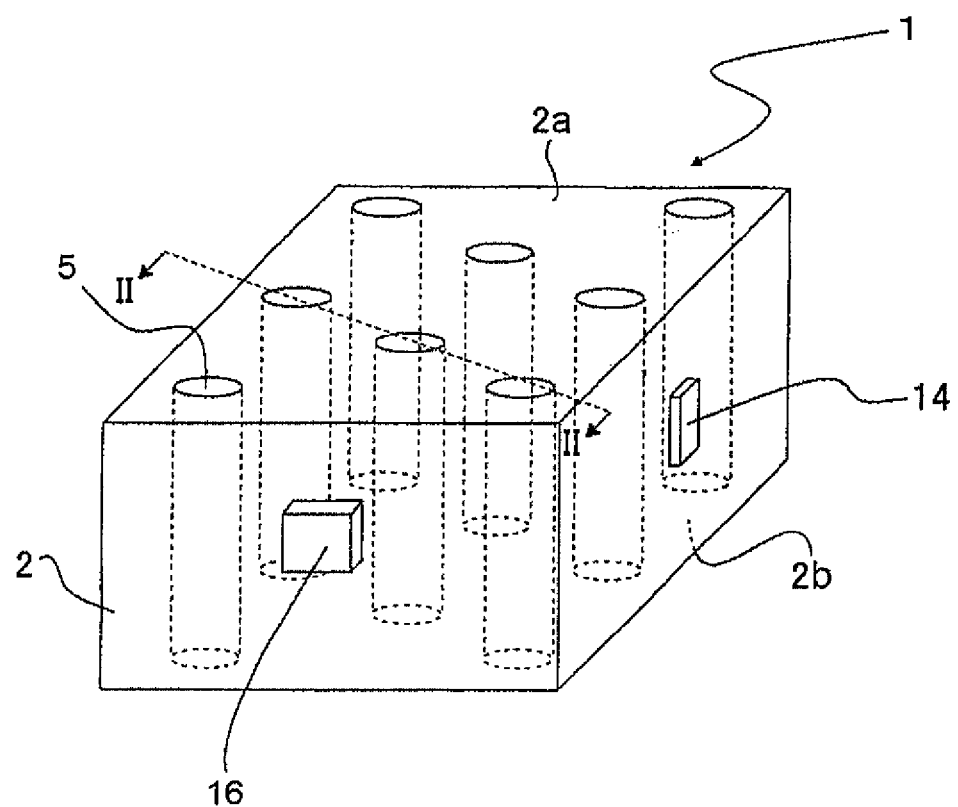
[FIG. 1]
Figure 2:
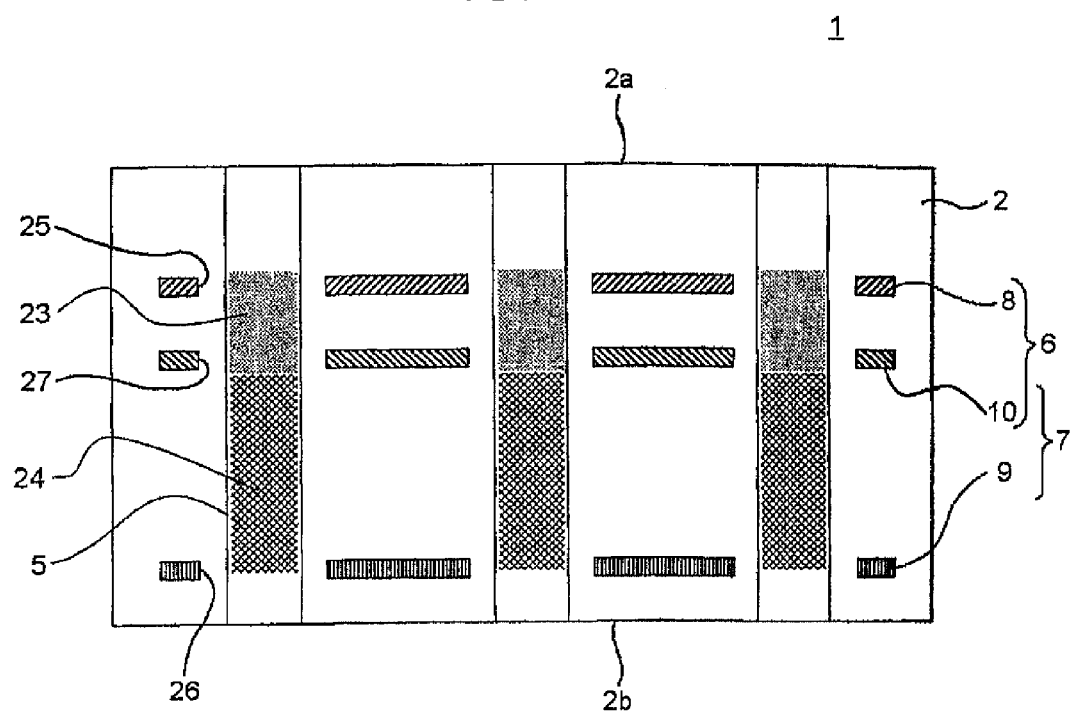
[FIG. 2]

As shown in FIG. 1 and FIG. 2, a dielectric structure 1 according to the present embodiment is provided with a base member 2 comprised of a dielectric material. This base member 2 has a first surface 2a and a second surface 2b on the back side thereof and a first through hole 5 penetrating between the first surface 2a and the second surface 2b. Inside the base member 2, a first electrode 8 provided between the first surface 2a and the second surface 2b and having a second through hole 25 at a position corresponding to the first through hole 5 is arranged. Further, inside the base member 2, a second electrode 9 provided so as to face the first electrode 8 and having a third through hole 26 at a position corresponding to the first through hole 5 is arranged. Further, inside the base member 2, between the first electrode 8 and the second electrode 9, a third electrode 10 provided so as to face the first electrode 8 and second electrode 9 and having a fourth through hole 27 at a position corresponding to the first through hole 5 is arranged.

Further, the first electrode 8, second electrode 9, and third electrode 10 are arranged along the running direction of the first through hole 5 in the order of the first electrode 8, third electrode 10, and second electrode 9 from the first surface 2a side. The first through hole 5 passes through the second through hole 25, fourth through hole 27, and third through hole 26.

At the end surface of the base member 2, in order to supply electric power to the first electrode 8, second electrode 9, and third electrode 10, external terminals 14, 15, and 16 which are electrically connected to the corresponding first electrode 8, second electrode 9, and third electrode 10, are provided.

Figure 3:
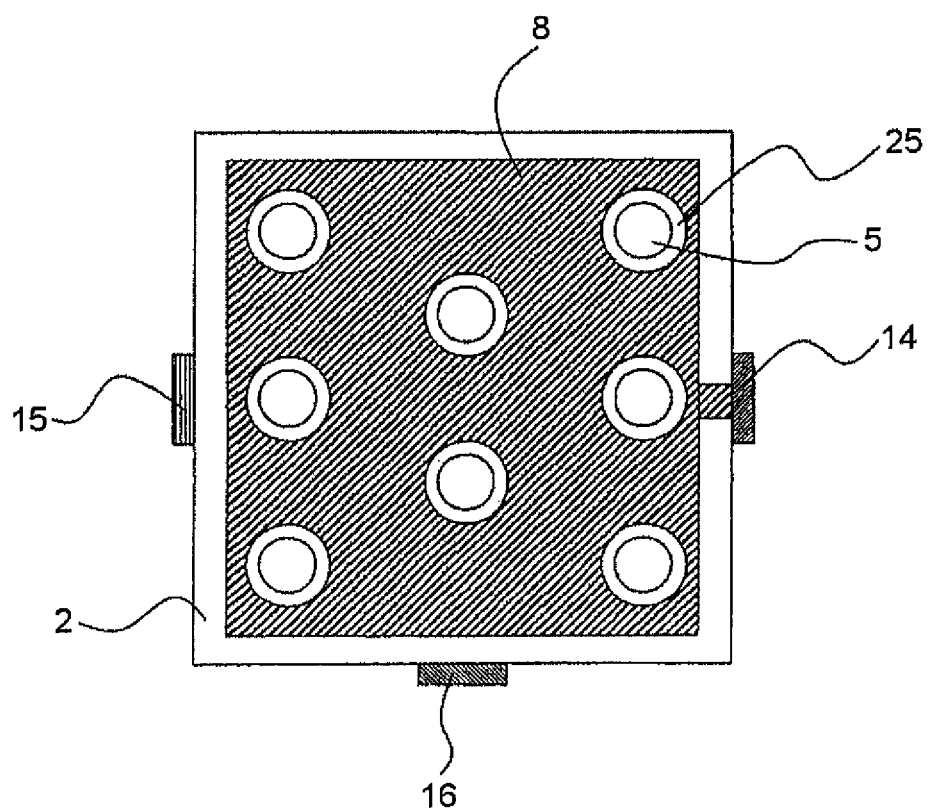
[FIG. 3]
Figure 4:
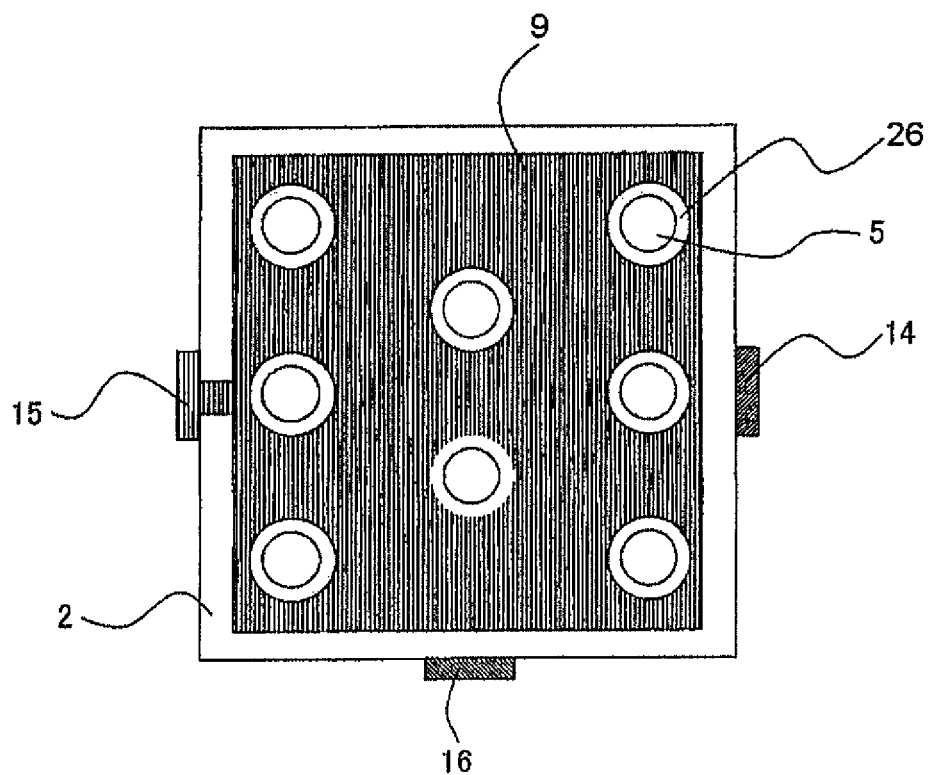
[FIG. 4]
Figure 5:
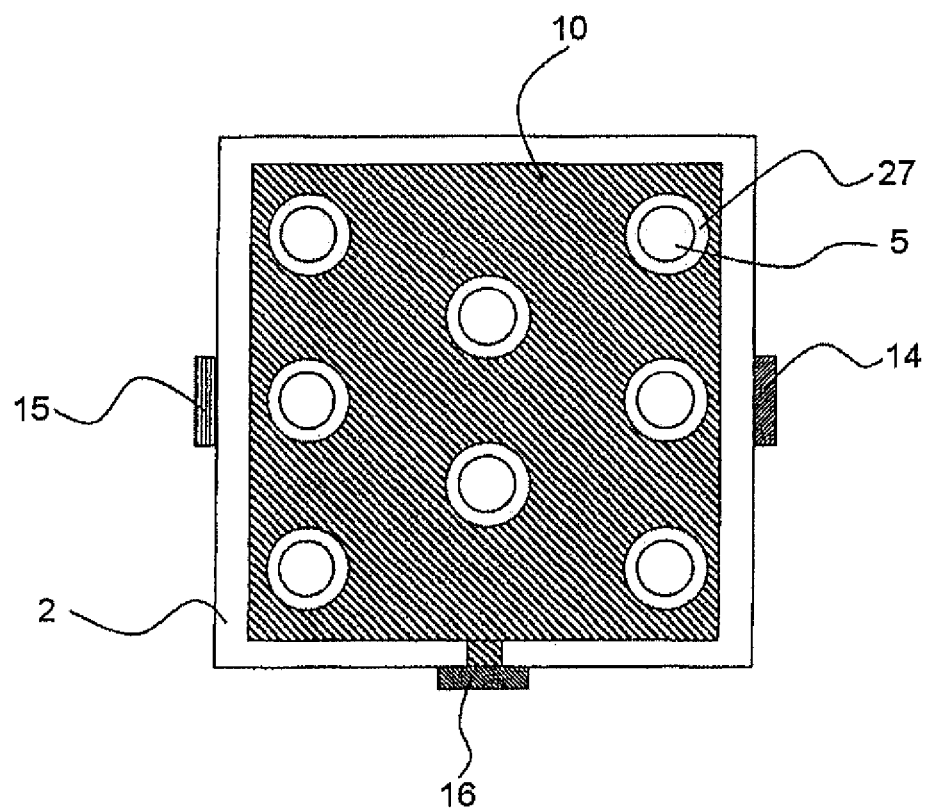
[FIG. 5]
Figure 6:
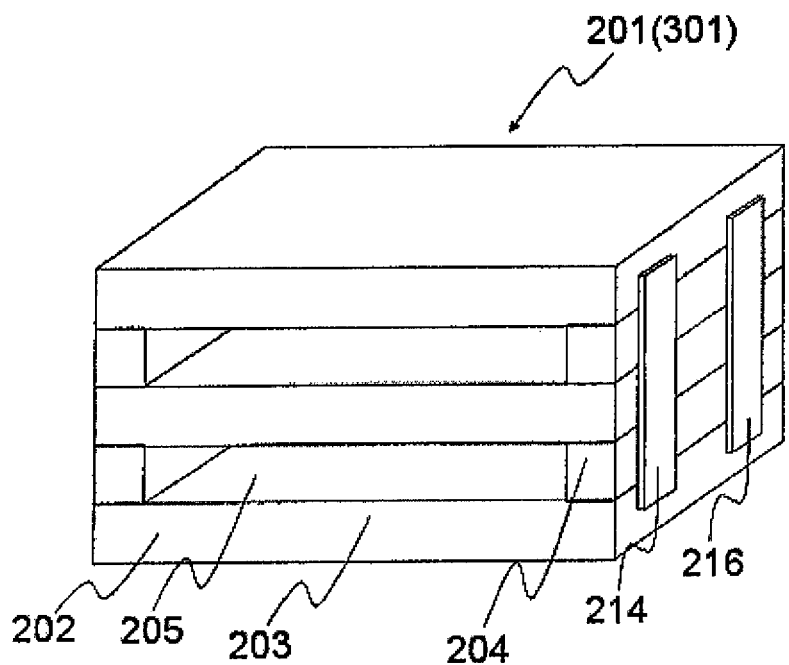
[FIG. 6]

Here, FIG. 3 to FIG. 5 show cut surfaces obtained by cutting the dielectric structure 1 shown in FIG. 1 along the first electrode 8, second electrode 9, and third electrode 10.

In the dielectric structure 1 according to the present embodiment, by supplying a reference potential to the third electrode 10 and applying an AC high voltage between the first electrode 8 and the third electrode 10, a surface discharge can be generated in a region in the first through hole 5 which corresponds to the region between the first electrode 8 and the third electrode 10 inside the base member 2 (hereinafter, referred to as a "first space 23"). Further, by applying a DC high voltage between the second electrode 9 and the third electrode 10, electrons or cations generated in such a first space 23 can be electrically drawn to a region in the first through hole 5 which corresponds to the region between the second electrode 9 and the third electrode 10 inside the base member 2 (hereinafter, referred to as a "second space 24"). For this reason, when a fluid containing a particulate state impurity such as an exhaust gas is supplied into the first through hole 5 from an opening on the first electrode 8 side, the fluid can be reformed by the effects of plasma in the first space 23. Further, in the second space 24, the particulate state impurity in the fluid can be charged by electrons or cations drawn to the second space 24. Due to this, the charged particulate state impurity can be electrically adsorbed on the base body 2 at the surface facing the second electrode 9 or at the surface in the vicinity of the second electrode 9. For example, when a positive DC high potential is applied to the second electrode 9, an impurity charged negative can be adsorbed at the surface of the base member 2. Then, fluid other than the particulate state impurity is ejected from the opening on the third electrode 10 side of the first through hole 5. In this way, the particulate state impurity can be removed from the interior of the fluid supplied. Note that, which region of the first through hole 5 the particulate state impurity is charged in differs according to the type of the particulate state impurity and characteristics etc. of the plasma. It is also possible to charge the impurity in the first space 23.

Further, when a negative DC high potential is supplied to the second electrode 9, an impurity charged positive can be adsorbed at the surface of the base member 2.

As described above, the dielectric structure according to the present embodiment is provided with an electrode group including the first electrode 8, second electrode 9, and third electrode 10. The first electrode 8 and third electrode 10 configure a first electrode pair 6 generating plasma in the first space 23 in accordance with an AC voltage. Further, the second electrode 9 and third electrode 10 configure a second electrode pair 7 generating an electric field in the second space 24 in accordance with a DC voltage. Here, the third electrode 10 is shared by the first electrode pair 6 and the second electrode pair 7. Further, in other words, the first electrode 8 and third electrode 10 configure a first assembly 6 generating plasma in the first space 23 in accordance with an AC voltage. Further, the second electrode 9 and third electrode 10 configure a second assembly 7 generating an electric field in the second space 24 in accordance with a DC voltage. The first assembly 6 and second assembly 7 share the third electrode 10.

According to the above configuration, the pressure loss of the treated fluid can be reduced. Further, the particulate state impurity in the treated fluid can be removed with a high efficiency. Further, by disposing the first assembly 6 and second assembly 7 in the base member 2 together, a plasma generator in which a plasma generation part generating plasma and a dust collection part collecting the particulate state impurity are integrally formed can be obtained. Due to this, a small-sized plasma generator provided with a plasma generation function and a dust collection function can be realized.

Figure 40:
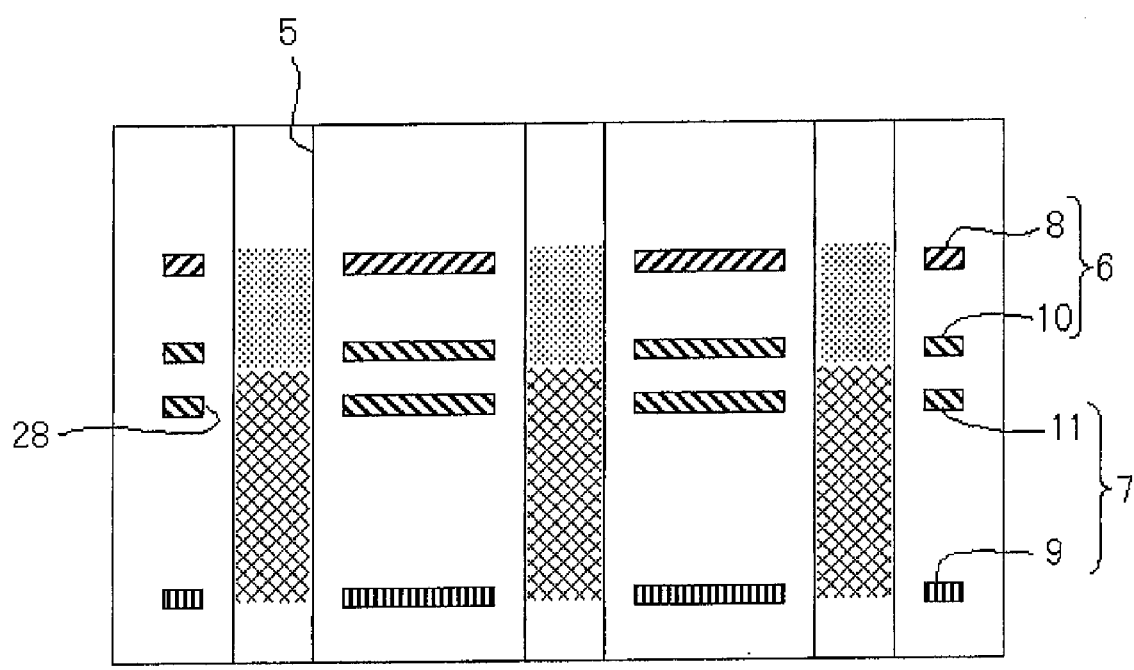
[FIG. 40]

Note that, in the dielectric structure 1 explained above, the third electrode 10 is shared by the first assembly 6 and the second assembly 7, but the first assembly 6 and second assembly 7 may be configured by different electrodes as well. For example, as in FIG. 40, the first assembly 6 is configured by the first electrode 8 and third electrode 10, and the second assembly 7 is configured by the second electrode 9 and a fourth electrode 11. Here, the fourth electrode 11 is provided between the second electrode 9 and the third electrode 10. Further, the fourth electrode 11 is the same in configuration as the third electrode 10 shown in FIG. 5. Namely, the fourth electrode 11 has a fifth through hole 28 at a position corresponding to the first through hole 5.

Then, when supplying the reference potential to the third electrode 10 and fourth electrode 11 and when applying an AC voltage between the first electrode 8 and the third electrode 10 and applying a DC voltage between the second electrode 9 and the fourth electrode 11, the same action and effects as the action and effects of the dielectric structure 1 explained above are obtained. At this time, if making a distance between the third electrode 10 and the fourth electrode 11 smaller than the distance between the first electrode 8 and the third electrode 10, it is possible to contribute to a reduction of size of the dielectric structure. Further, if the electrode supplying the reference potential is shared by the first assembly 6 and second assembly 7, the number of electrodes can be decreased and the dielectric structure can be made smaller in size.

The base member 2 is made of an electrical insulation material, for example, made of a ceramic. Specifically, when producing the base member 2, a ceramic green sheet is prepared, next, the prepared ceramic green sheet is suitably punched, a plurality of sheets are stacked according to need, and the result is fired at a high temperature (about 1300 to 1800° C.). As the electrical insulation material, there are, for example, a sintered body of aluminum oxide (alumina ceramic). For example, a green sheet comprised of a sintered body of aluminum oxide is obtained by adding a suitable organic solvent and solvating media to a starting material powder of alumina ($Al_2O_3$), silica ($SiO_2$), calcia (CaO), magnesia (MgO), or the like, mixing these to form a slurry state, and shaping this to a sheet state by employing a conventionally known doctor blade method, calendar roll method, or the like.

When preparing a laminate of ceramic green sheets, the ceramic green sheets are press bonded after being stacked. The press bonding is carried out by applying a pressure of about 3.0 to 8.0 MPa and heating at 35 to 80° C. according to need. At this time, in order to form the first through hole 5, the green sheets are punched. Further, in order to obtain a sufficient bonding of the ceramic green sheets, a binder prepared by mixing a solvent and a resin binder or the like may be used. Note that, as the electrical insulation material, other than the sintered body of aluminum oxide, there can be mentioned a mullite sintered body, aluminum nitride sintered body, cordierite sintered body, silicon carbide sintered body, etc.

End sections of the first electrode 8, second electrode 9, and third electrode 10 are led up to the vicinity of the outer surface of the base member 2 and are directly connected to the corresponding external terminals 14, 15, and 16 or electrically connected to those through auxiliary conductors. The first electrode 8, second electrode 9, and third electrode 10 are made of metal powder conductor such as tungsten, molybdenum, copper, silver. The conductor paste for the first electrode 8, second electrode 9, and third electrode 10 is print coated at predetermined positions of the ceramic green sheets for the base member 2 by using printing mean such as screen printing and is fired simultaneously with the ceramic green sheets for the base member 2, whereby it can form predetermined patterns inside the base member 2. The conductor paste is fabricated by adding an organic binder and an organic solvent and, if necessary, a dispersant or the like to the main ingredient metal powder and mixing and kneading these by a kneading mean such as a ball mill, a three roll mill, or a planetary mixer. To the conductor paste, powder of glass or ceramics may be added as well in order to match with the sintering action of the ceramic green sheets or raise the bonding strength with the base member 2 after sintering.

At the outer surface of the base member 2, external terminals 14, 15, and 16 are formed. The external terminals 14, 15, and 16 function as conduction paths for applying voltages to the first electrode 8, second electrode 9, and third electrode 10 from external power supplies and are electrically connected to the first electrode 8, second electrode 9, and third electrode 10 led to the outer surface of the base member 2. The material and production method of the external terminals 14, 15, and 16 are the same as those of the first electrode 8 etc. The conductor paste for the external terminals 14, 15, and 16 is prepared in the same way as the conductor paste for the first electrode 8, second electrode 9, and third electrode 10, but is adjusted to a viscosity suitable for printing according to the amounts of the organic binder and organic solvent.

Note that, on the exposed surface of the external terminals 14, 15, and 16, preferably metal excellent in corrosion resistance such as nickel or gold is coated. Note that, in order to suppress oxidation corrosion of the external terminals 14, 15, and 16 and reinforce the bond between the external terminals 14, 15, and 16 and power supply terminals of the external power supplies, preferably a nickel plating layer having a thickness of about 1 to 10 μm and a gold plating layer having a thickness of about 0.1 to 3 μm are sequentially coated.

Alternatively, the external terminals 14, 15, and 16 may be metal sheets which are adhered at predetermined positions after firing the ceramic green sheets for the base member 2.

Then, if a reference potential side power supply terminal of an external AC power supply is electrically connected to the external terminal 14 by pressure welding or bonding or another means, and a high voltage side power supply terminal is electrically connected to the external terminal 15 by pressure welding or bonding or another means to apply voltages, a surface discharge can be generated in each first space 23. Further, if a reference potential side power supply terminal of an external DC power supply is electrically connected to the external terminal 14 by pressure welding or bonding or another means, and a high voltage side power supply terminal is electrically connected to the external terminal 16 by pressure welding or bonding or another means to apply voltages, electrons or cations generated in each first space 23 can be electrically drawn to the second space 24, and the second space 24 can be electrically charged positive or negative.

Due to this, the fluid supplied to the through hole 5 of the dielectric structure 1 from an opening on the side where the first electrode B is formed passes through the surface discharge region in the first space 23 and therefore is reformed by the effects of the plasma. For example, $N_{ox}$ (nitrogen oxide) is decomposed by the reaction shown in the following formulae (1) and (2) under a low oxygen condition that an oxygen concentration is about 1% or less, whereby $N_2$ and $O_2$ are generated.

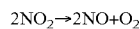 (1)

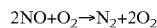 (2)

Next, the particulate state impurity in the fluid can be charged in each second space 24, and the charged particulate state impurity can be electrically adsorbed at the surface of the base member 2 in the vicinity of the third electrode 10, therefore the particulate state impurity in the fluid can be removed.

Note that, in order to generate a surface discharge between the first electrode 8 and the third electrode 10, an AC voltage having a high frequency is applied. The AC voltage to be applied is suitably selected according to the strength etc. of the needed surface discharge. For example, the frequency of the AC voltage applied in the dielectric structure 1 changing $N_{ox}$ (nitrogen oxide) in an exhaust gas of a diesel engine is for example 1 kHz to 100 MHz.

Further, a voltage applied between the first electrode 8 and the third electrode 10 may be a pulse voltage other than the AC voltage as well. Note that, the AC voltage is not limited to a sine wave voltage, but may be a rectangular wave voltage or square wave voltage etc.

Further, in order to electrically draw electrons or cations generated in a first space 23 to a second space 24, electrically charge the second space 24 positive or negative, and electrically adsorb the particulate state impurity charged at the surface of the base member 2 in the vicinity of the second electrode 9, a DC high voltage is applied between the second electrode 9 and the third electrode 10 using the third electrode 10 as a reference potential. The DC high voltage to be applied is suitably selected according to a magnitude etc. of the field strength which is needed. For example, the magnitude of the DC voltage which is applied when PM (particulate matter) in the exhaust gas of the diesel engine is charged in a second space 24 and the charged PM is electrically adsorbed on the surface of the base member 2 in the vicinity of the third electrode 10 is 1 kV to 50 kV or −50 kV to −1 kV.

In the dielectric structure 1 according to the present embodiment, the second through hole 25, third through hole 26, and fourth through hole 27 formed in the first electrode 8, second electrode 9, and third electrode 10 are preferably made larger than the first through hole 5 when viewed on a plane. Namely, the inner circumferential surfaces of the second through hole 25, third through hole 26, and fourth through hole 27 are preferably located on the outer side from the inner circumferential surface of the first through hole 5.

By making the second through hole 25, third through hole 26, and fourth through hole 27 larger than the first through hole 5 when viewed on a plane, exposure of the first electrode 8, second electrode 9, and third electrode 10 at the inner surface of the first through hole 5 can be suppressed, so corrosion of the first electrode 8, second electrode 9, and third electrode 10 by the fluid supplied to the first through hole 5 can be suppressed.

Further, in the dielectric structure 1 according to the present embodiment, the distance between the first electrode 8 and the third electrode 10 is preferably shorter than the distance between the second electrode 9 and the third electrode 10.

By making the distance between the first electrode 8 and the third electrode 10 shorter than the distance between the second electrode 9 and the third electrode 10, generation of an unnecessary surface discharge between the second electrode 9 and the third electrode 10 when generating the surface discharge between the first electrode 8 and the third electrode 10 can be suppressed.

Further, in the dielectric structure 1 according to the present embodiment, preferably there are a plurality of first through holes 5. Due to the existence of the plurality of first through holes 5, the amount of the fluid which can be supplied to the dielectric structure 1 can be increased, and the pressure loss of the fluid can be reduced. Note that, in this case, there are the same numbers of second through holes 25, third through holds 26, and fourth through holes 27 as that of the first through holes 5.

Further, in FIG. 2, the first electrode 8, second electrode 9, and third electrode 10 (in FIG. 40, the first electrode 8, second electrode 9, third electrode 10, and fourth electrode 11) were provided in parallel, but this is not necessary. If the first electrode 8, second electrode 9, and third electrode 10 are provided inside the base member 2 in a state where these are spaced away from each other so that inner circumferential surfaces of the second through hole 25, third through hole 26, and fourth through hole 2 (in FIG. 40, second through hole 25, third through hole 26, fourth through hole 27, and fifth through hole 28) are along the inner circumferential surfaces of the first through hole 5, depending on the conditions of the applied AC voltage and DC voltage, surface discharge can be generated in the first space 23, it is possible to generate an electric field in the second space 24, and the same action and effects as those of the dielectric structure 1 are obtained.

Note that, in the dielectric structure 1, preferably the base member 2 is formed by simultaneously firing the ceramic green sheets, the first electrode 8, second electrode 9, third electrode 10, and the external terminals 14, 15, and 16 are formed by firing the conductor paste simultaneously with the ceramic green sheets. Due to this, the dielectric structure 1 is integrally formed by simultaneously firing the ceramics and conductor paste. Therefore, even in a case where the structure is used for a long period in a high temperature, high vibration, and other environments, the deformation of the dielectric structure 1 is kept small, and the shape of the first through hole 5 can be made stable. Accordingly, the fluid containing the PM or oxide ingredients etc. which runs through the first through hole 5 can be stably reacted for a long period and can be reformed well.

Note that, not only a single plasma generator, but also a reforming mechanism of another exhaust gas may be used together. For example, a filter or catalyst may be attached before or after the plasma generator as well. Due to this, emission of the PM, oxide ingredients, etc. in the exhaust gas can be further reduced. As such filter, there are a DPF (diesel particulate filter) made of ceramic and so on: Platinum etc. can be used as the catalyst.

(Second Embodiment)

As shown in FIG. 6 to FIG. 11, a dielectric structure 201 according to the present embodiment is provided with a base member 202. This base member 202 is provided with a plurality of base parts 203 comprised of flat plate-shaped dielectric members arranged in one direction and with support parts 204 supporting the plurality of base parts 203 at predetermined intervals. The base parts 203 and the support parts 204 configure a through hole 205 which becomes a discharge space. Further, inside each base part 203, a first electrode 208, second electrode 209, and third electrode 210 are provided. Here, a reference potential is supplied to the third electrode 210. Then, a DC voltage is applied between the second electrode 209 and the third electrode 210, and an AC voltage is applied between the first electrode 208 and the third electrode 210. Further, when the AC voltage is applied between the first electrode 208 and the third electrode 210, a surface discharge is generated in the through hole 205.

Figure 8:
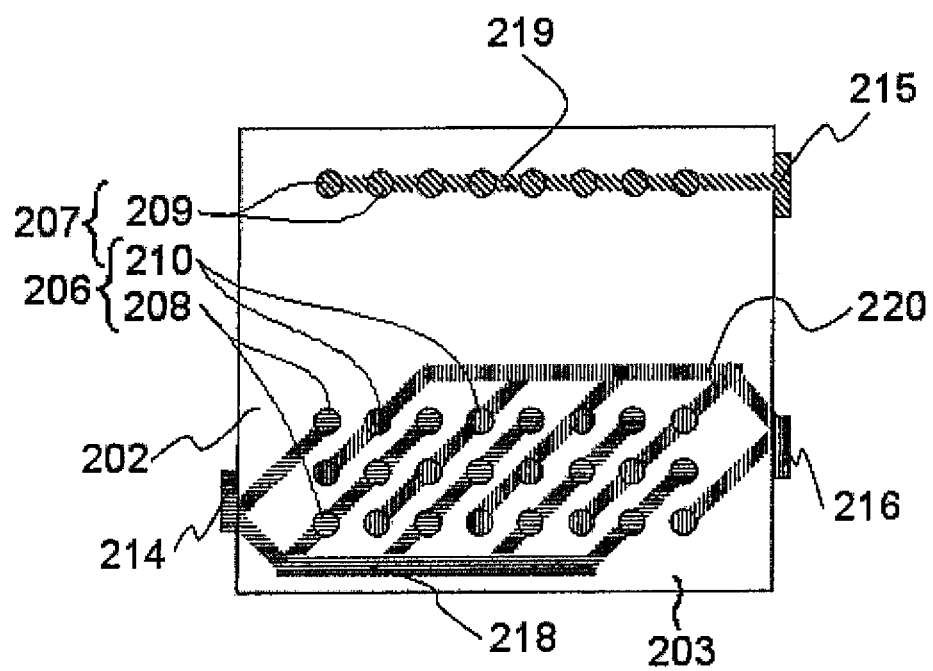
[FIG. 8]
Figure 9:
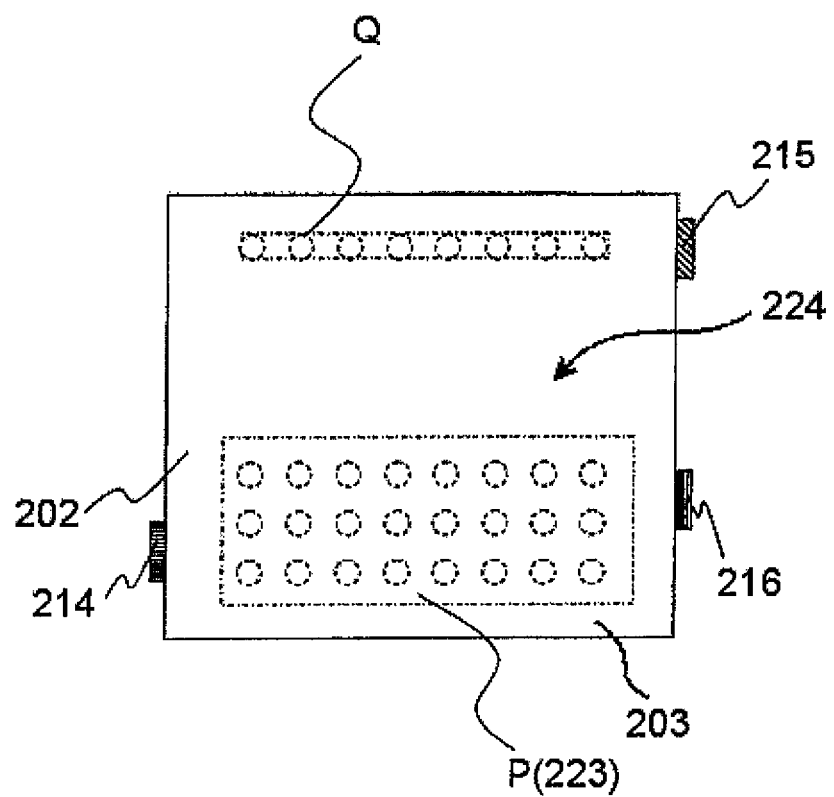
[FIG. 9]
Figure 10:
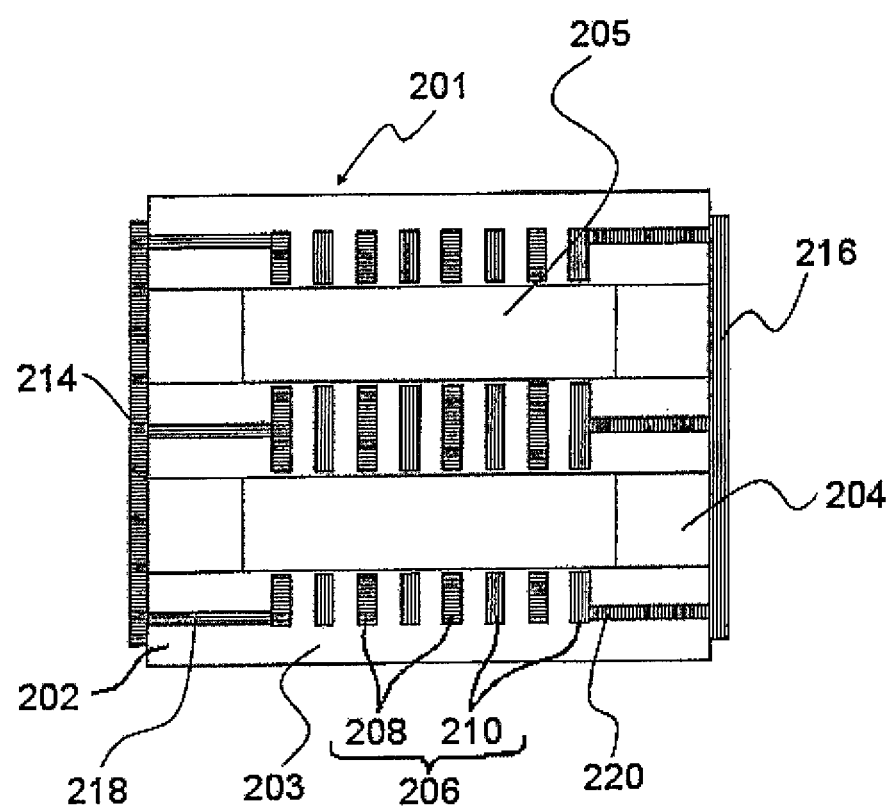
[FIG. 10]

As shown in FIG. 8 to FIG. 10, the first electrode 208 and third electrode 210 are respectively comprised of pluralities of partial electrodes provided inside the base part 203. Further, the third electrode 210 is provided in between parts of the first electrode 208. The partial electrodes configuring the first electrode 208 and third electrode 210 are columnar and have end sections thereof located along the surface contacting a space (through hole 205) between base parts 203. In each base part 203, the partial electrodes configuring the first electrode 208 (hereinafter, also referred to as "first partial electrodes") are electrically connected to each other by an interconnect conductor 218 provided inside that base part 203, while the partial electrodes configuring the third electrode 210 (also referred to as "third partial electrodes") are electrically connected to each other by an interconnect conductor 220 provided inside that base part 203. Note that, in the dielectric structure 201 according to the present embodiment, a plurality of columnar first partial electrodes and a plurality of columnar third partial electrodes are provided. However, each may be singular as well, and the shape is not limited to a columnar'one. The shape and number are suitably set from the viewpoints of the strength of the plasma to be generated and the size etc. of the plasma generation region.

Figure 11:
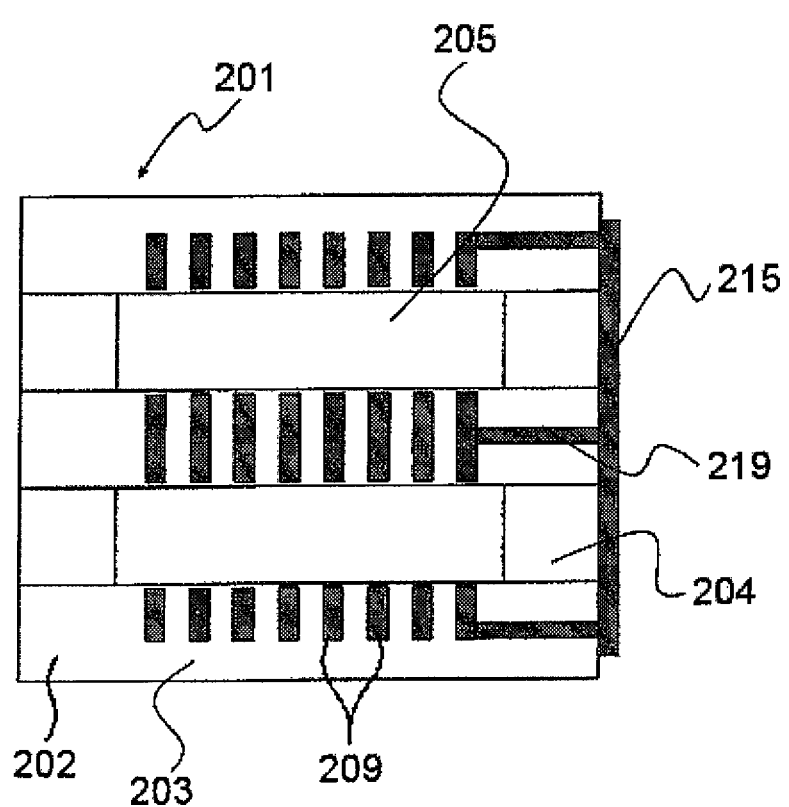
[FIG. 11]

Further, as shown in FIG. 11, a plurality of partial electrodes configuring the second electrode 209 (hereinafter, also referred to as "second partial electrodes") are provided in each base part 203. These are columnar, and the two end sections are located along the surfaces contacting the space between the base parts 203. Note that, in the dielectric structure 201 according to the present embodiment, a plurality of columnar second partial electrodes are provided, but this may be singular as well, and the shape is not limited to a columnar one. The shape and number are suitably set from the viewpoints of the strength, range, etc. of the electric field.

Note that, inside each through hole 205, a region in which a surface discharge occurs when an AC voltage is applied between the first electrode 208 and the third electrode 210 is defined as a region P (first space 223), and a region facing the region having the second electrode 209 provided therein in the base part 203 is defined as a region Q. Here, the "region in which the second electrode 209 is provided" in a case where a plurality of second partial electrodes are provided in the base part 203 means a rectangular or square region surrounding, when viewing the base part 203 on a plane, the plurality of second partial electrodes, with at least one side contacting the third electrode 210, and having an area which becomes the minimum. Further, a space between the region P and the region Q is defined as a second space 224.

Further, at the end surface of the base member 202, in order to supply electric power to the first electrode 208, second electrode 209, and third electrode 210, external terminals 214, 215, and 216 electrically connected to the first electrode 208, second electrode 209, and third electrode 210 are provided.

Note that, the base member 202 in the present specification means a portion excluding the other parts such as first electrode 208 formed in the internal portion and means just the laminate in a case where the dielectric structure 201 is obtained by simultaneously firing a stack of a plurality of ceramic green sheets and the conductor paste formed on the surfaces of each of those ceramic green sheets.

In the dielectric structure 201 according to the present embodiment, an AC high voltage is applied between an adjacent first electrode 208 and third electrode 210 to generate a surface discharge in the through hole 205, and a fluid, for example, exhaust gas is run through this through hole 205 to thereby make a chemical substance in the fluid react and decompose.

Further, by applying a DC high voltage between the second electrode 209 and the third electrode 210, electrons or cations generated in the region P (first space 223) can be electrically drawn to the region Q of the through hole 205, so the second space 224 sandwiched by the region P and region Q can be filled with electrons or cations. For this reason, if a fluid containing a particulate state impurity such as an exhaust gas is supplied from an opening of the through hole 205 on the first electrode 208 and third electrode 209 side, the fluid can be reformed by the effects of the plasma in the region P. Further, the particulate state impurity in the fluid can be charged between the region P and the region Q, and the charged particulate state impurity can be electrically adsorbed at the surface contacting the region Q in the base part 203. For example, in a case where the impurity in the fluid is a substance which is easily charged negative, the reference potential is supplied to the third electrode 210, and a positive DC voltage is applied between the second electrode 209 and the third electrode 210, so that impurity is adsorbed at the surface contacting the region Q in the base part 203. Due to this, the particulate state impurity can be removed from the fluid. Note that, which region in the through hole 205 the particulate state impurity charged is in differs according to the type of the particulate state impurity and characteristics etc. of the plasma. Not limited between the region P and the region Q, charging sometimes occurs in at least one of the interior of the region P and the interior of the region Q as well. Further, when a negative DC voltage is applied between the second electrode 209 and the third electrode 210, an impurity charged positive can be adsorbed at the surface of the base part 203.

As described above, the dielectric structure according to the present embodiment is provided with an electrode group including the first electrode 208, second electrode 209, and third electrode 210. The first electrode 208 and third electrode 210 configure a first electrode pair 206 generating a plasma in the first space 223 when an AC voltage is applied. Further, the second electrode 209 and third electrode 210 configure a second electrode pair 207 generating an electric field in the second space 224 when a DC voltage is applied. Here, the third electrode 210 is shared by the first electrode pair 206 and the second electrode pair 207. Further, in other words, the first electrode 208 and third electrode 210 configure a first assembly 206 generating plasma in the first space 223 when an AC voltage is applied. Further, the second electrode 209 and third electrode 210 configure a second assembly 207 generating an electric field in the second space 224 when a DC voltage is applied. The first assembly 206 and second assembly 207 share the third electrode 210.

According to the above configuration, the pressure loss of the treated fluid can be reduced, and the particulate state impurity in the treated fluid can be removed with a high efficiency. Further, by disposing the first assembly 206 and second assembly 207 in one base part 203 together, a plasma generator in which a plasma generation part generating plasma and a dust collection part collecting the particulate state impurity are integrally formed can be obtained.

Note that, in the dielectric structure 201 explained above, the first electrode 208 is shared by the first assembly 206 and second assembly 207. However, the first assembly 206 and second assembly 207 may be configured by different electrodes as well. Note, if the electrode supplying the reference potential is shared by the first assembly 206 and second assembly 207, the number of electrodes can be decreased, and the dielectric structure 1 can be reduced in size.

Note that, when the first electrode 208 and the third electrode 210 are comprised of pluralities of partial electrodes as explained above, by disposing the second partial electrodes between the first partial electrodes, the surface discharge occurs at a plurality of positions, and many electrons and cations are generated, so the reforming efficiency of the fluid and removal efficiency of the impurity become higher. Further, as shown in FIG. 8, by regularly arranging the first electrodes 208 and second electrodes 209, for example, alternately arranging these vertically and laterally, the surface discharge can be uniformly generated, therefore the generated plasma concentration is not biased according to the location, so the entire fluid can be more uniformly reformed.

The material and production method of the base member 202 are the same as the material and production method of the base member 2 in the first embodiment. For example, not only the base parts 203, but also the support parts 204 are comprised of dielectric members, and the base member 202 is formed by stacking a plurality of ceramic green sheets suitably punched etc.

A plurality of first partial electrodes are connected to each other by the interconnect conductor 218, and the end section of that interconnect conductor 218 is led up to the vicinity of the outer surface of the base member 202 and is directly connected to the external terminal 214 or electrically connected through an auxiliary conductor. Further, the second partial electrodes and third partial electrodes are individually connected to each other by interconnect conductors 219 and 220 as well, and end sections of the interconnect conductors 219 and 220 are led up to the vicinity of the outer surface of the base member 202 and are directly connected to the external terminals 215 and 216 or electrically connected to these through auxiliary conductors. The materials and production methods of the first electrode 208, second electrode 209, and third electrode 210 and the interconnect conductors 218, 219, and 220 are the same as the materials and production methods of the first electrode 8 etc. in the first embodiment.

Next, on the outer surface of the base part 203, the external terminals 214, 215, and 216 are formed by coating. The external terminals 214, 215, and 216 function as the conduction paths for applying voltages to the first electrode 208, second electrode 209, and third electrode 210 from external power supplies and are electrically connected to the first electrode 208, second electrode 209, and third electrode 210 respectively. The material and production method of the external terminals 214, 215, and 216 are the same as the material and production method of the external terminal 14 etc. of the first embodiment.

Then, if the reference potential side power supply terminal of the external AC power supply is electrically connected to the external terminal 214 by pressure welding or bonding or another means, and the high voltage side power supply terminal is electrically connected to the external terminal 215 by pressure welding or bonding or another means to apply voltages, a surface discharge can be generated in the region P (first space 223). Further, if the reference potential side power supply terminal of the external DC power supply is electrically connected to the external terminal 214 by pressure welding or bonding or another means, and the high voltage side power supply terminal is electrically connected to the external terminal 216 by pressure welding or bonding or another means to apply voltages, electrons or cations generated in the region P can be electrically drawn to the region Q, and the second space 224 sandwiched by the region P and the region Q can be electrically charged positive or negative.

In the dielectric structure 201 according to the present embodiment, as shown in FIG. 6 to FIG. 11, in the base parts 203 other than the two end sections in the arrangement direction, the first partial electrodes configuring the first electrode 208 and the third partial electrodes configuring the third electrode 210 are all columnar. Further, one end sections of the first partial electrodes and one end sections of the third partial electrodes are provided along the surface contacting one through hole 205 adjacent to that base part 203, and the other end sections of the first partial electrodes and the other end sections of the third partial electrodes are provided along the surface contacting the other through hole 205 contacting the base part 203. However, in each base part 203, the first partial electrodes and the third partial electrodes may be partially provided along the surface contacting the through hole 205 as well. For example, when speaking of the first electrode 208, in each base part 203, partial electrodes A may be provided along the surface contacting one through hole 205 to which that base part 203 is adjacent, partial electrodes B may be provided separately from the partial electrodes A along the surface contacting the other through hole 205, and the reference potential may be supplied to each as well. Further, where these are separately provided, an interconnect conductor electrically connecting the partial electrode A and the partial electrode B may be provided inside the base part 203 as well. Here, where a via conductor is employed as the interconnect conductor and one set of partial electrodes A and partial electrodes B are connected by the via conductor, these become the first electrode 208 by the dielectric structure 201 according to the present embodiment, that is, the columnar first electrode 208. This is true for the second electrode 209 and third electrode 210 as well.

When one set of partial electrodes A and B are connected by the via conductor as explained above, the partial electrodes A and B can be held at the same potential. Therefore, in each through hole 205, the surface discharge generated in a case where an AC voltage is applied between the electrode corresponding to the first electrode 208 and the electrode corresponding to the third electrode 210 can be more stabilized. Further, when the second electrode 209 is comprised of one set of electrodes and a via conductor as explained above, the force of the second electrode 209 drawing electrons or cations to each region Q can be stabilized more.

Figure 12:
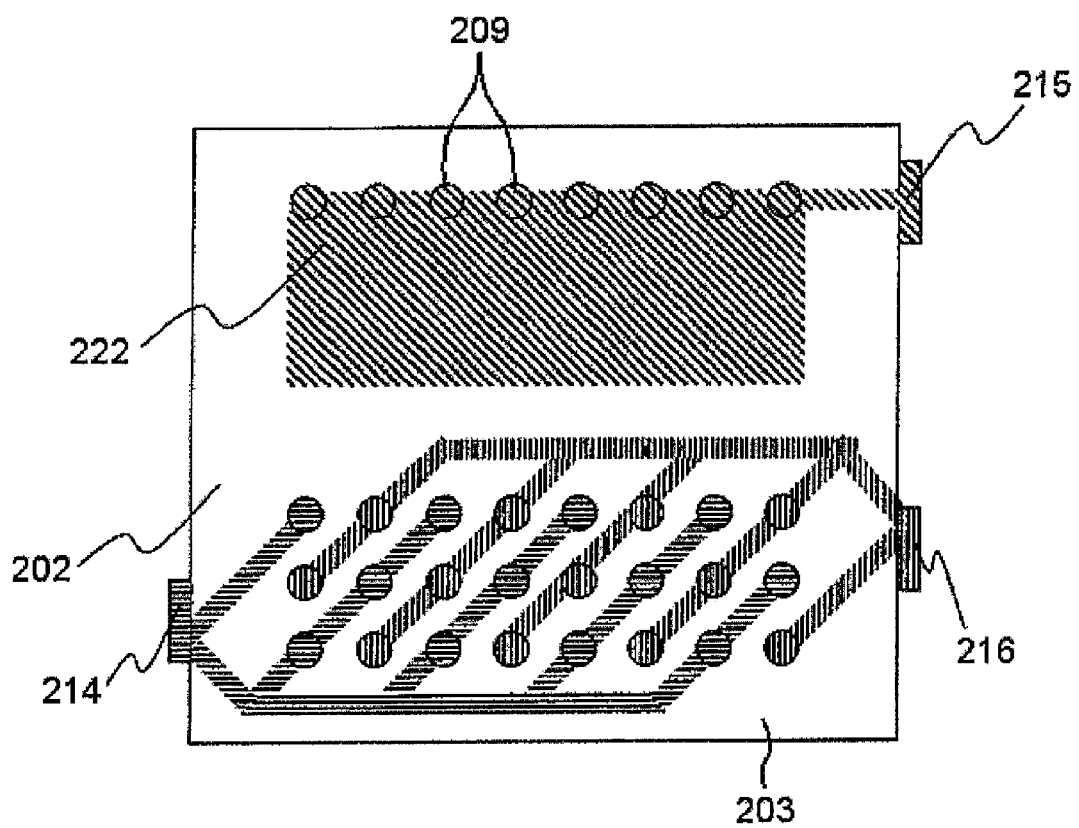
[FIG. 12]
Figure 13:
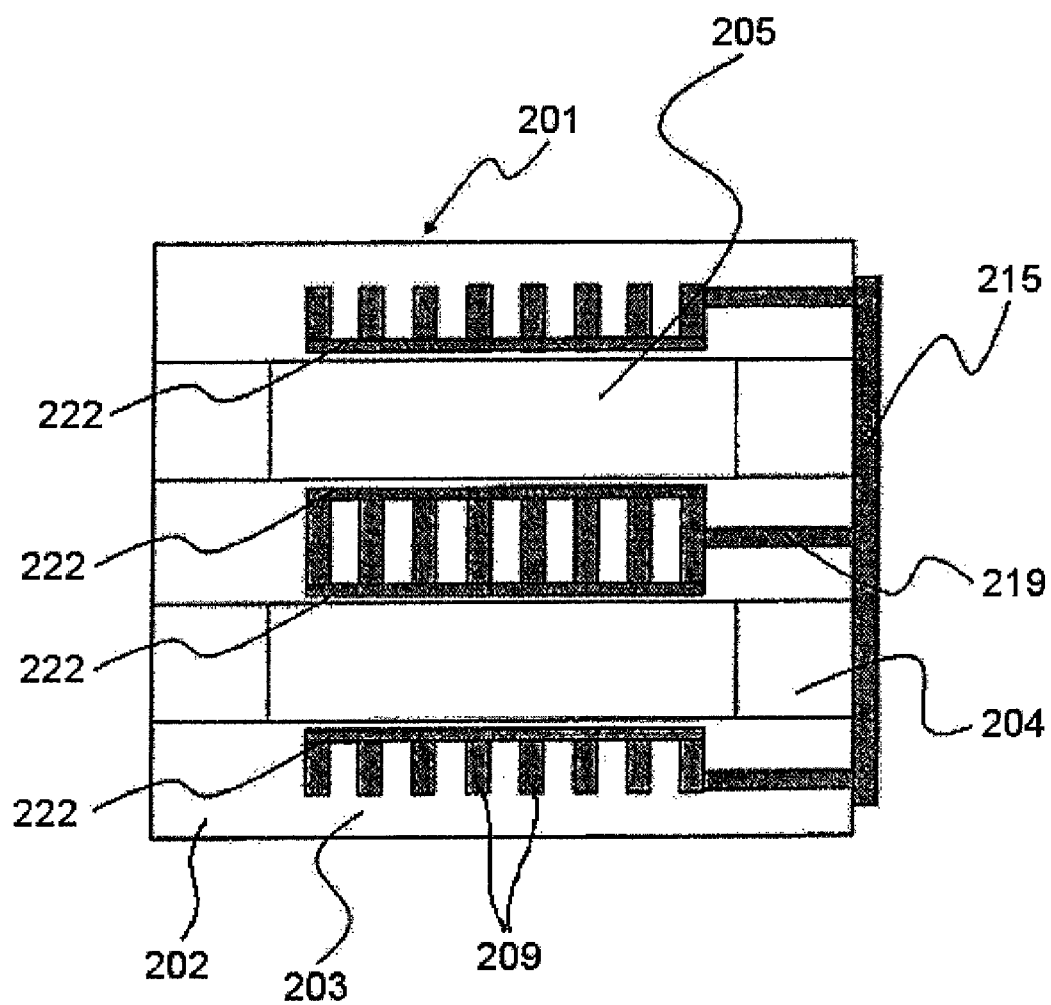
[FIG. 13]

Further, as shown in FIG. 12 and FIG. 13, between the region corresponding to the region P and the region corresponding to the region Q in the internal portion or at the surface of the base part 203, conductors 222 may be provided arranged along the surface contacting the through hole 205 and electrically connected to the second electrode 209 as well. FIG. 12 and FIG. 13 are cross-sectional views showing the configuration of the dielectric structure in such a case and correspond to FIG. 8 and FIG. 11.

In this way, in the base part 203, by disposing the conductors 222 electrically connected to the second electrode 209, the force drawing electrons or cations generated in the region P to the region Q can be made stronger.

(Third Embodiment)

Figure 14:
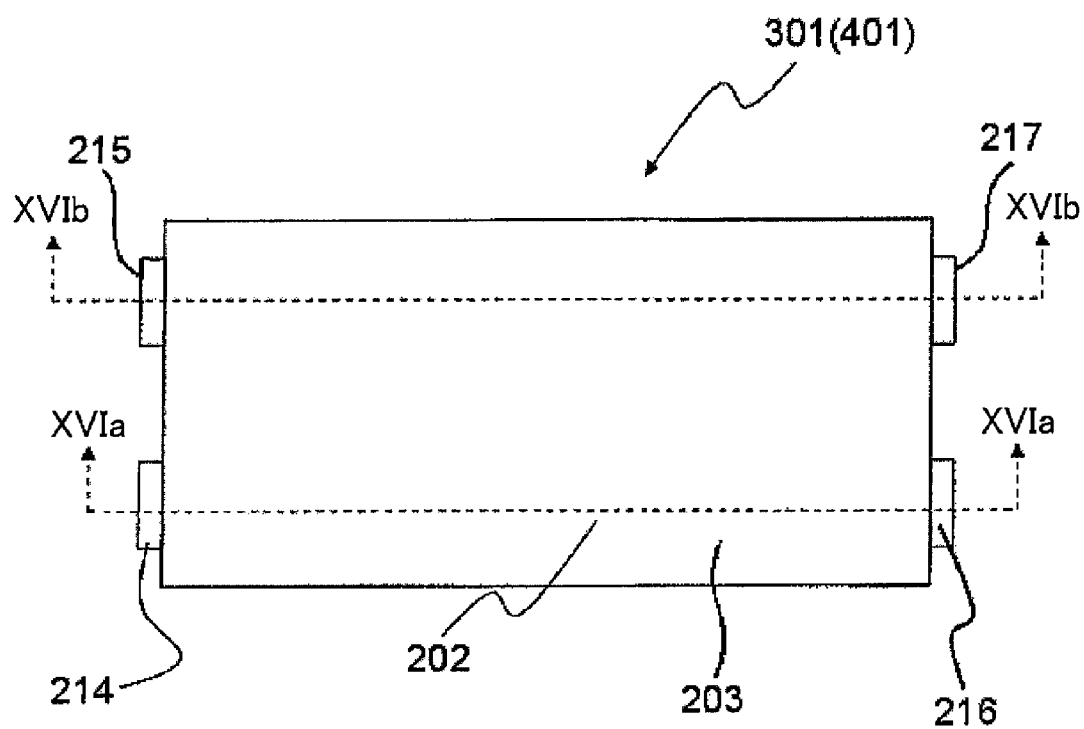
[FIG. 14]

The perspective view of a dielectric structure 301 according to a third embodiment of the present invention is the same as the perspective view (FIG. 6) of the dielectric structure 201 according to the second embodiment, so illustration is omitted. Note that, when referring to FIG. 6 in the present embodiment, please replace notation 214 with notation 216, and replace notation 216 with notation 217 when viewing them. Further, the side view of the dielectric structure 301 is the same as the side view (FIG. 7A) of the dielectric structure 201, so illustration is omitted. Note that, when referring to FIG. 7A in the present embodiment, please replace notation 216 with notation 216, and replace notation 215 with notation 214 when viewing them. FIG. 14 is a plan view of the dielectric structure 301.

The dielectric structure 301 according to the third embodiment is configured with another external terminal added to the dielectric structure 201 according to the second embodiment in relation to the structure as grasped from its appearance. Specifically, when comparing FIG. 7B and FIG. 14, the configuration becomes one where an external terminal 215 referred to in FIG. 14 is added to the dielectric structure 201.

Figure 7A:
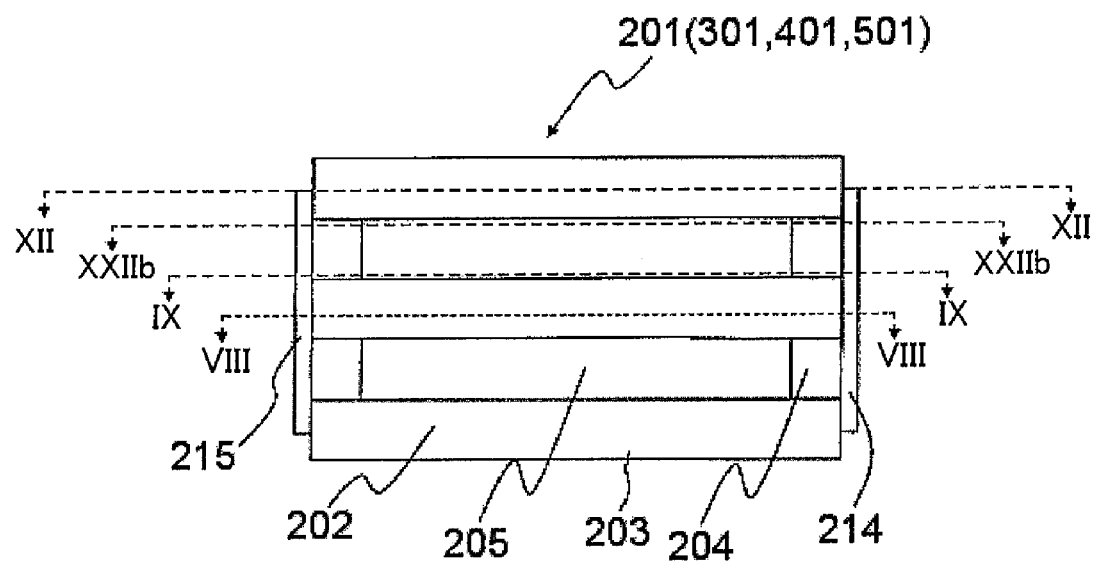
FIG. 7A is a side view of the dielectric structure of FIG. 6.
Figure 7B:
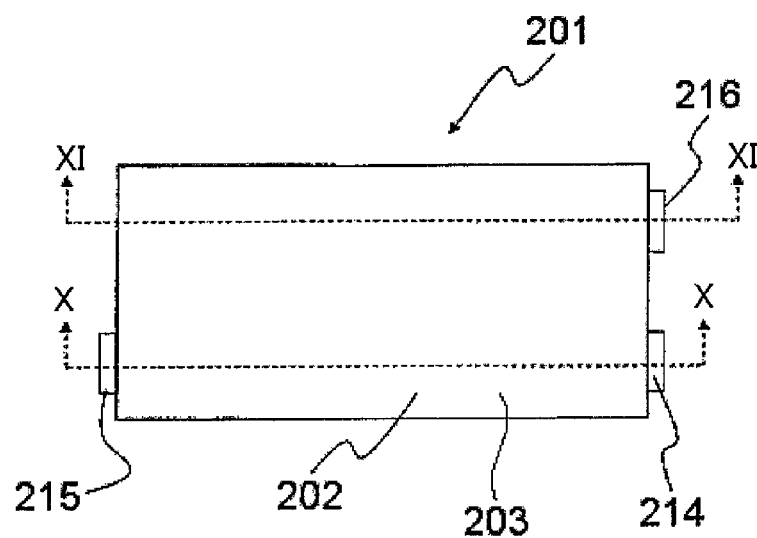
FIG. 7B is a plan view of the dielectric structure of FIG. 6.
Figure 15A:
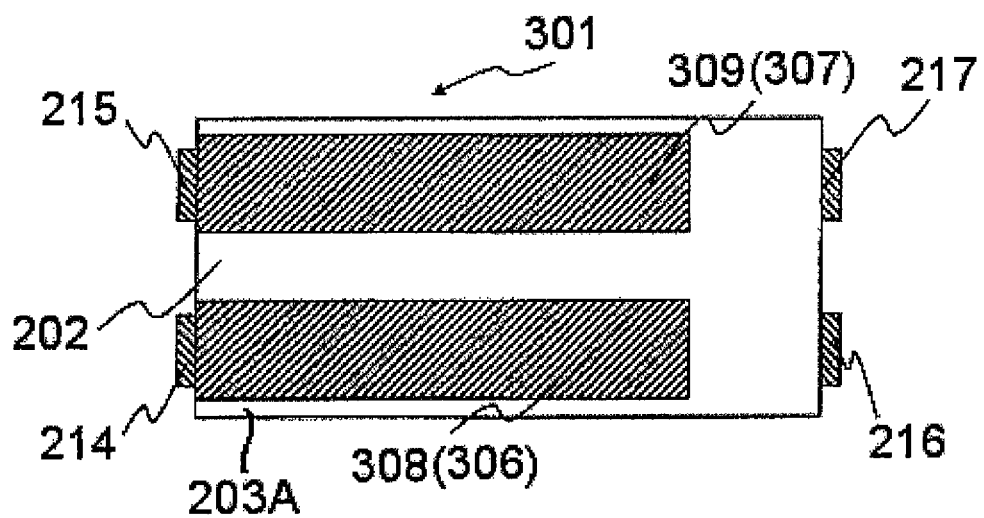
FIG. 15A is a cross-sectional view corresponding to the XII-XII line of FIG. 7A in the third embodiment.
Figure 15B:
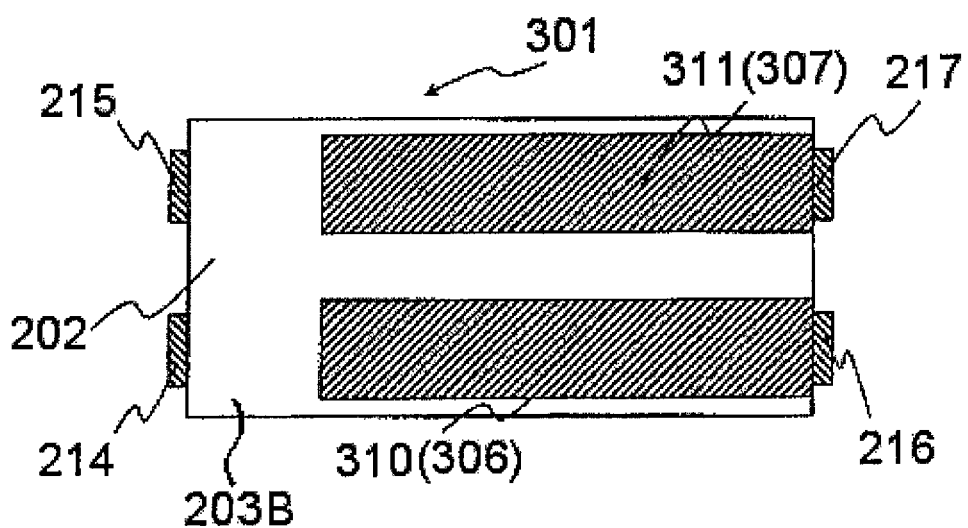
[FIG. 15B]
Figure 16A:
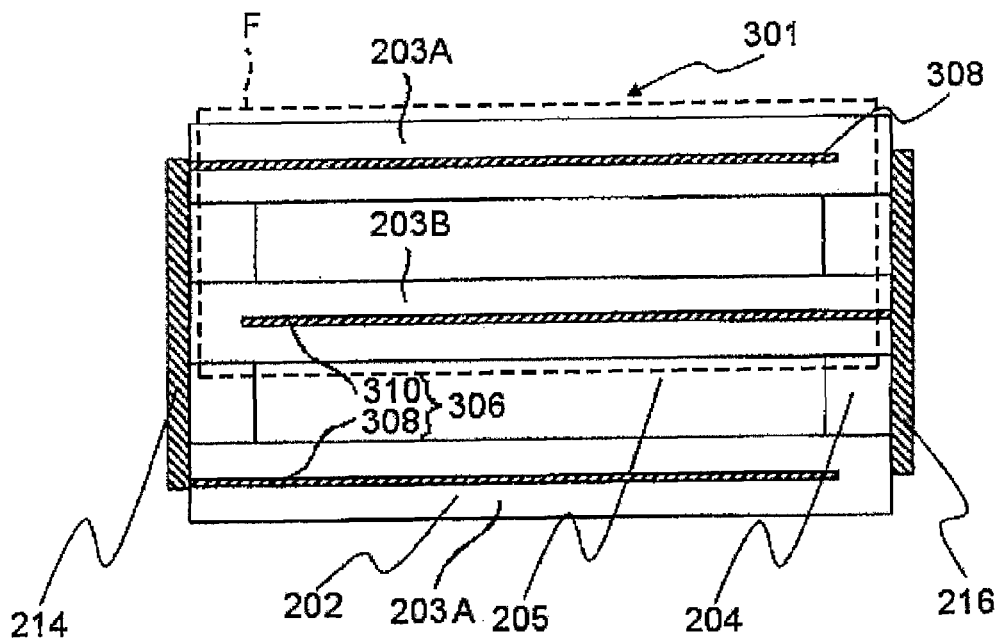
FIG. 16A is a cross-sectional view taken along a XVIa-XVIa line of FIG. 14.
Figure 16B:
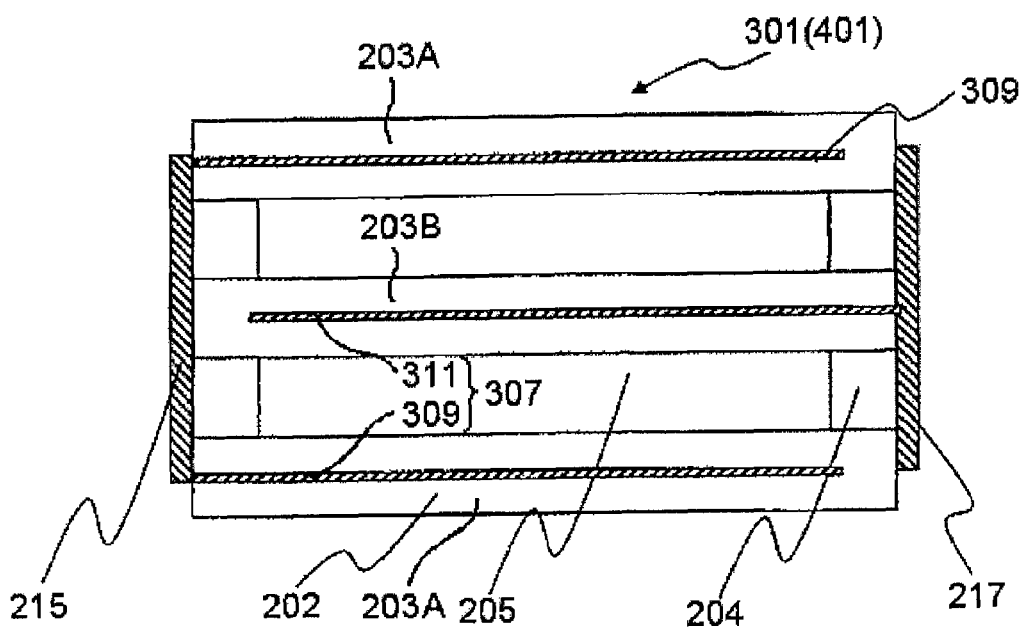
FIG. 16B is a cross-sectional view taken along a XVIb-XVIb line of FIG. 14.

FIG. 15A is a cross-sectional view corresponding to a XII-XII line of FIG. 7A in the third embodiment. FIG. 15B is a cross-sectional view corresponding to a VIII-VIII line of FIG. 7A in the third embodiment. FIG. 16A is a cross-sectional view taken along a XVIa-XVIa line of FIG. 14. FIG. 16B is a cross-sectional view taken along a XVIb-XVIb line of FIG. 14.

The plurality of base parts 203 include parts in which a first electrode 308 and a second electrode 309 are internally provided (for convenience, referred to as "first base parts 203A" in the present embodiment) and parts in which a third electrode 310 and a fourth electrode 311 are internally provided (for convenience, referred to as "second base parts 203B" in the present embodiment). The first base parts 203A and the second base parts 203B are alternately arranged. The first electrodes 308 and the third electrodes 310 face each other across the through holes 205, while the second electrodes 309 and the fourth electrodes 311 face each other across the through holes 205.

Further, at the end surfaces of the base members 202, an external terminal 214 electrically connected to the first electrode 308, an external terminal 215 electrically connected to the second electrode 309, an external terminal 216 electrically connected to the third electrode 310, and an external terminal 217 electrically connected to the fourth electrode 311 are provided.

Figure 17:
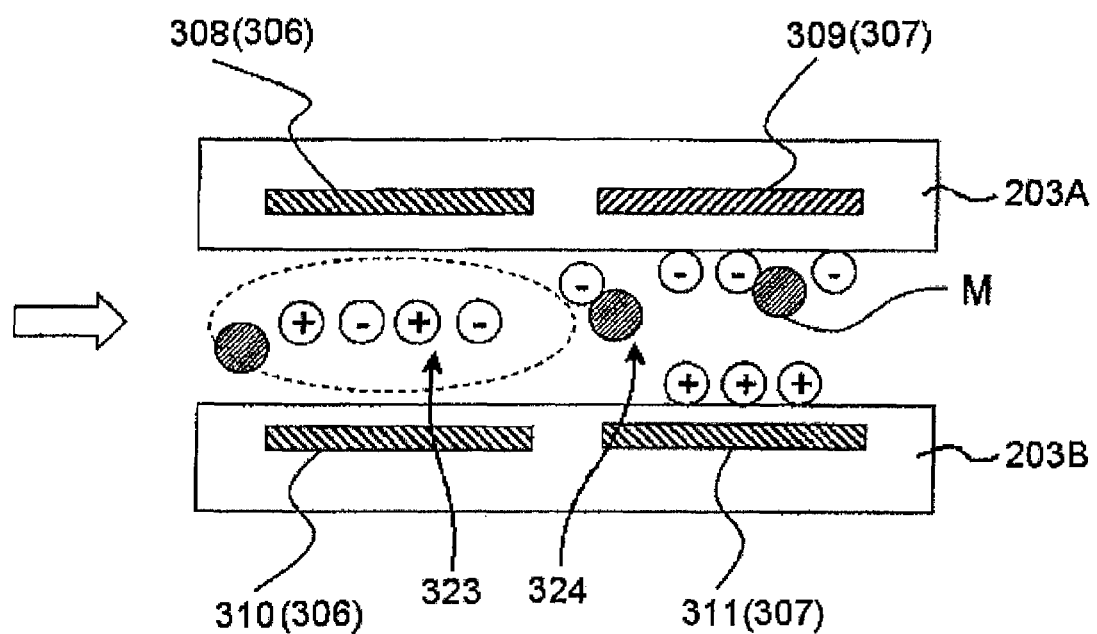
[FIG. 17]

In the dielectric structure 301 according to the present embodiment, by supplying a reference potential to the third electrode 310 and applying an AC voltage between the first electrode 308 and the third electrode 310, a dielectric barrier discharge can be generated between the first electrode 308 and the third electrode 310 in the through hole 205. Further, by supplying a positive DC potential to the second electrode 309 and supplying a negative DC potential to the fourth electrode 311, electrons or cations generated in the region between the first electrode 308 and the third electrode 310 in the through hole 205 can be electrically drawn to the region between the second electrode 309 and the fourth electrode 311 in the through hole 205. For example, a case where a fluid containing a particulate state impurity such as an exhaust gas is supplied from the opening of the through hole 205 on the first electrode 308 and third electrode 310 side will be considered. FIG. 17 is a schematic view for explaining the operation of the dielectric structure in such case. When a fluid containing a particulate state impurity such an exhaust gas is supplied to the through hole 205 from the opening on the first electrode 308 and third electrode 310 side, plasma due to the barrier discharge is generated in a first space 323 of the through hole 205, so the fluid can be reformed by the effects of that plasma. Further, a particulate state impurity M in the fluid can be charged in the vicinity of a second space 324 of the through hole 205, and the charged particulate state impurity M can be electrically adsorbed at the surface on the through hole 205 side of the first base part 203A and second base part 203B. Then, fluid other than the particulate state impurity M is ejected from the opening of the through hole 205 on the second electrode 309 and fourth electrode 311 side. The particulate state impurity M can be removed from the supplied fluid in this way. Note that, which region in the through hole 205 the particulate state impurity M is charged in differs according to the type of the particulate state impurity M and characteristics etc. of the plasma. There also exists a case where it is charged in the first space 323 or second space 324.

As described above, the dielectric structure according to the present embodiment is provided with an electrode group having the first electrode 308, second electrode 309, and third electrode 310. The first electrode 308 and third electrode 310 configure a first electrode pair 306 generating plasma in the first space 323 when an AC voltage is applied. Further, the second electrode 309 and the fourth electrode 311 configure a second electrode pair 307 generating an electric field in the second space 324 when a DC voltage is applied. In other words, the first electrode 308 and third electrode 310 configure a first assembly 306 generating plasma in the first space 323 when an AC voltage is applied. Further, the second electrode 309 and fourth electrode 311 configure a second assembly 307 generating a field in the second space 324 when a DC voltage is applied.

According to the above configuration, the pressure loss of the treated fluid can be reduced, and the particulate state impurity in the treated fluid can be removed with a high efficiency. Further, electrodes 308 of a portion of the first assembly 306 and electrodes 309 of a portion of the second assembly 307 are provided in the first base part 203A, therefore a plasma generator in which the plasma generation part generating plasma and the dust collection part collecting the particulate state impurity are integrally formed can be obtained.

Further, by the dielectric structure according to the present embodiment, electrodes 310 of other portion of the first assembly 306 and electrodes 311 of other portion of the second assembly 307 are provided in the second base part 203B, and the first base part 203A and the second base part 203B are made to face each other, therefore a plasma generator having a plasma generation part generating plasma and a dust collection part collecting the particulate state impurity integrally formed therein and which is more rugged and stable in structure can be obtained.

By the dielectric structure according to the present embodiment, the first electrode 308 to fourth electrode 311 are provided inside the base part 203, therefore it becomes possible to suppress erosion due to the plasma generated by the surface discharge and corrosion due to the fluid supplied into the through hole 205.

Figure 18A:
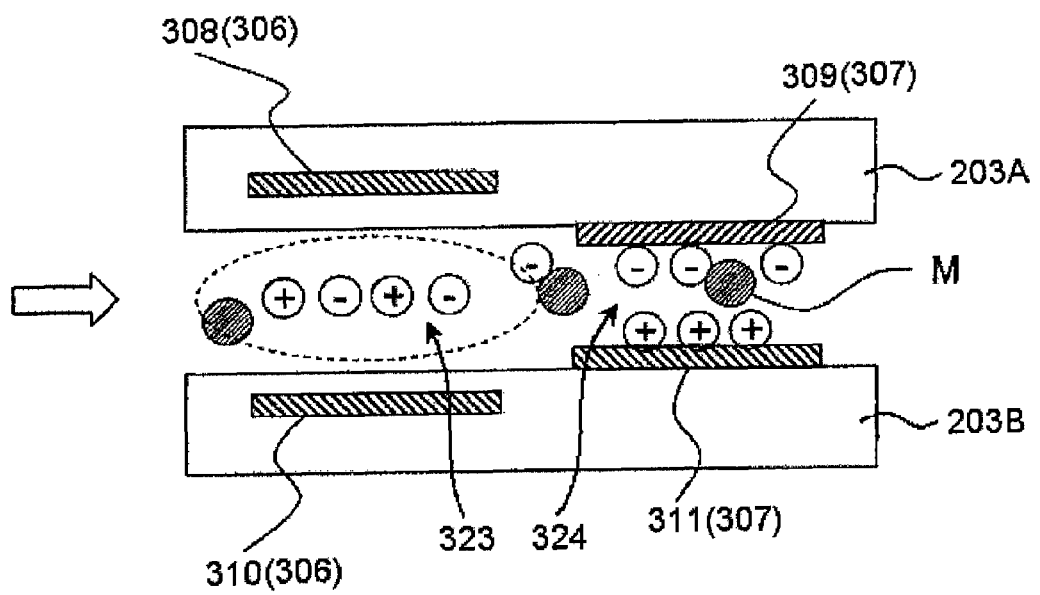
FIGS. 18A and 18B are schematic views for explaining the operation of a modification of the dielectric structure according to the third embodiment.

Note that, as shown in FIG. 18A, the second electrode 309 and fourth electrode 311 may be provided on the surface of the first base part 203A and the surface of the second base part 203B respectively so as to be exposed in the second space 324 formed between the first base part 203A and the second base part 203B as well. Due to this, it becomes possible to generate a stronger electromagnetic field in the space formed between the first base part 203A and the second base part 203B and to more efficiently draw electrons or cations.

Figure 18B:
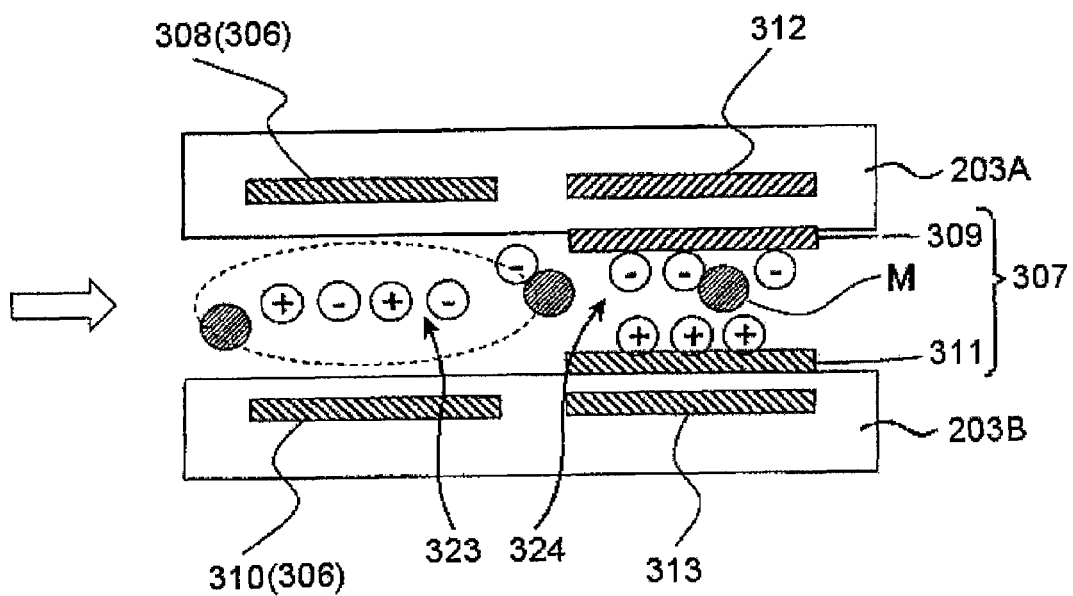

Further, as shown in FIG. 18B, the second electrode 309 and the fourth electrode 311 may be provided on the surface of the first base part 203A and the surface of the second base part 203B respectively, a fifth electrode 312 may be arranged inside the first base part 203A so as to face the second electrode 309, and a sixth electrode 313 may be arranged inside the second base part 203B so as to face the fourth electrode 311 as well. In this case, the reference voltage is supplied to the fifth electrode 312 and the sixth electrode 313, a positive DC voltage is applied between the fifth electrode 312 and the second electrode 309, and a negative DC voltage is applied between the sixth electrode 313 and the fourth electrode 311. Due to this, the DC voltage between the second electrode 309 and the fourth electrode 311 can be stabilized more.

End sections of the first electrode 308, second electrode 309, third electrode 310, and fourth electrode 311 each are led to the vicinity of the outer surface of the base member 202 and are directly connected to the external terminals 215, 216, 214, and 217 or electrically connected to these through auxiliary conductors. The materials and production method of the first electrode 308, third electrode 310, second electrode 309, and fourth electrode 311 are the same as the materials and production method of the first electrode 8 etc. of the first embodiment.

Then, if the high potential side power supply terminal of the external AC power supply is electrically connected to the external terminal 215 by pressure welding or bonding or another means, and the reference voltage side power supply terminal is electrically connected to the external terminal 214 by pressure welding or bonding or another means to apply voltages, a dielectric barrier discharge can be generated between the first electrode 308 and third electrode 310 in the through hole 205 (first space 323). Further, if voltages are applied by electrically connecting the positive high potential side power supply terminal of the external DC power supply to the external terminal 217 by pressure welding or bonding or another means and electrically connecting the negative high voltage side power supply terminal to the external terminal 216 by pressure welding or bonding or another means, electrons or cations generated between the first electrode 308 and the third electrode 310 in the through hole 205 are electrically drawn to the region in the vicinity of the second electrode 309 and fourth electrode 311 (second space 324), so the region in the vicinity of the second electrode 309 and fourth electrode 311 can be electrically charged positive or negative.

Note that, the operation of the dielectric structure 301 in the case where the fluid is supplied to the through hole 205 was explained for the case where the second electrode 309 and fourth electrode 311 were provided inside the base part 203. However, this is true also for a case where the second electrode 309 and fourth electrode 311 are provided at the surface of the base part 203, and a case where the second electrode 309 and fourth electrode 311 are provided at the surface of the base part 203, and a fifth electrode 312 and a sixth electrode 313 are provided inside the base part 203 as shown in FIG. 18B.

The production method of the fifth electrode 312 and sixth electrode 313 and the connection method of the fifth electrode 312 and sixth electrode 313 with respect to the base parts 203 and external terminals may be the same as those of the other first electrode 308 to fourth electrode 311.

Figure 19:
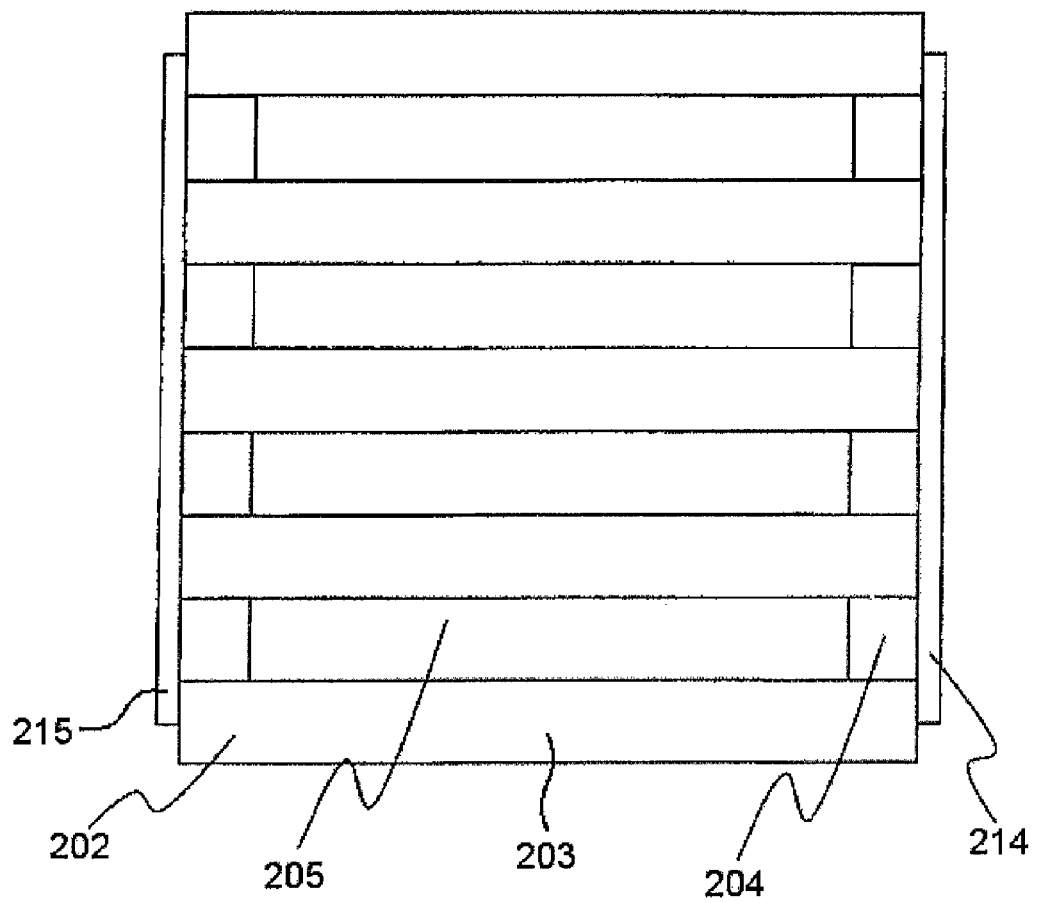
[FIG. 19]

Further, in the dielectric structure according to the present embodiment, as shown in FIG. 19, preferably a plurality of through holes 205 exist. The base member 202 of this modification is configured by a laminate of a large number of base parts 203. Further, the external terminals 214 and 215 are formed to a length in accordance with the number of the base parts 203 stacked. Due to the existence of a plurality of through holes 205, the amount of the fluid which can be supplied to the dielectric structure can be increased, and the pressure loss of the fluid can be reduced.

Figure 20:
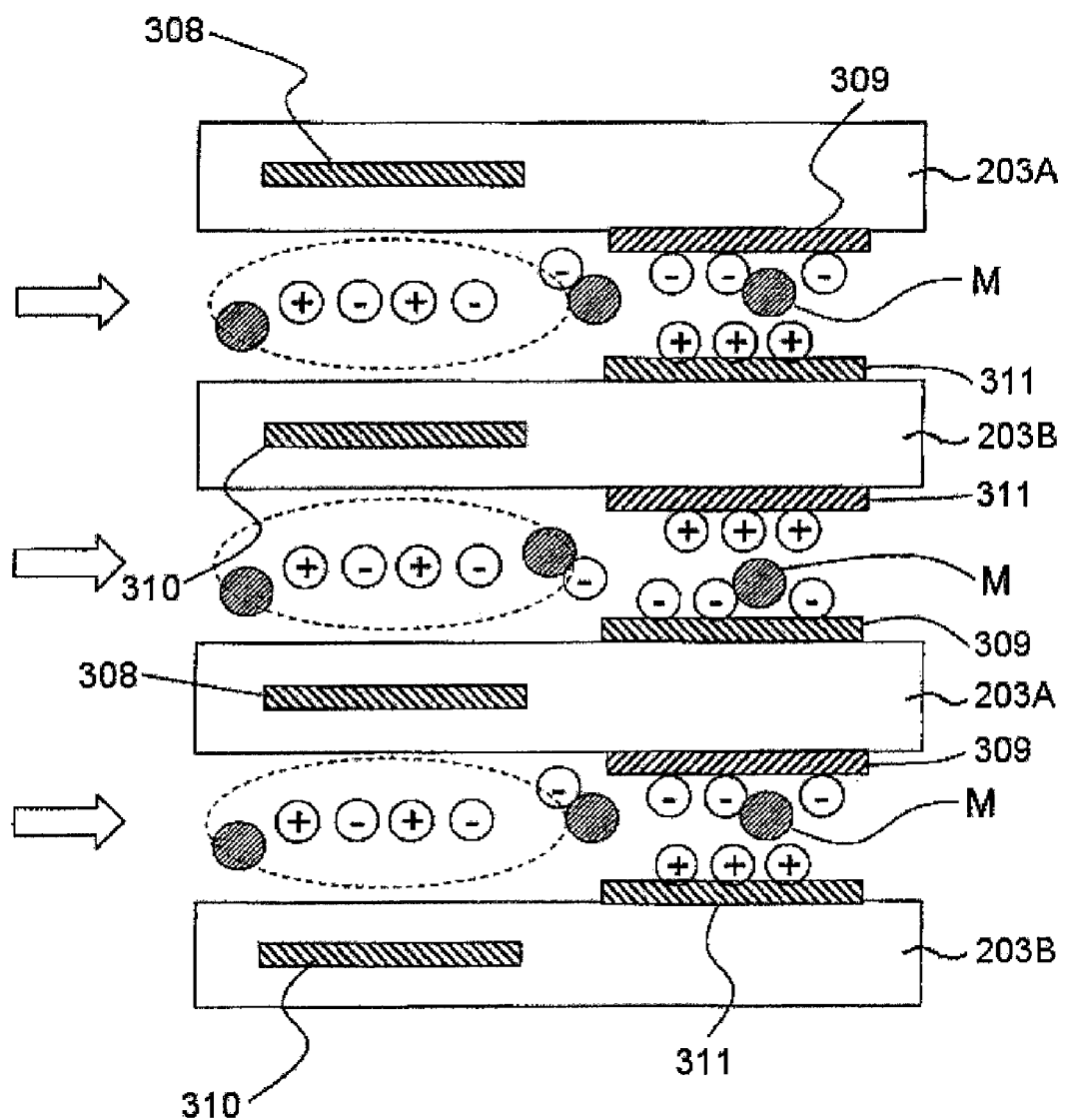
[FIG. 20]

Note that, when the second electrode 309 and fourth electrode 311 are provided an the surface of the first base part 203A and the surface of the second base part 203B respectively, as shown in FIG. 20, in the first base part 203A other than the end section, desirably the second electrodes 309 are provided at surfaces facing the two base parts 203B adjacent to that first base part 203A. Then, in the second base part 203B other than the end section, desirably the fourth electrodes 311 are provided at surfaces facing the two first base parts 203A adjacent to that second base part 203B. Due to this, it becomes possible to reform the fluid in all through holes 205 of the dielectric structure, therefore the reforming efficiency can be improved more.

The base parts 203 were formed in flat plate shapes. However, the base parts 203 may be curved plate shapes, further, the base parts 203 do not have to have the same shape as long as a flow passage in which the fluid flows can be formed between the base parts 203.

(Fourth Embodiment)

Figure 21:
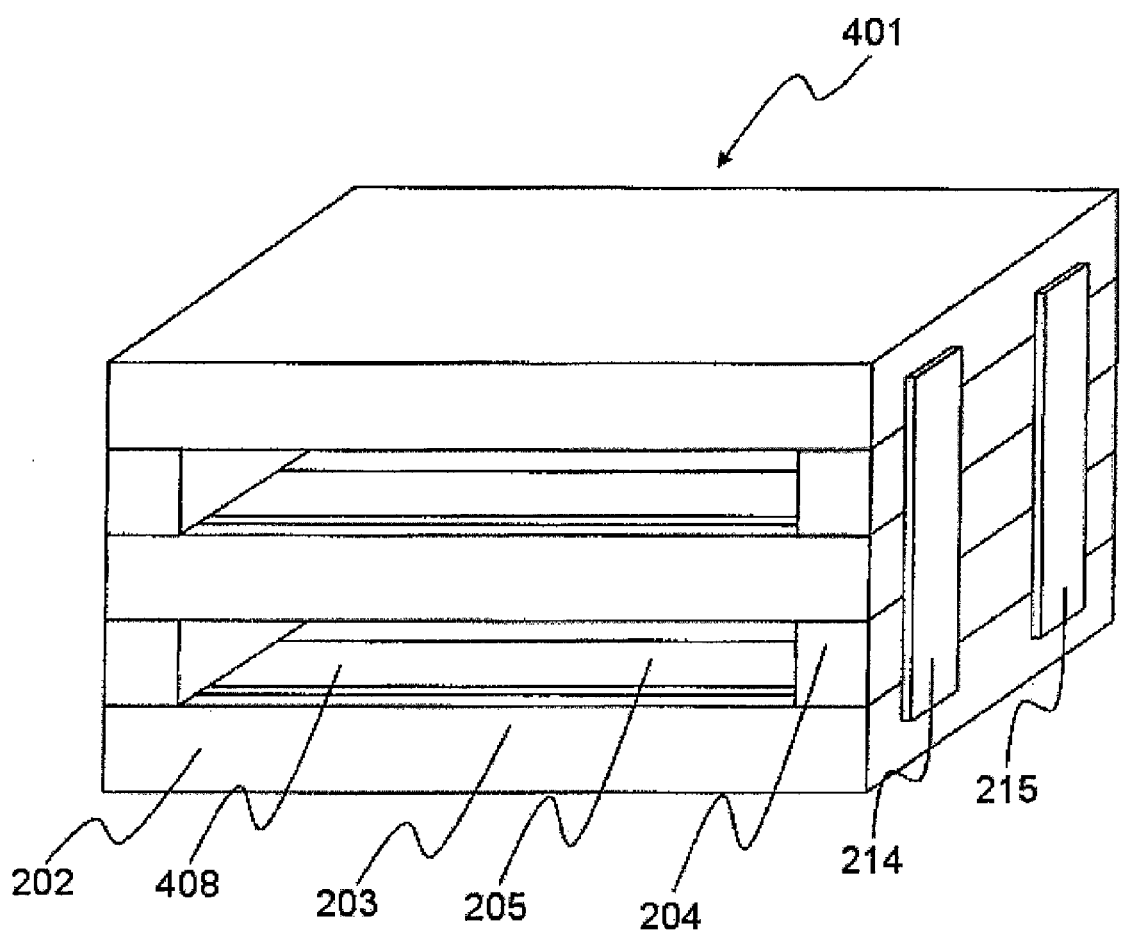
[FIG. 21]
Figure 22A:
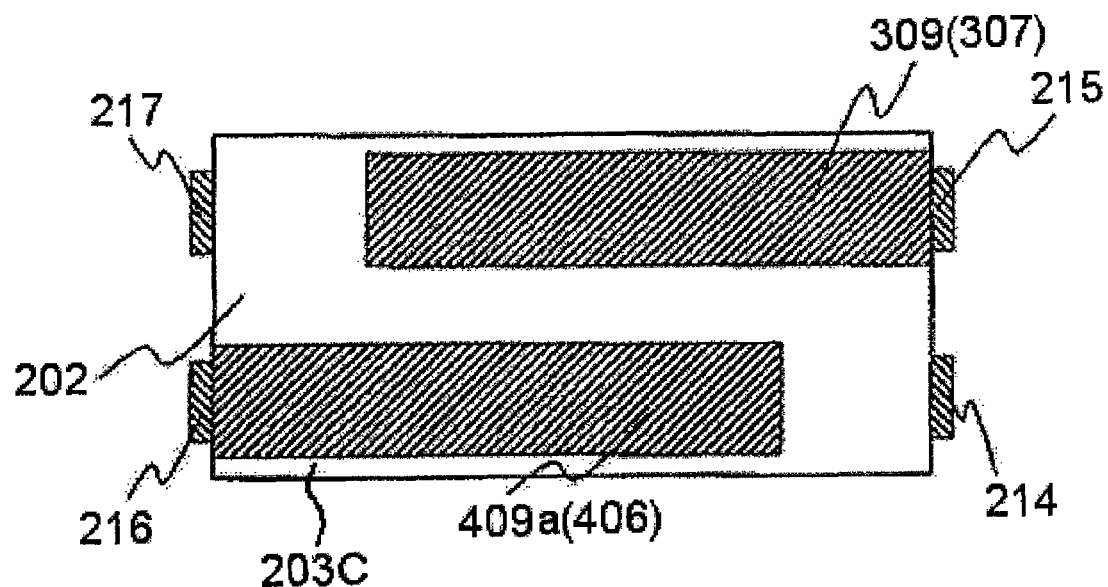
FIG. 22A is a cross-sectional view corresponding to the XII-XII line of FIG. 7A in the fourth embodiment.
Figure 22B:
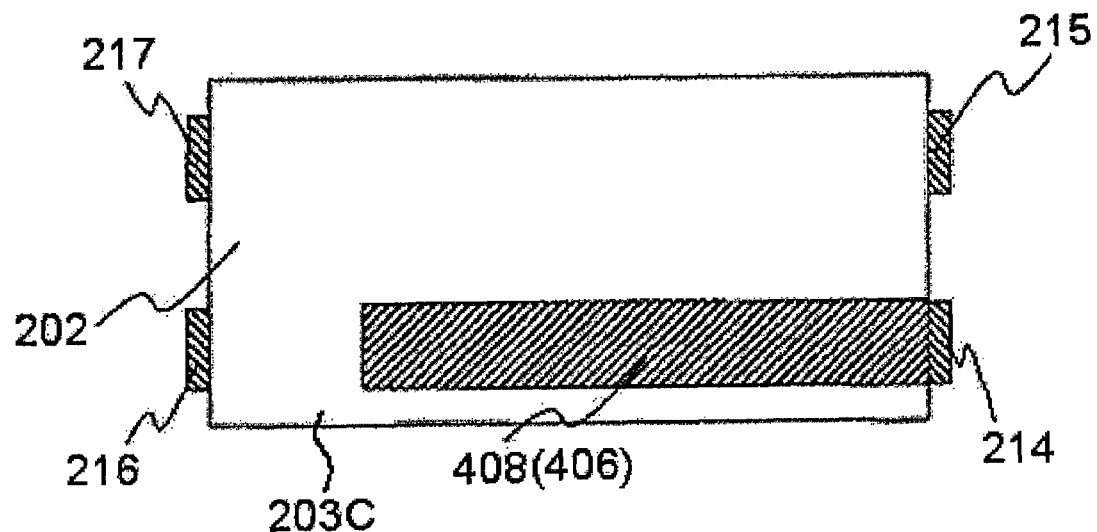
FIG. 22B is a cross-sectional view corresponding to the XXIIb-XXIIb line of FIG. 7A in the fourth embodiment.
Figure 23A:
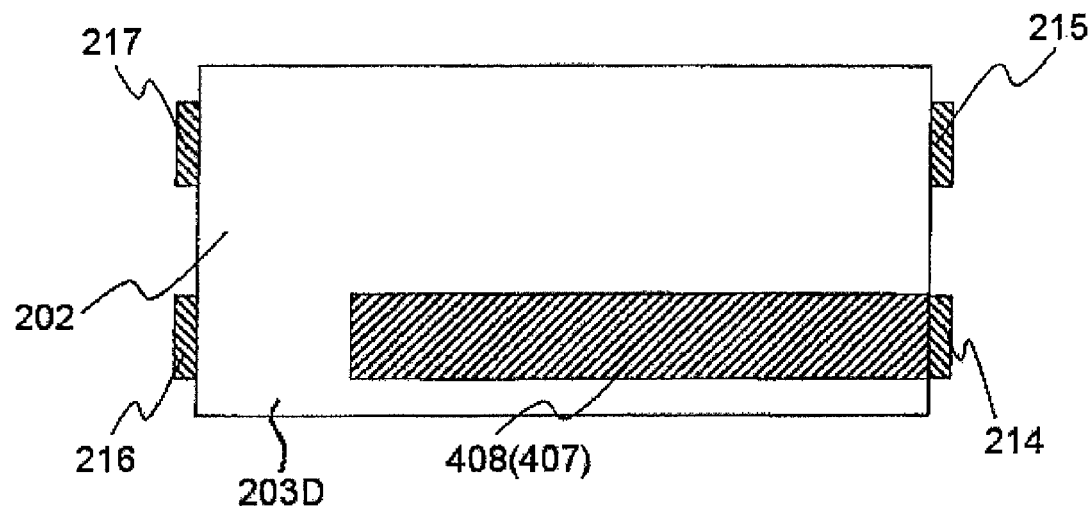
FIG. 23A is a cross-sectional view corresponding to the IX-IX line of FIG. 7A in the fourth embodiment.
Figure 23B:
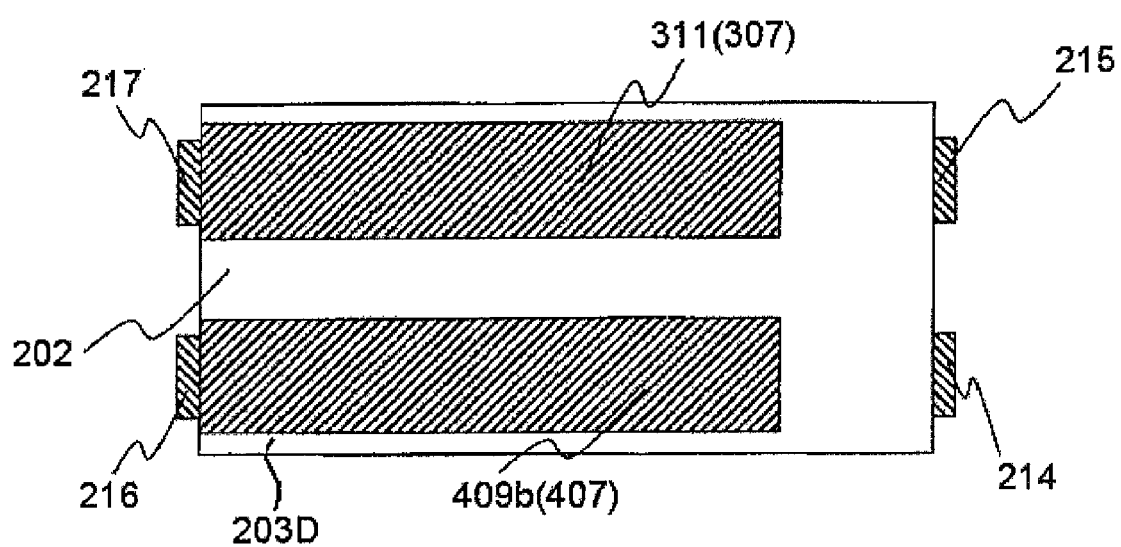
FIG. 23B is a cross-sectional view corresponding to the VIII-VIII line of FIG. 7A in the fourth embodiment.

FIG. 21 is a perspective view showing an example of the configuration of a dielectric structure 401 according to a fourth embodiment of the present invention. Note that, the side view of the dielectric structure 401 is the same as the side view (FIG. 7A) of the dielectric structure 201 according to the second embodiment, so illustration is omitted. Further, the plan view of the dielectric structure 401 is the same as the plan view (FIG. 14) of the dielectric structure 301 according to the third embodiment, so illustration is omitted. Note that, in the present embodiment, when referring to FIG. 7A, please replace notation 214 with notation 216 and replace notation 215 with notation 214 when viewing them. Further, when referring to FIG. 14, please replace notation 214 and notation 216 with each other, and replace notation 215 and notation 217 with each other when viewing them.

The dielectric structure 401 according to the fourth embodiment has a structure where a second electrode 409 is provided at the surface contacting the through hole 205 of the dielectric structure 301 according to the third embodiment when concerning the structure as grasped from its appearance.

Figure 24A:
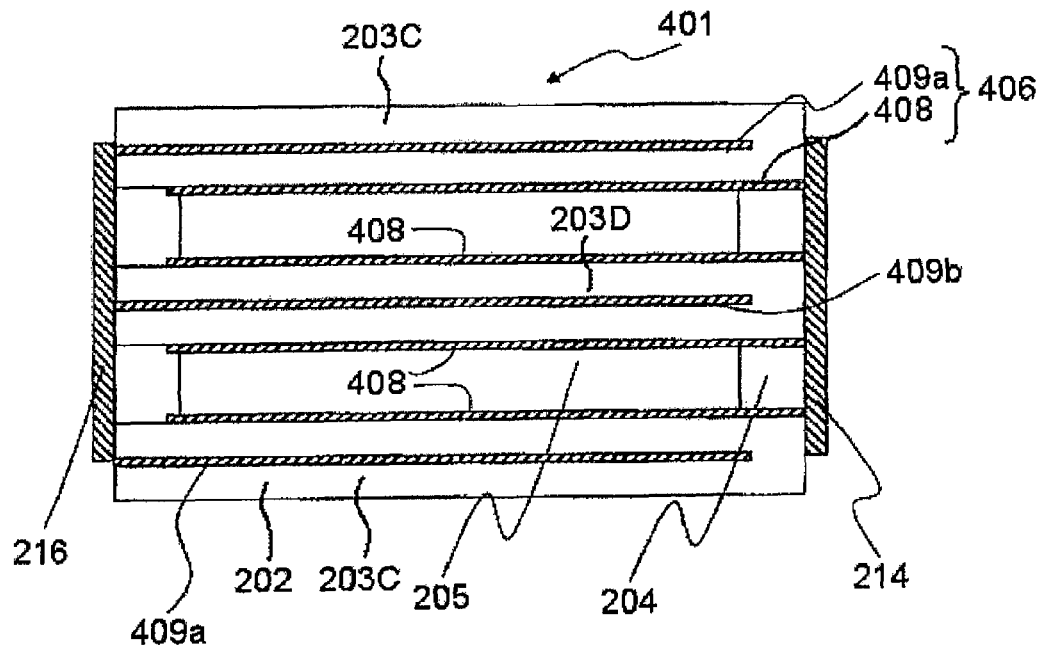
FIG. 24A is a cross-sectional view corresponding to the XVIa-XVIa line of FIG. 14 in the fourth embodiment.
Figure 24B:
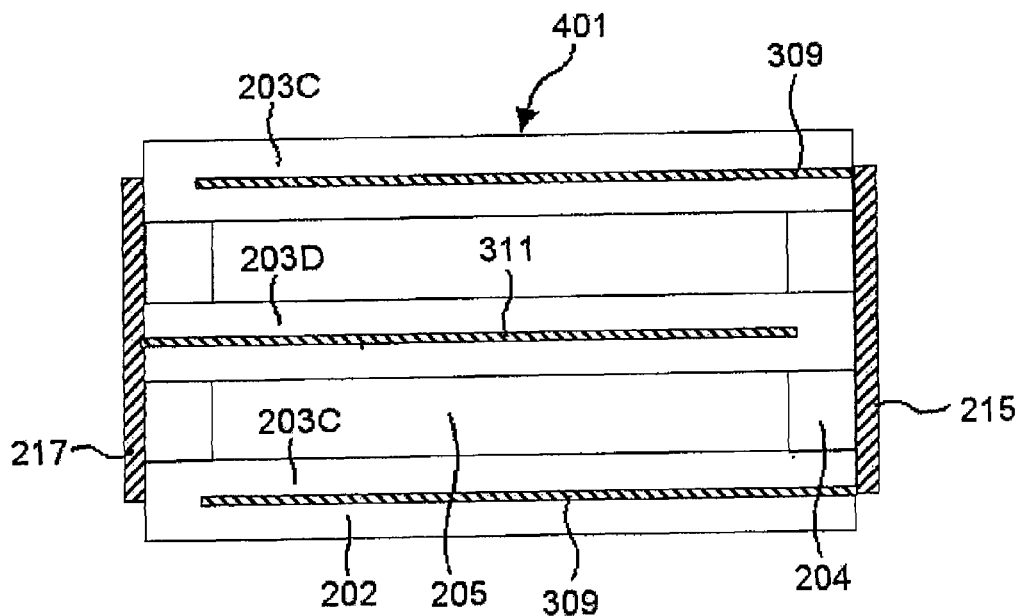
FIG. 24B is a cross-sectional view corresponding to the XVIb-XVIb line of FIG. 14.

At the surface and inside of the base part 203, a first electrode 408, second electrode 309, third electrodes 409a and 409b (hereinafter, a and a are sometimes omitted), and a fourth electrode 311 are arranged. Specifically, inside the base part 203, the first electrode 408, third electrode 409, and fourth electrode 311 are arranged, while the first electrode 408 is arranged at the surface. As shown in FIG. 24, on one opening section side of the through hole 205, the third electrodes 409a and 409b are arranged inside the base part 203 and face each other across the hole 205. Further, in the base part 203 having the third electrode 409a provided in its internal portion (in the present embodiment, for convenience, referred to as a "first base part 203C" dielectric), and in the base part 203 having a third electrode 409b provided in its internal portion (in the present embodiment, for conductive, referred to as a "second base part 203D"), the first electrode 408 is provided at the surface on the space (through hole 205) side formed between the first base part 203C and the second base part 203D. Here, the first electrode 408 provided at the surface of the first base part 203C is provided so as to face the third electrode 409a, and the first electrode 408 provided at the surface of the second base part 203D is provided so as to face the third electrode 409b.

Figure 25:
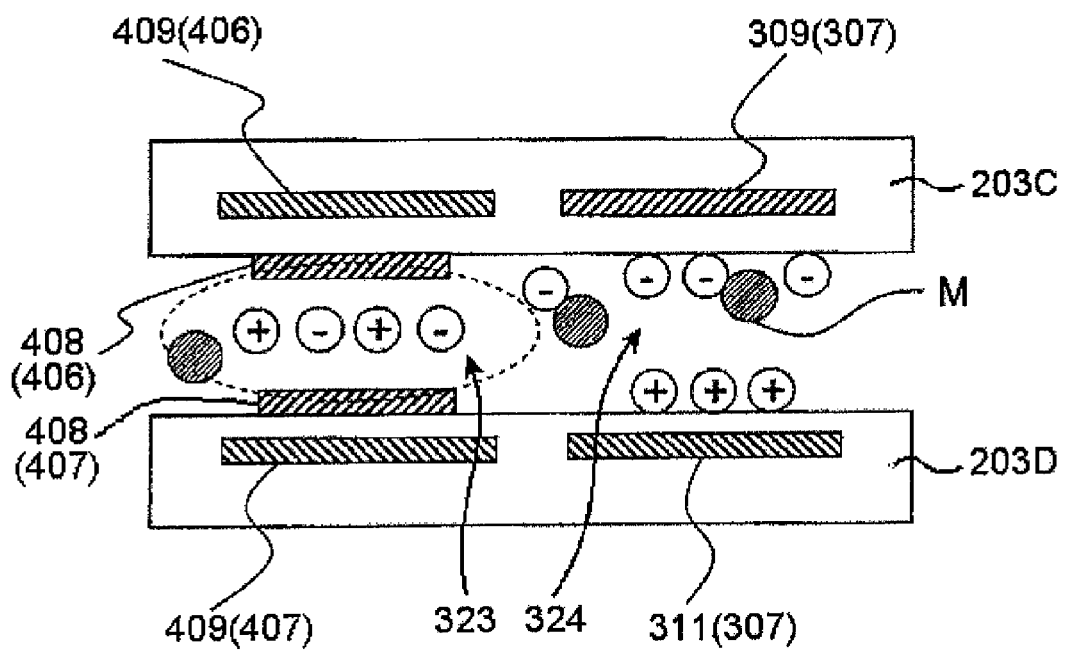
[FIG. 25]

In the dielectric structure according to the present embodiment, by supplying the reference potential to the third electrodes 409a and 409b and supplying an AC high potential to the first electrode 408, a surface discharge can be generated from the vicinity of an edge section of the first electrode 408. The actions of the third electrode 309 and fourth electrode 311 are the same as those of the third embodiment. Accordingly, as shown in FIG. 25, in the same way as the third embodiment, the fluid can be reformed in the first space 323, and the charged particulate state impurity M in the fluid can be removed in the second space 324.

As described above, the dielectric structure according to the present embodiment is provided with an electrode group having a first electrode 408, second electrode 409, and third electrode 410. One set of first electrode 408 and third electrode 409 configure a first electrode pair 406 or third electrode pair 407 generating plasma in the first space 323 when an AC voltage is applied. Further, in the same way as the third embodiment, the third electrode 309 and fourth electrode 311 configure a second electrode pair 307 generating an electric field in the second space 324 when a DC voltage is applied. In other words, one set of a first electrode 408 and third electrode 409 configure a first assembly 406 or third assembly 407 generating plasma in the first space 323 when an AC voltage is applied. Here, the third assembly 407 is an assembly generating a plasma in the first space 323, and preferably faces the first assembly 406 while sandwiching the first space 323 therebetween. Further, in the same way as the third embodiment, the third electrode 309 and fourth electrode 311 configure the second assembly 307 causing an electric field in the second space 324 when a DC voltage is applied.

According to the above configuration, the pressure loss of the treated fluid can be reduced, and the particulate state impurity in the treated fluid can be removed with a high efficiency. Further, by disposing the third electrodes 309 of the first assembly 406 and second assembly 407 in one base part 203, a plasma generator in which the plasma generation part generating plasma and the dust collection part collecting the particulate state impurity are integrally formed can be obtained.

Figure 26:
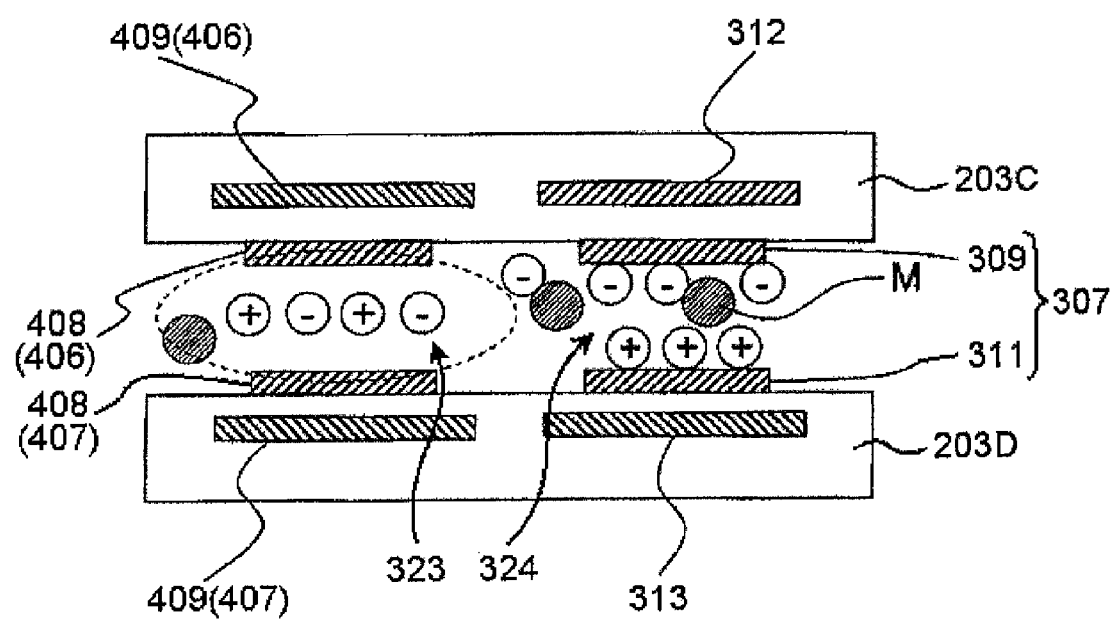
[FIG. 26]

Note that, in the same way as FIG. 18A of the third embodiment, the third electrode 309 and fourth electrode 311 may be provided at the surface of the base part 203 as well. In addition, as shown in FIG. 26, in the same way as FIG. 18B of the third embodiment, the fifth electrode 312 and the sixth electrode 313 may be provided as well.

Figure 27A:
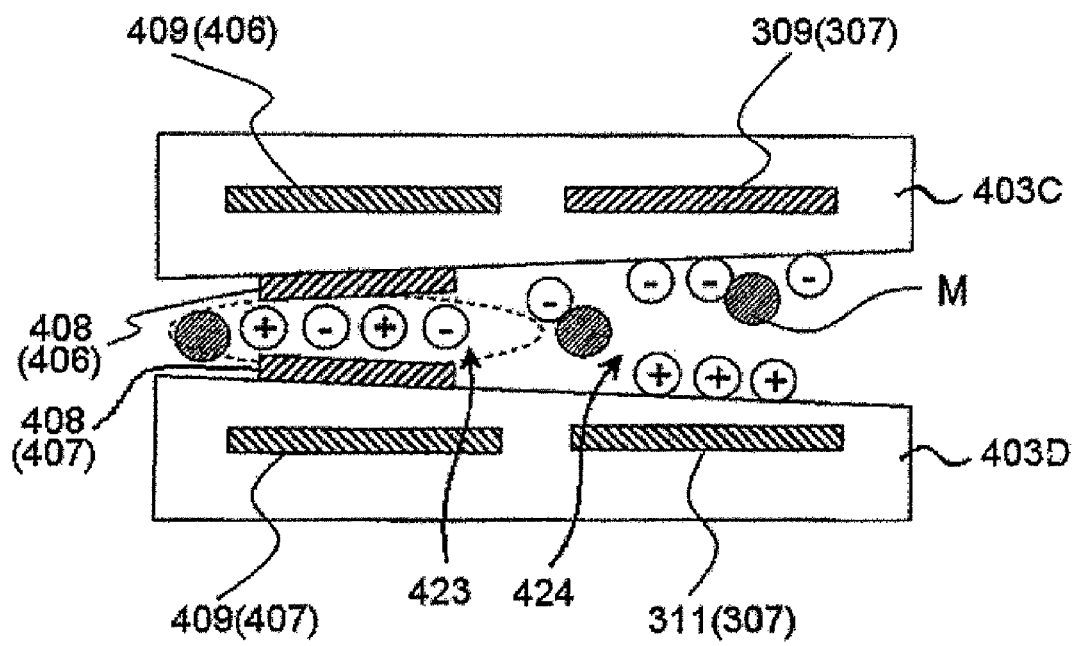
FIGS. 27A and 27B are diagrams showing another modification of the dielectric structure according to the fourth embodiment.
Figure 27B:
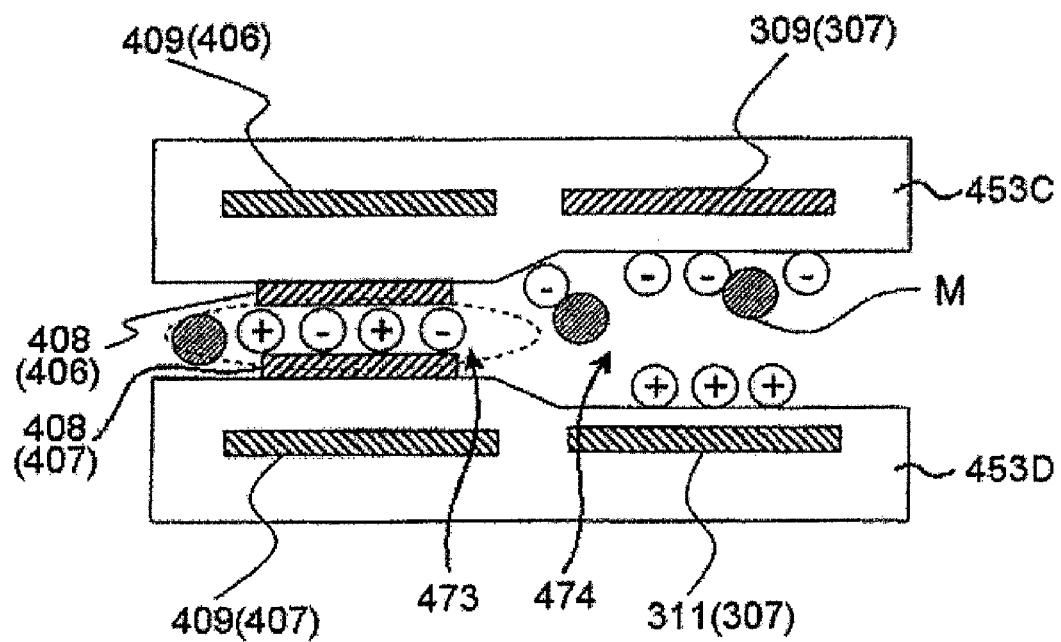

Further, in the dielectric structure according to the present embodiment, the distance between electrodes facing each other across the through hole 205 can be made constant by the distance between the first base part 203C and the second base part 203D being constant, so the discharge can be stabilized. Further, as shown in FIG. 27A, the surface of the first base part 403C and the surface of the second base part 403D may be inclined from one opening side of the through hole 205 toward the other opening as well. Further, as shown in FIG. 27B, at least a portion between the region provided with the first electrode 408 and the region facing the third electrode 309 at the surface on the through hole 205 side of the first base part 403C may be inclined, and at least a portion between the region provided with the first electrode 408 and the region facing the fourth electrode 311 at the surface on the through hole 205 side of the second base part 403D may be inclined as well. In this way, by giving inclination to the surface of the base part by making a cross-sectional area of the cross-section vertical to an alignment direction from the first space 323 to the second space 324 in the second space 324 larger than the cross-sectional area of the same cross-section of the first space 323, flow of the fluid becomes easy along the inclined surface, therefore the fluid can be efficiently flown inside the through hole 205. Note that, even in these cases, the third electrode 309 and fourth electrode 311 may be provided at the surface of the base part as well. Further, the fifth electrode 312 and sixth electrode 313 may be provided as well.

Further, as shown in FIG. 27, in a case where steps are formed at the surface of the base part by inclination of a portion of the surface of the base part, a catalyst may be provided at the surface of that step portion as well. In the step portion, the fluid tends to stop, therefore the substance in the fluid can be reacted with the catalyst at that time, and the fluid can be reformed.

Figure 28:
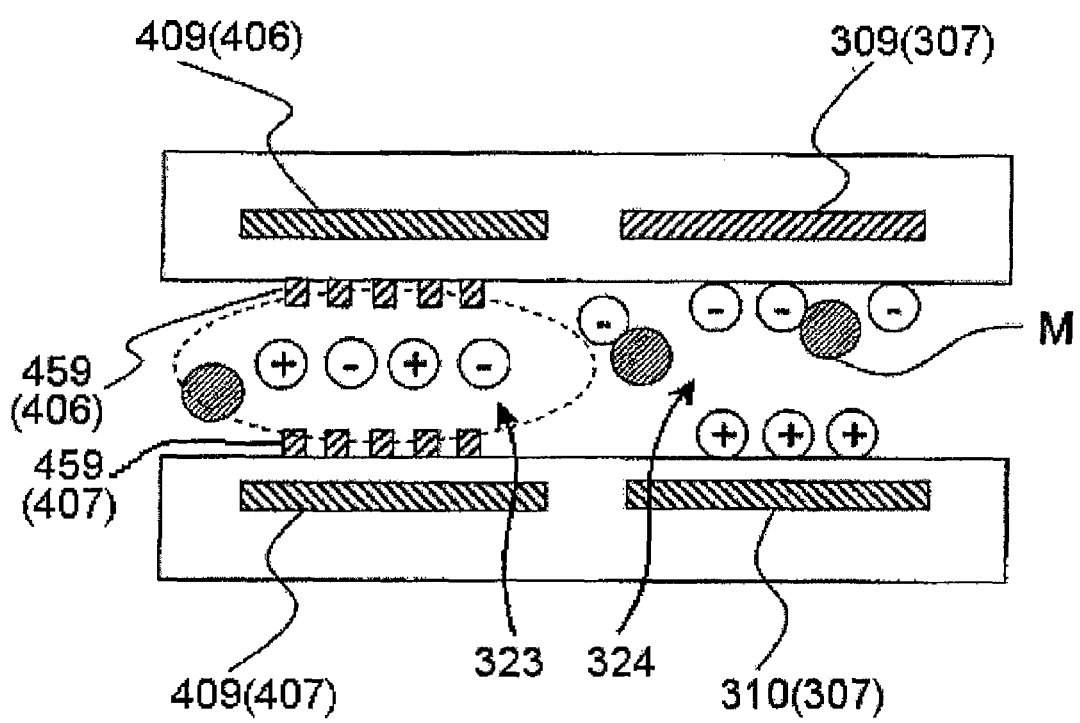
[FIG. 28]

Further, as shown in FIG. 28, by configuring the system so that a plurality of first electrodes 459 obtained by separating the first electrode 408 are arranged, edge sections of conductors in the insulation region between dielectric members can be increased, therefore the surface discharge can be generated with a high efficiency.

The end sections of the first electrode 408, second electrode 309, third electrode 409, and fourth electrode 311 are led up to the vicinity of the outer surface of the base member 202 and are directly connected to the corresponding external terminals 214, 215, 216, and 217 or electrically connected to those through auxiliary conductors. The materials and production methods of the first electrode 408, second electrode 309, third electrode 409, and fourth electrode 311 are the same as the material and production method of the first electrode 8 etc. of the first embodiment.

Then, when voltages are applied by electrically connecting the reference voltage side power supply terminal of the external AC power supply to the external terminal 216 by pressure welding or bonding or another means and electrically connecting the high potential side power supply terminal to the external terminal 214 by pressure welding or bonding or another means, a surface discharge can be generated in the region in the vicinity of the first electrode 408. Further, when voltages are applied by electrically connecting the positive high potential side power supply terminal of the external DC power supply to the external terminal 215 by pressure welding or bonding or another means and electrically connecting the negative high voltage side power supply terminal to the external terminal 217 by pressure welding or bonding or another means, electrons or cations generated in the region in the vicinity of the first electrode 408 can be electrically drawn to the region in the vicinity of the second electrode 309 and fourth electrode 311, the surface region of the first member in the vicinity of the second electrode 309 can be electrically charged negative, and the surface region of the second dielectric in the vicinity of the fourth electrode 311 can be electrically charged to positive.

Figure 29:
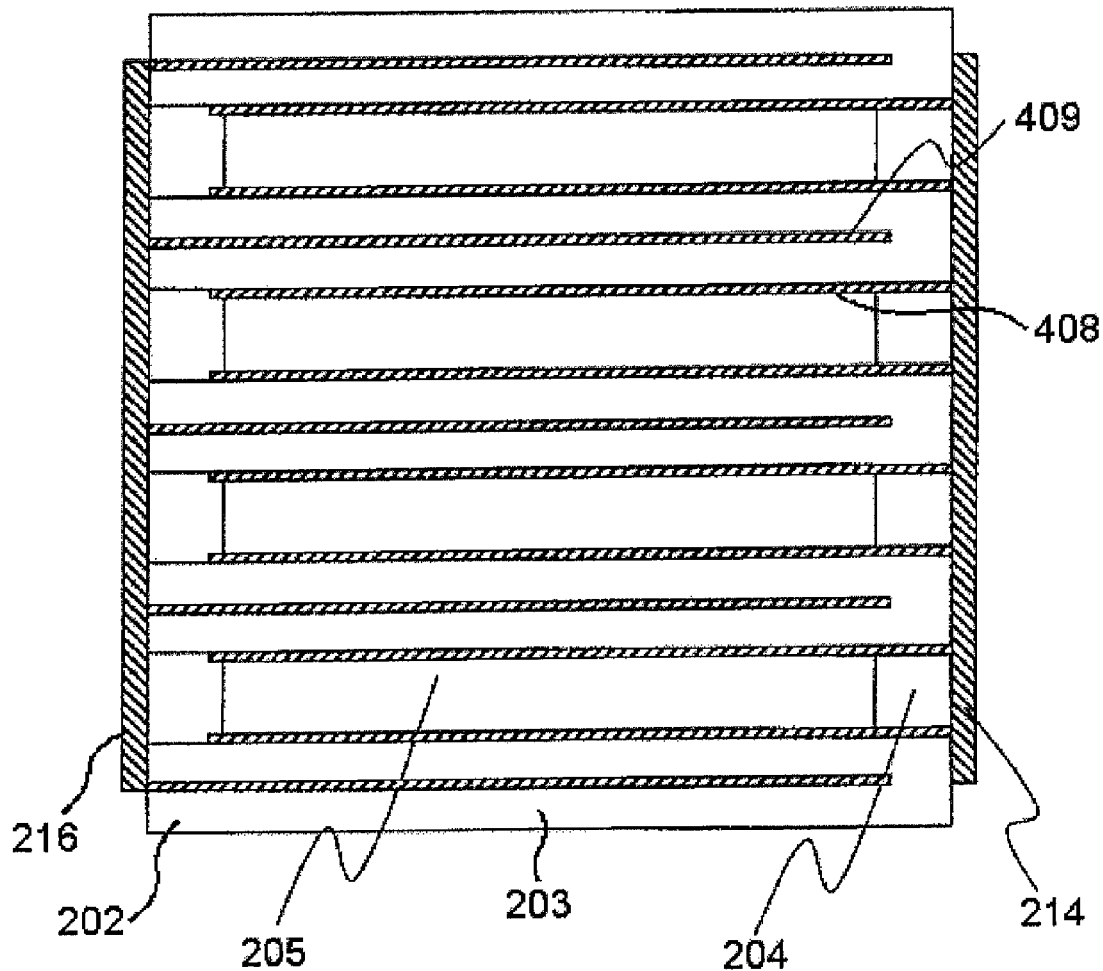
[FIG. 29]

In the dielectric structure 401 according to the present embodiment, as shown in FIG. 29, preferably there are a plurality of through holes 205. By provision of the plurality of through holes 205, the amount of the fluid which can be supplied to the dielectric structure 1 can be increased, and the pressure loss of the fluid can be reduced.

Figure 30:
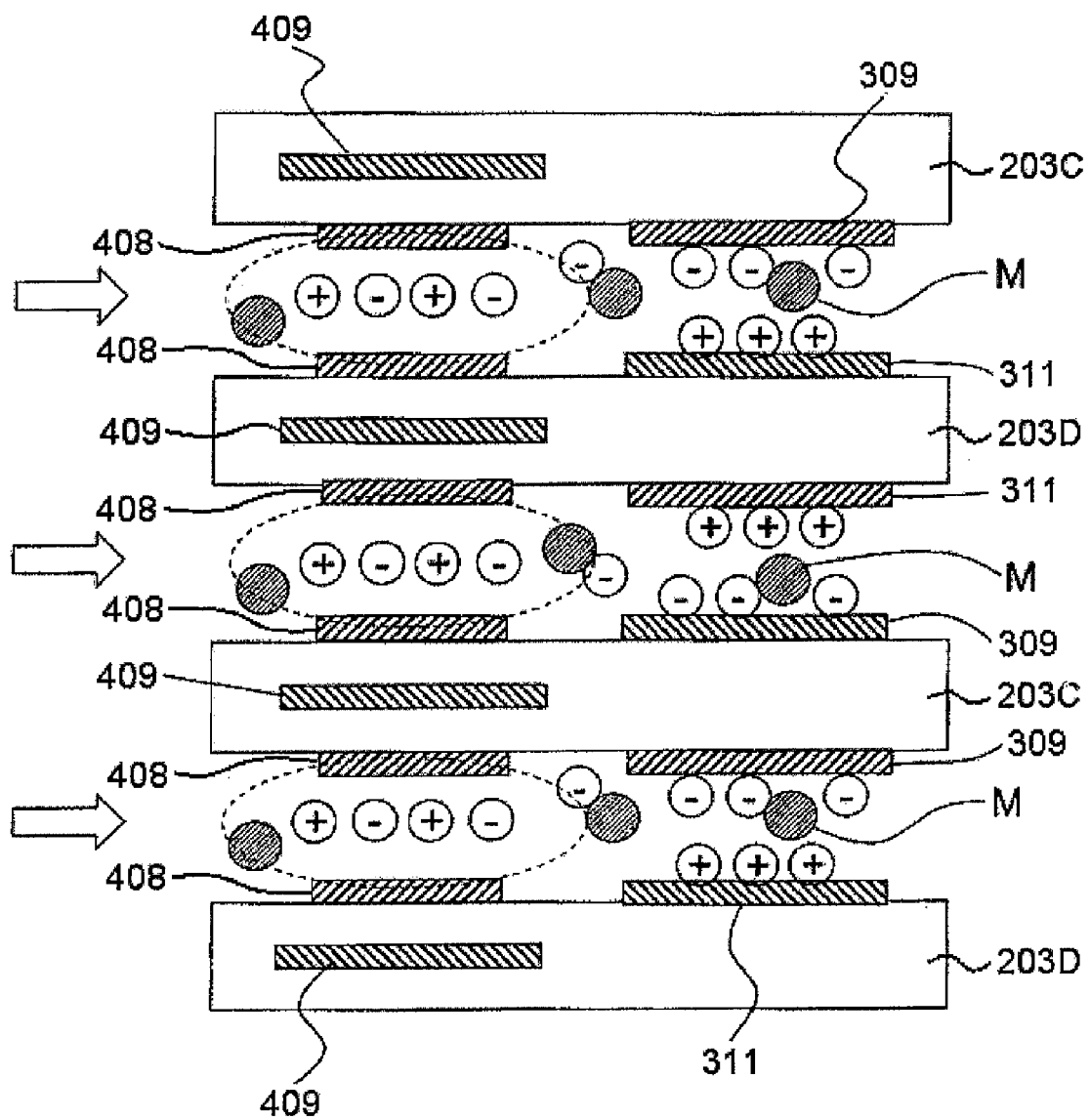
[FIG. 30]

Note that, in each base part 203, a first electrode 408 is provided at each surface facing a base part 203 adjacent to this base part 203. Therefore, at the base parts 203 other than the end sections, first electrodes 408 are provided at the surfaces facing two adjacent base parts 203. Further, when second electrodes 409 and fourth electrodes 311 are respectively provided at the surfaces of the first base parts 203C and at the surfaces of the second base parts 203D, as shown in FIG. 30, in the first base parts 203C other than the end sections, the second electrodes 409 may be provided at the surfaces facing two second base parts 203D which are adjacent to the first base parts 203C, and in the second base parts 203D other than the end sections, the fourth electrodes 311 may be provided at the surfaces facing two first base parts 203C which are adjacent to the second base parts 203D. Due to this, it becomes possible to reform the fluid in all through holes 205 of the dielectric structure, therefore the reform efficiency can be improved more.

Note that, as shown in FIG. 29 and FIG. 30, when there are a plurality of through holes 205, the configuration becomes one where the first electrode 409 is shared by the first assembly and the third assembly in the base parts 203 other than the end sections. Due to this, the dielectric structure can be reduced in size. Note, the first assembly and the third assembly may individually have the first electrodes 409 as well.

(Fifth Embodiment)

Figure 31:
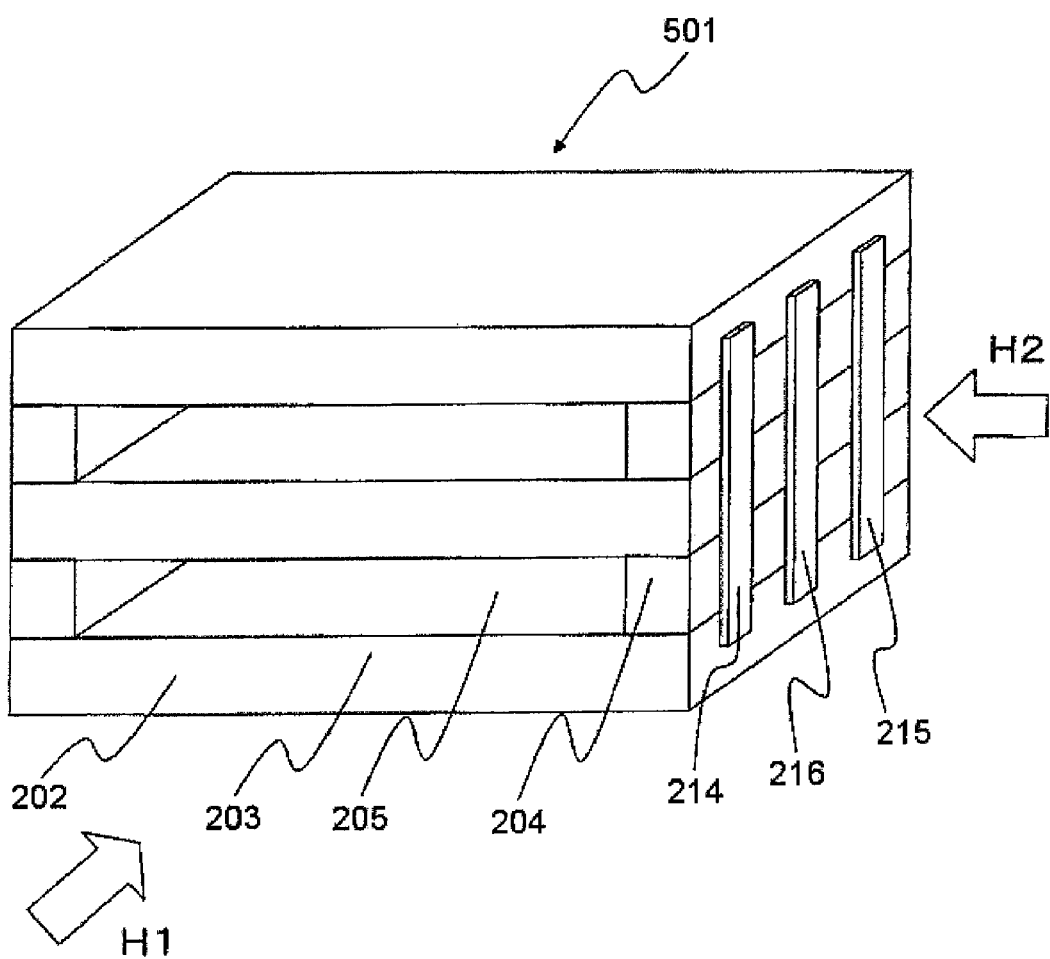
[FIG. 31]
Figure 32:
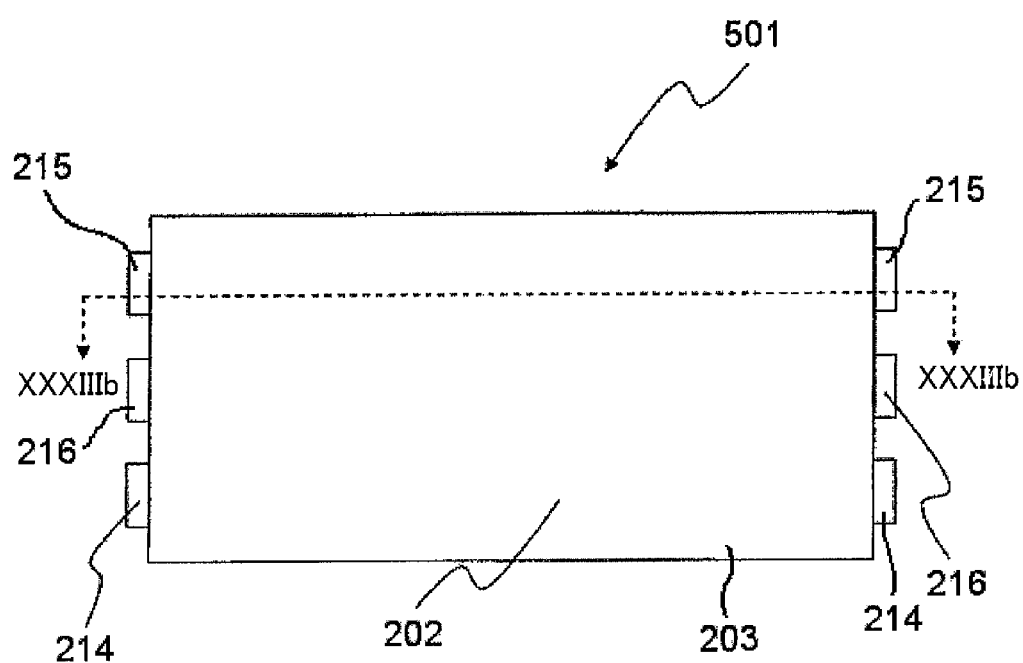
[FIG. 32]

FIG. 31 is a perspective view showing an example of the configuration of a dielectric structure 501 according to a fifth embodiment of the present invention. FIG. 32 is a top view of the dielectric structure of FIG. 31. The view of the dielectric structure 501 seen from the H1 side (side view) is the same as FIG. 7A, so illustration is omitted. Note that, in the present embodiment, when referring to FIG. 7A, please replace notation 215 with notation 214 when viewing it.

The dielectric structure 501 has a bass member 202 in the same way as the second embodiment etc. The arrangement of the external terminals 214, 215, and 216 differs from the second embodiment. These are arranged at each of two surfaces which become sideward with respect to the through holes 205 in an order of the external terminals 214, 216, and 215.

Figure 33A:
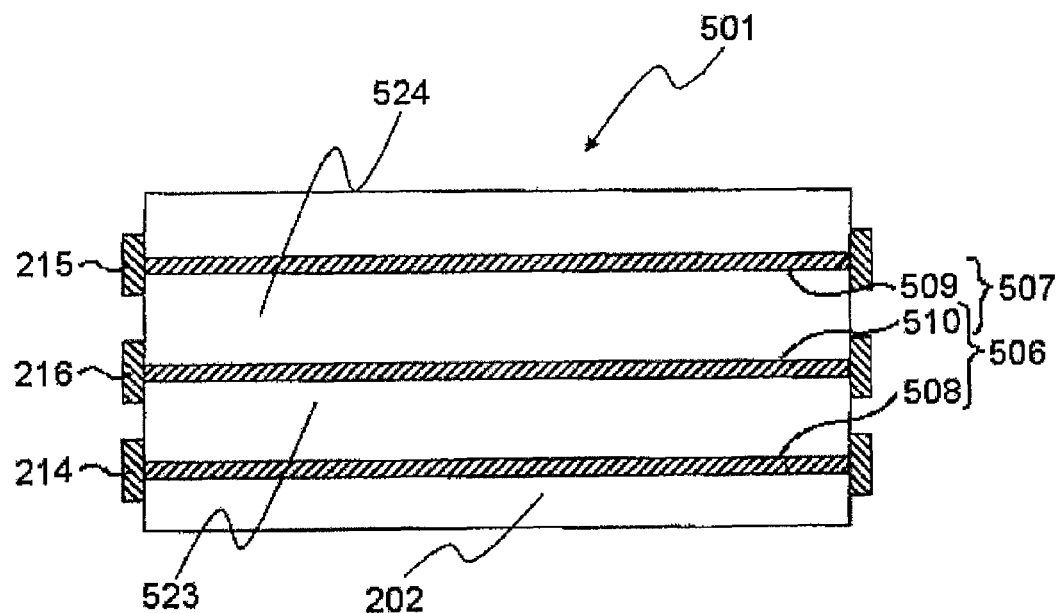
FIG. 33A is a cross-sectional view corresponding to the VIII-VIII line of FIG. 7A in the fifth embodiment.
Figure 33B:
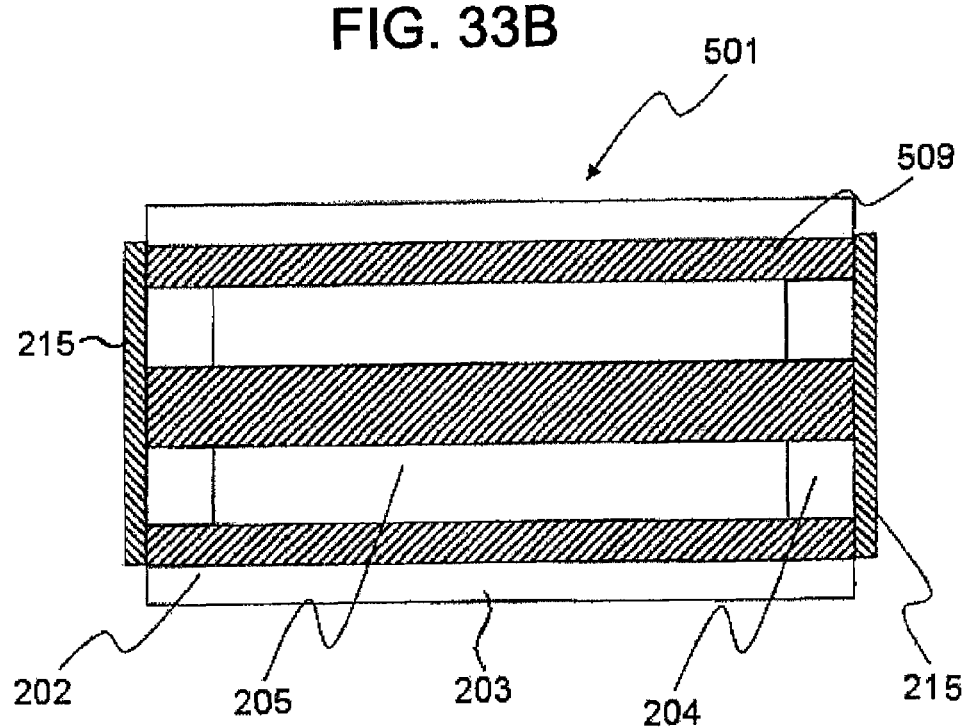
FIG. 33B is a cross-sectional view taken along an XXXIIIb-XXXIIIb' line of FIG. 32.

FIG. 33A is a cross-sectional view corresponding to a VIII-VIII line of FIG. 7A in the fifth embodiment. FIG. 33B is a cross-sectional view taken along an XXXIIIb-XXXIIIb line of FIG. 32.

In the internal portion of each base part 203, a first electrode 508 to third electrode 510 are arranged. In the internal portion of each base part 203, the first electrode 508 to third electrode 510 are provided in a line along a predetermined direction from one opening side of the through hole 205 in an order of the first electrode 508, third electrode 510, and second electrode 509. The first electrode 508 to third electrode 510 are flat plate shaped. Their outer edge sections are partially arranged along the surface on the through hole 205 side of the base part 203. Here, a portion of the outer edge sections of the first electrode 508 to third electrode 510 is exposed in the through hole of the base part 203, but may be arranged inside the base part 203 as well. Note that, FIG. 33B is a cross-sectional view at the time of cutting for the second electrode 509 and external terminal 215. This is also true for the cross-sectional view at the time of cutting for the first electrode 508 and external terminal 214 and the cross-sectional view at the time of cutting for the third electrode 510 and external terminal 216 as well.

Figure 34:
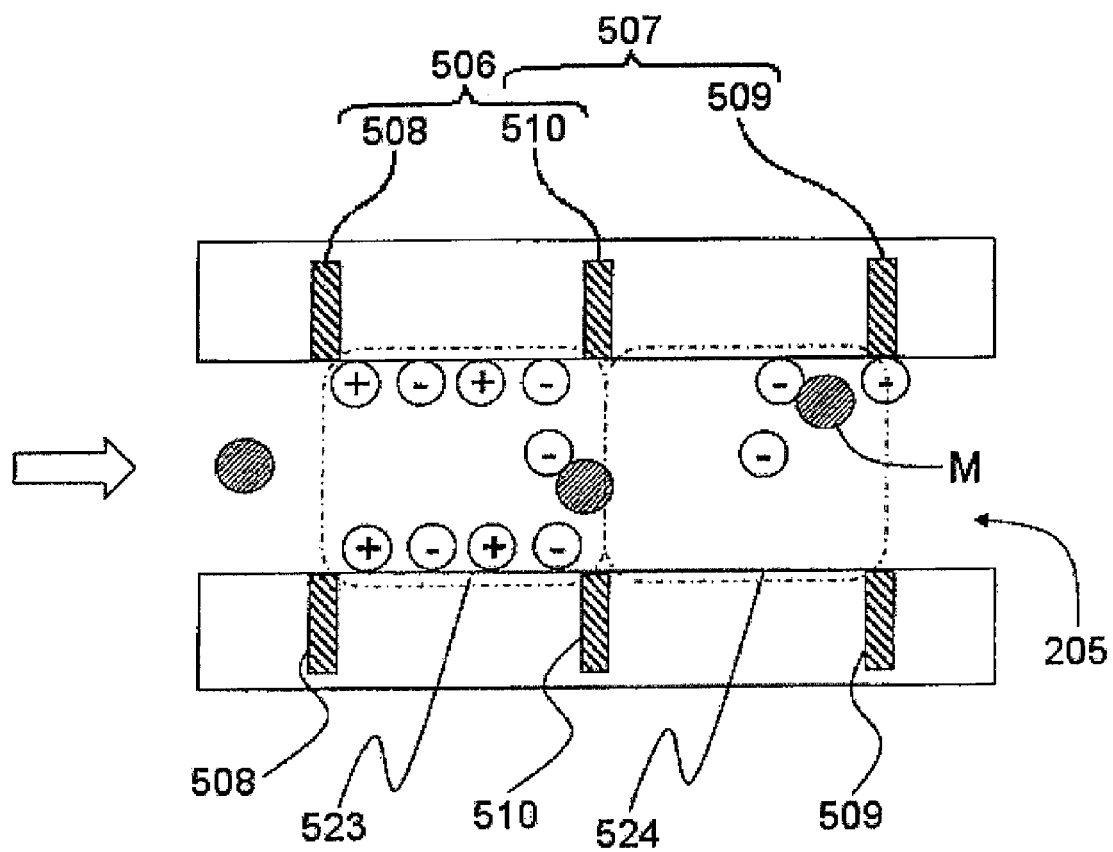
[FIG. 34]

In the dielectric structure 501 according to the present embodiment, by supplying the reference potential to the third electrode 510 and applying an AC voltage between the third electrode 510 and the first electrode 508, a surface discharge can be generated in a first space 523 (FIG. 34) corresponding to the region between the first electrode 508 and the third electrode 510 in the through hole 205. Further, by applying a DC voltage between the second electrode 509 and the third electrode 510, electrons or cations generated in the first space 523 can be electrically drawn to a second space 524 (FIG. 34) corresponding to the region between the second electrode 509 and the third electrode 510 in the through hole 205. For example, a case where a fluid containing a particulate state impurity such as an exhaust gas is supplied to the through hole 205 from the opening on the first electrode 508 side will be considered. FIG. 34 is a schematic view for explaining the operation of the dielectric structure in such a case. When the fluid containing the particulate state impurity such as the exhaust gas is supplied to the through hole 205 from the opening on the first electrode 508 side, the fluid can be reformed by the effects of the plasma in the first space 523. Further, the particulate state impurity M in the fluid can be charged in the second space 524, and the charged particulate state impurity M can be electrically adsorbed at the surface in the vicinity of the second electrode 509 in the base member 203. For example, when the impurity in the fluid is a substance easily charged negative, and a positive DC high potential is supplied to the second electrode 509, that impurity is drawn to the surface in the vicinity of the second electrode 509 in the base part. Due to this, the particulate state impurity M can be removed from the supplied fluid. Note that, which region in the through hole 205 the particulate state impurity M is charged in differs according to the type of the particulate state impurity M and the characteristics etc. of the plasma. It is sometimes charged in the first space 523. Further, when a negative DC high voltage is applied to the second electrode 509, the impurity charged positive can be adsorbed at the surface of the base part 203.

As described above, the dielectric structure according to the present embodiment is provided with the electrode group having the first electrode 508, second electrode 509, and third electrode 510. The first electrode 508 and third electrode 510 configure a first electrode pair 506 generating plasma in a first space 523 when an AC voltage is applied. Further, the second electrode 509 and third electrode 510 configure a second electrode pair 507 generating an electric field in a second space 524 when a DC voltage is applied. Here, the third electrode 510 is shared by the first electrode pair 506 and second electrode pair 507. Further, in other words, the first electrode 508 and third electrode 510 configure a first assembly 506 generating plasma in a first space 523 when an AC voltage is applied. Further, the second electrode 509 and third electrode 510 configure a second assembly 507 generating an electric field in a second space 524 when a DC voltage is applied. The first assembly 506 and second assembly 507 share the third electrode 510.

According to the above configuration, the pressure loss of the treated fluid can be reduced, and the particulate state impurity in the treated fluid can be removed with a high efficiency. Further, since the first assembly 506 and second assembly 507 are provided in the base part 203, a plasma generator integrally forming in it the plasma generation part generating plasma and the dust collection part collecting the particulate state impurity can be obtained.

Figure 41A:
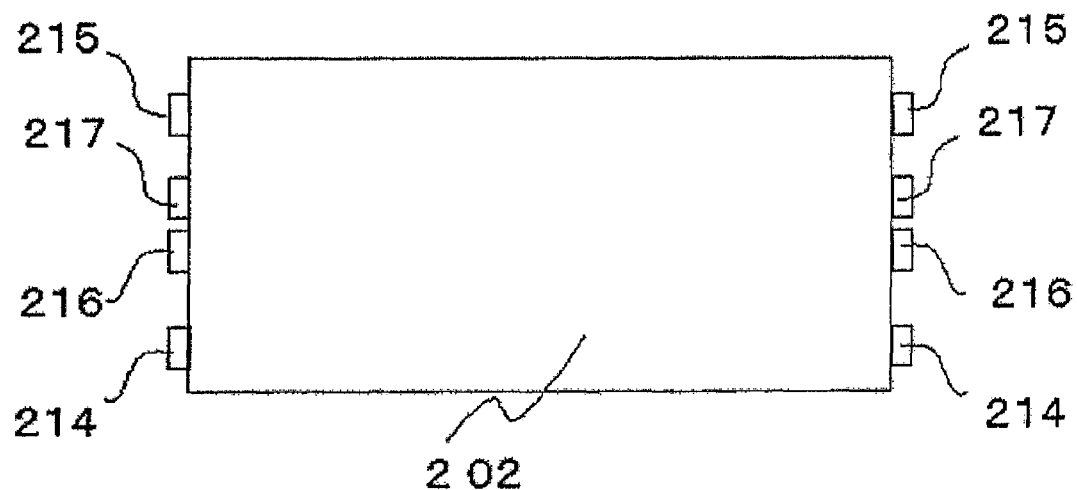
FIG. 41A is a top view corresponding to FIG. 32 in a case where the fourth electrode is provided.
Figure 41B:
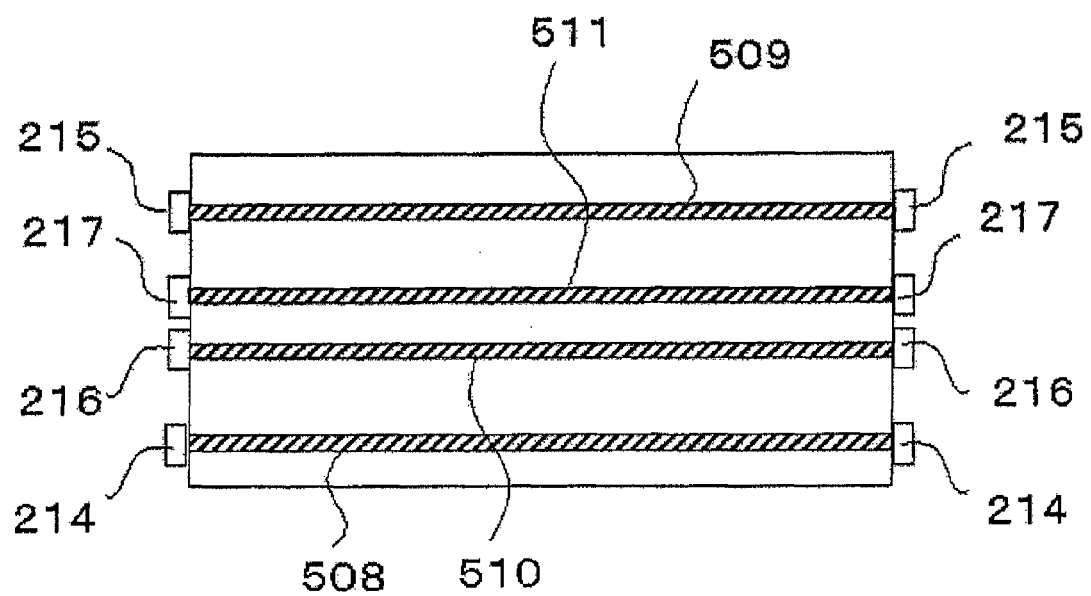
FIG. 41B is a cross-sectional view corresponding to FIG. 33A where the fourth electrode is provided.

Note that, in the dielectric structure 501 explained above, the third electrode 510 is shared by the first assembly 506 and second assembly 507, but the first assembly 506 and the second assembly 507 may be configured by different electrodes as well. For example, as shown in FIG. 41, the first assembly 506 is comprised of the first electrode 508 and third electrode 510, and the second assembly 507 is comprised of the second electrode 509 and fourth electrode 511. Here, the fourth electrode 511 is provided between the second electrode 509 and the third electrode 510. Further, the fourth electrode 511 is same in configuration as the third electrode 510. Then, when the reference potential is supplied to the third electrode 510 and fourth electrode 511 and an AC voltage is applied between the first electrode 508 and the third electrode 510, and a DC voltage is applied between the second electrode 509 and the fourth electrode 511, the action and effects the same as the actions and effects of the dielectric structure 501 explained above are obtained. At this time, if the distance between the third electrode 510 and the fourth electrode 511 is made smaller than the distance between the first electrode 508 and the third electrode 510 and the distance between the second electrode 509 and the fourth electrode 411, it is possible to contribute to a reduction in size of the dielectric structure. Note, as shown in FIG. 31 to FIG. 34 etc., if the electrode supplying the reference potential is shared by the first assembly 506 and second assembly 507, the number of electrodes can be decreased, and the dielectric structure can be reduced in size.

End sections of the first electrode 508, second electrode 509, and third electrode 510 are led up to the vicinity of the outer surface of the base member 202 and are directly connected to the corresponding external terminals 214, 215, and 216 or electrically connected to these through auxiliary conductors. The material and production method of the first electrode 508, second electrode 509, and third electrode 510 are the same as those of the first electrode 8 etc. of the first embodiment.

Further, in the dielectric structure 501 according to the present embodiment, in the same way as the first embodiment, the distance between the first electrode 508 and the third electrode 310 is preferably shorter than the distance between the second electrode 509 and the third electrode 510.

Further, in the dielectric structure 501 according to the present embodiment, the first electrode 508 to third electrode 510 were flat plate shaped. However, so far as at least a portion of the outer edge section is arranged along the surface on the through hole 205 side of the base part 203, these do not have to be flat plate shaped, but may be curved plate shaped or straight line in state as well. Further, when the first electrode 508 to third electrode 510 are for example flat plate shaped, the main surfaces of those first electrode 508 to third electrode 510 do not have to be vertical with respect to the surface on the through hole 205 side of the base part 203, but for example at least one main surface of the first electrode 508 to third electrode 510 may be inclined by 45 degrees relative to the surface on the through hole 205 side of the base part 203 as well.

Further, the first electrode 508 to third electrode 510 do not have to be arranged in the direction vertical to the arrangement direction of the base part 203 as shown in FIG. 33A. For example, inside the base part 203, only the second electrode 509 may be arranged on the inner side from the through hole 205 side as well.

Figure 35:
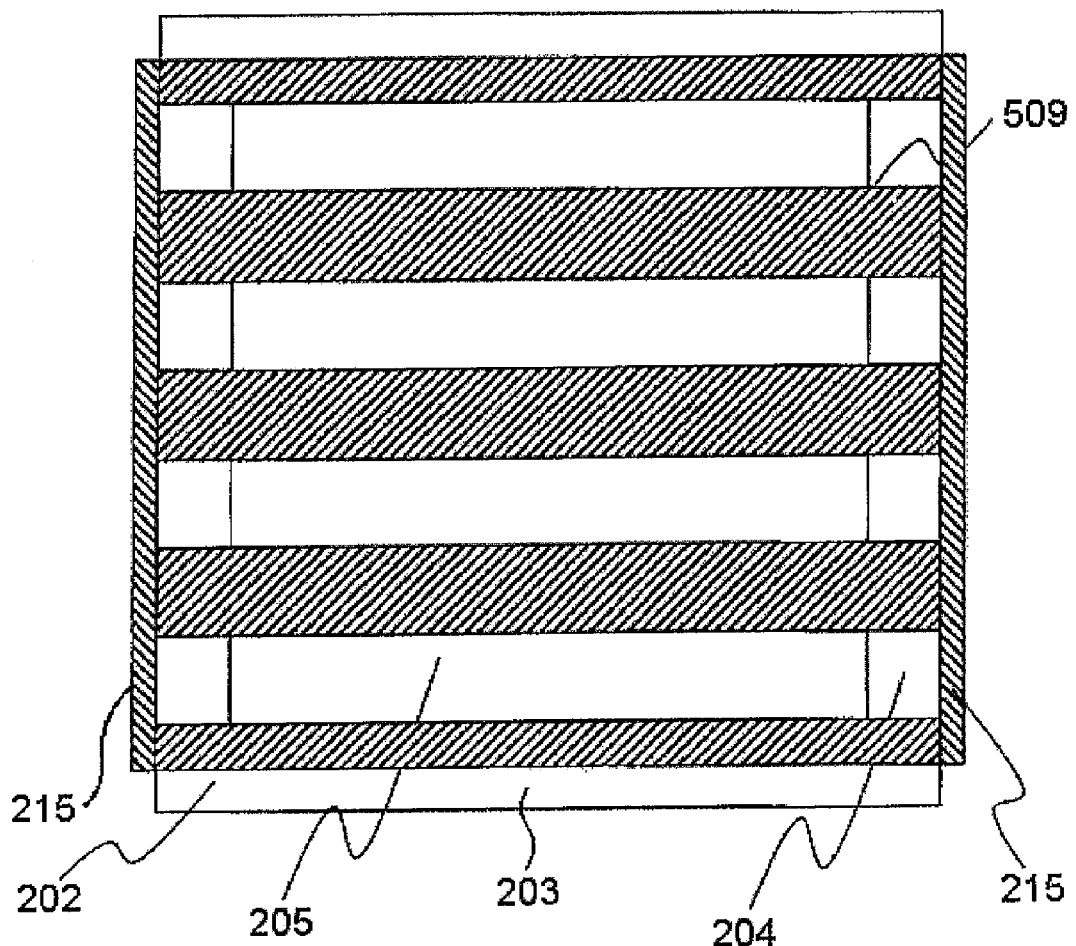
[FIG. 35]

Further, in the dielectric structure according to the present embodiment, as shown in FIG. 35, there are preferably a plurality of through holes 205.

Due to the existence of a plurality of through holes 205, the amount of the fluid which can be supplied to the dielectric structure can be increased, and the pressure loss of the fluid can be reduced.

Note that, the first to fifth embodiments explained above may be configured so that when a fluid is supplied to the dielectric structure, the fluid passes through the first space, then passes through the second space. Namely, the first space in which the plasma is generated and the second space in which the electric field is generated do not necessarily have to be continuous and need only be communicated with each other.

(Dielectric Particles)

In the first to fifth embodiments, dielectric particles may be provided on the surface of the base member (2 etc.) comprised of a dielectric material as well. Note that, the dielectric particles may be grasped as forming part of the base member (2 etc.) together with the dielectric material. In the following description, however, for convenience of explanation, the part comprised of the dielectric material will be referred to as the "base member", while the dielectric particles are made of a material different from the base member. Further, in the following description, an explanation will be given of a case where dielectric particles are provided in the third embodiment as the representative embodiment of the first to fifth embodiments.

Figure 36:
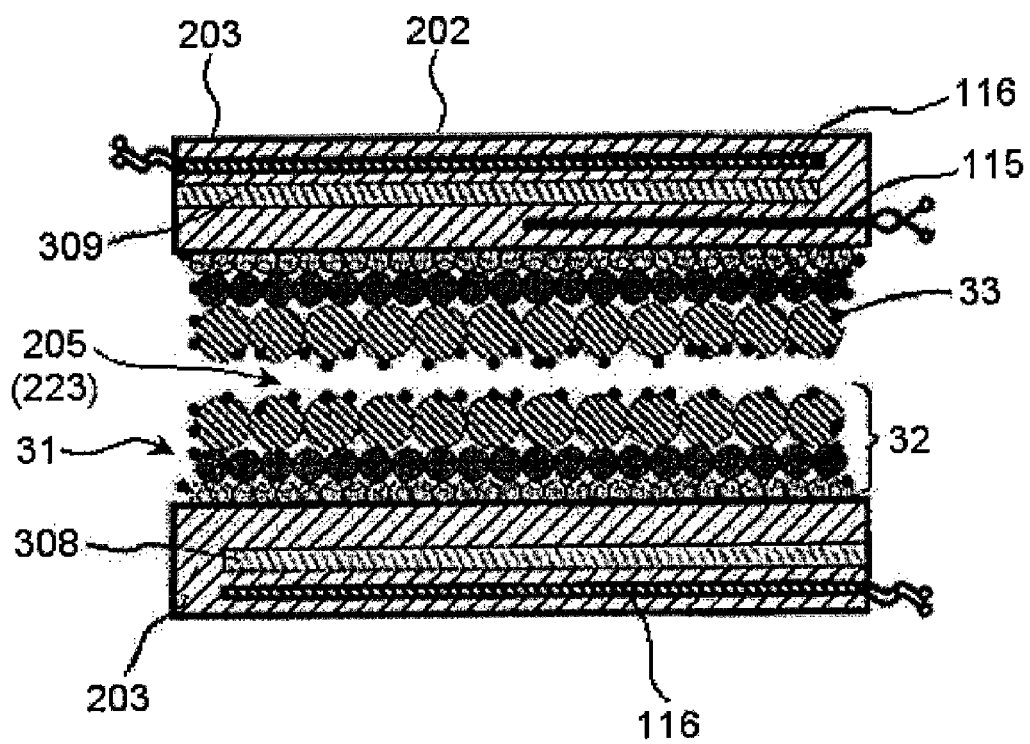
[FIG. 36]

FIG. 36 is a cross-sectional view corresponding to a region F of FIG. 16. In the through hole 205, a plurality of dielectric particles 31 are provided. The particle size of the dielectric particles 31 becomes smaller the further from the center of the through hole 205 toward the inner circumferential surface of the through hole 205. The plurality of dielectric particles 31 form for example a plurality of dielectric particle layers 32 stacked on the surface of the base member 202.

The dielectric particles 31 have a permittivity larger than that of the dielectric material configuring the base member 202. For example, when an alumina material is used for the base member 202, since the permittivity of alumina is about 8, barium titanate or the like having a permittivity larger than 8 is used as the dielectric particles 31.

The base member 202 and dielectric particles 31 and the dielectric particles 31 themselves are bonded to each other. Those are bonded by, for example, solid phase sintering of the base member 202 and dielectric particles 31 or liquid phase sintering using sintering aid such as $SiO_2$, MgO and CaO.

For example, the base member 202 and dielectric particles 31 have catalysts 33 made of platinum or its alloy on their surfaces. The platinum or its alloy is bonded to the base member 202 and dielectric particles 31 by sintering. Note that, the catalyst 33 made of platinum or its alloy can be formed on the surface of the dielectric particles 31 by a vapor deposition process or plating process. Further, it may be added in advance to the starting material of the dielectric particles 31.

In this way, in a case where at least one of the base member 202 and the dielectric particles 31 has the catalyst 33, when reforming the fluid flowing through a base body 202 by plasma, the activation energy can be reduced. For this reason, it becomes possible to improve the reforming efficiency of the fluid.

Note that, in FIG. 36, a heater 116 and a temperature detection element 115 are provided in the base member 202. The heater 116 is buried at a suitable position of the base member 202 in a suitable shape. For example, the heater 116 is buried in the base member 202 and is spread on a plane along the second electrode 309 etc. by snaking, spiraling, or the like. The temperature detection element 115 is configured by, for example, a resistor. The temperature detection element 115 is buried at a suitable position of the base member 202, for example, between the first electrode 308 and the through hole 205. The heater 116 and temperature detection element 115 are formed while being buried and fixed in the base member 202 by arrangement of the conductive paste in dielectric layers before firing and by firing of this together with the stacked dielectric layers in the same way as the second electrode 309 etc. The actions of these will be explained in the sixth embodiment to be explained later.

Below, the production method of the dielectric structure provided with the dielectric particles 31 will be explained. First, first to fourth green sheets having organic binder weight ratios which are different from each other are prepared.

The materials of the plurality of first ceramic green sheets having the smallest organic binder weight ratios are the ceramic powder and organic binder. As the material of the ceramic powder, there can be mentioned, for example, alumina, zirconia, cordierite, silicon nitride, aluminum nitride, silicon carbide, etc. Further, as the filler ingredient, there can be mentioned, for example, a complex oxide of $Al_2O_3$, $SiO_2$, or $ZrO_2$ with an alkali earth metal oxide, a complex oxide of $TiO_2$ with an alkali earth metal oxide, a complex oxide containing at least one oxide selected from $Al_2O_3$ and $SiO_2$ (for example, spinel, mullite, or cordierite), and so on. Further, as the organic binder, there can be mentioned an acryl resin, ethyl cellulose resin, and so on.

Note that, from the viewpoint of dissipation of heat generated by discharge to the outside, preferably use is made of silicon nitride or aluminum nitride having a high heat conductivity. Further, from the viewpoint of suppression of damage of the base member 202, preferably use is made of the high strength silicon carbide.

Specifically, for the first ceramic green sheet, a desired ceramic powder, organic binder, plasticizer, organic solvent, etc. are added and mixed to form a slurry. This is shaped to a sheet by the conventionally known doctor blade method or calendar roll method. This first ceramic green sheet becomes the base member 202 after firing.

Further, in the base member 202, at the surface exposed in the through hole 205, the area ratio of the crystal phase is desirably higher than the area ratio of the glass phase. By this configuration, etching of the base member 202 by the plasma generated in the through hole 205 can be effectively suppressed. Namely, at the surface of the base member 202 exposed in the through hole 205, by raising the ratio of the crystal phase bonded by a covalent bond having a very high bonding force, the resistance can be raised against etching by the plasma.

More preferably, at the surface of the base member 202 exposed in the through hole 205, desirably the area ratio of the crystal phase is 90 to 100%. Here, when the crystal phase is 100%, this means a single crystal composition. When the crystal phase is smaller than 100%, this means a configuration in which adjacent crystal phases are bonded to each other by a non-crystal phase interposed between them. When the area ratio of the crystal phase is 90% or more, etching of an amorphous phase by the plasma generated in the through hole 205 is suppressed, and the resistance against the etching of the base member 202 becomes larger.

By this configuration, the durability against the plasma at the surface exposed in the through hole 205 can be improved, the thermal expansion ratio of the base member 202 is reduced, and occurrence of thermal stress can be effectively suppressed.

In order to raise the ratio of such a crystal phase, by using alumina, zirconia, or cordierite as the material of the base member 202 and adjusting the content of a sintering aid or other additive of the starting material and the firing conditions, the desired ratio can be obtained.

Note that, from the viewpoints of use under a high heat environment and necessity of heat and shock resistance, the base member 202 desirably uses cordierite as at least the main ingredient of the portion exposed in the through hole 205. Cordierite has a linear thermal expansion coefficient of about 2 ppc/° C., therefore the thermal expansion of the base member 202 due to the heat at the time of generation of the plasma is reduced, and occurrence of thermal stress can be effectively suppressed.

The area ratio of such a crystal phase can be found by observation of the surface state by a scan type electron microscope (SEM) etc. Further, the crystallinity can be analyzed by using X-ray diffraction.

Further, the materials of the second ceramic green sheet having organic binder weight ratios larger than that of the first ceramic green sheet, the third ceramic green sheet having organic binder weight ratios larger than that of the second ceramic green sheet, and the fourth ceramic green sheet having the largest organic binder weight ratios are the ceramic powder, metal oxide powder, and organic binder. As the material of the ceramic powder, there can be mentioned, for example, alumina, zirconia, cordierite, silicon nitride, aluminum nitride, silicon carbide, etc. Further, as the filler ingredient, there can be mentioned, for example, a complex oxide of $Al_2O_3$, $SiO_2$, or $ZrO_2$ with an alkali earth metal oxide, a complex oxide of $TiO_2$ with an alkali earth metal oxide, a complex oxide containing at least one type of oxide selected from $Al_2O_3$ and $SiO_2$ (for example, spinel, mullite, or cordierite), and so on. As the metal oxide powder, there can be mentioned barium titanate etc. Further, as the organic binder, there can be mentioned acryl resin or ethyl cellulose resin etc.

Next, as the second ceramic green sheet, an organic binder is added to the desired ceramic powder, metal oxide powder, plasticizer, and organic solvent, etc. and mixed so that the weight ratio becomes larger than that of the first ceramic green sheet to form a slurry. This is shaped to a sheet by the conventionally known doctor blade method or calendar roll method to obtain a ceramic green sheet having a desired organic binder weight ratio.

Further, as the third ceramic green sheet, an organic binder is added to the desired ceramic powder, metal oxide powder, plasticizer, and organic solvent etc. and mixed so that the weight ratio becomes larger than that of the second ceramic green sheet to form a slurry. This is shaped to a sheet by the conventionally known doctor blade method or calendar roll method to obtain a ceramic green sheet having a desired organic binder weight ratio.

Further, as the fourth ceramic green sheet, an organic binder is added to the desired ceramic powder, metal oxide powder, plasticizer, and organic solvent etc. and mixed so that the weight ratio becomes larger than that of the second ceramic green sheet to form a slurry. This is shaped to a sheet by the conventionally known doctor blade method or calendar roll method to obtain a ceramic green sheet having a desired organic binder weight ratio.

Next, according to need, a conductor paste which forms for example the second electrode 309 is coated on the first ceramic green sheet after firing. The conductor paste is coated by for example a screen printing, method or ink jet printing method. Then, a plurality of first ceramic green sheets are stacked to obtain a laminate of first ceramic green sheets. Here, the first ceramic green sheets are press-bonded by for example a thermo-compression bonding method or a pressure bonding method. Preferably, it is carried out by heating the first ceramic green sheets to 40 to 150° C. and pressing these to 10 to 200 $kg/cm^2$.

Next, on the laminate of first ceramic green sheets forming the base member 202, at least one second ceramic green sheet having an organic binder weight ratio larger than that of the first ceramic green sheet, at least one third ceramic green sheet having an organic binder weight ratio larger than that of the second ceramic green sheet, and at least one fourth ceramic green sheet having the largest organic binder weight ratio are sequentially stacked and press-bonded to thereby obtain a laminate of first to fourth ceramic green sheets. The ceramic green sheets are press-bonded by for example the thermo-compression bonding method or pressure bonding method. Preferably, it is carried out by heating the ceramic green sheets to 40 to 150° C. and pressing these to 10 to 200 $kg/cm^2$.

Next, the laminate of the first to fourth ceramic green sheets is fired. It is fired by heating to for example 800 to 1600° C. In the process of this firing, the organic binder contained in the ceramic green sheets carbonized by the heat, then vaporized. The result becomes a calcined structure comprised of only ceramic powder and metal oxide powder. Due to this, the larger the organic binder weight ratio of the ceramic green sheets, the larger the pore ratio of the calcined structure in the firing process, the more the sintering of ceramic powder in the calcined structure is promoted, and more the dielectric particles grow. In this embodiment in the present invention, the size of the dielectric particles formed becomes larger in the order of the first ceramic green sheets which form the base member 202 and the second ceramic green sheet, third ceramic green sheet, and fourth ceramic green sheet which form the dielectric particle layers 32.

In this sintering process, by sintering and bonding of the first ceramic green sheets which form the base member 202 and the second to fourth ceramic green sheets which form the dielectric particle layers 32, the base member 202 and the dielectric particle layers 32 are sintered and bonded.

Further, two ceramic laminates obtained by sintering the first to fourth ceramic green sheets are prepared, and those ceramic laminates are arranged in a facing direction of partial surfaces so that partial surfaces of adjacent ceramic laminates on the fourth ceramic green sheet side before firing face each other.

Note that, the base member 202 and the dielectric particle layer 32 differ in the pore ratio and differ in the facility of passage of the gas. The base member 202 and the dielectric particle layers 32 can be easily differentiated by cutting a portion of the dielectric structure and observing this by a scan type electron microscope (SEM).

Further, it is also possible to differentiate the base member 202 and the dielectric particle layers 32 by measuring the absorption ratios. As the measurement of the absorption ratios, there can be mentioned, for example, measurement according to the Japanese Industrial Standard (JIS) method. In this method, first, a portion of the dielectric structure (hereinafter, referred to as a "measurement specimen") is cut, placed in water and pressurized, then the weight of the measurement specimen (hereinafter, referred to as a "first weight A") is measured. Next, the measurement specimen is completely dried in an oven, and the weight of that dried measurement specimen (hereinafter, referred to as a "second weight B") is measured. Then, the absorption is found from the difference of the first weight and the second weight ((B−A)÷A×100. The absorption of the base member 202 is less than 3%, while the absorption of the dielectric particle layers 32 is 3% or more. The high absorption means that the pore ratio is high and the pores are continuously connected. In this way, the case when the absorption is high means that the pores are connected to each other, and the pressure loss when the gas passes is small. Therefore, by measuring the absorption, the base member 202 and the dielectric particle layers 32 can be differentiated.

According to the above production method, the base member 202 and dielectric particles 31 and the dielectric particles 31 themselves are bonded to each other, therefore particles having small particle sizes, particles having middle particle sizes, and particles having large particle sizes do not move from predetermined positions due to vibration etc. The dielectric particles 31 having small particle sizes are always arranged at the surface of the base member 202 having the built-in second electrode 309 etc. Accordingly, even when the dielectric structure is used for a long period of time, a stable plasma generation state can be obtained without causing change or variation in the generation voltage of the plasma.

Note that, in the above explanation, structures of the base member 202 and the dielectric particle layers 32 comprised of three layers of dielectric particles 31 were described, but the dielectric particle layers 32 may be two layers as well. Further, the number of layers may be four, five, or more as well.

The dielectric structure is provided with a plurality of dielectric particles 31 provided in the through hole 205. Among the dielectric particles 31, the particle size becomes smaller the more from the center of the through hole 205 toward the inner circumferential surface of the through hole 205. According to this configuration, there are dielectric particles 31 in the through hole 205, and the permittivity (static capacitance) in the first space 223 becomes large, therefore a start voltage (threshold voltage) for generating plasma can be made low.

Further, among the dielectric particles 31, the particle size becomes smaller the closer to the surface of the base member 202. Therefore the specific surface area of the dielectric particles 31 becomes larger the closer to the base member 202 and charges easily build up at the surface of the dielectric particles 31. Therefore, where a voltage is applied to the first electrode pair 306, the dielectric particles 31 are charged by a relatively low voltage. The charged charges are further charged to the adjacent dielectric particles 31 resulting in continuous charging. When this charging phenomenon once occurs, it sequentially occurs from dielectric particles having a small particle size to dielectric particles having a large particle size. For this reason, the plasma generation start voltage can be made lower.

Note that, when the permittivity of the dielectric particles 31 is higher than that of the base member 202, in comparison with a case where permittivities of the base member 202 and the dielectric particles 31 are same degree or the permittivity of the dielectric particles 31 is lower, charges more easily build up at the surfaces of the dielectric particles 31. Therefore, where a voltage is applied, the dielectric particles 31 are charged by a lower voltage, charged charges are further charged to the adjacent dielectric particles 31, and continuous charging occurs. Due to this, the threshold voltage of the plasma can be made lower.

In this way, if the threshold voltage of the plasma generation can be made lower, in an apparatus mounting the dielectric structure, the power consumption for the plasma generation becomes smaller as well. This is very effective when utilizing this dielectric structure particularly in an automobile, small-sized electric generator, ship, or other moving body restricted in a total useable power.

Note that, the dielectric particles 31 may be provided between one base part 203 among two base parts 203 and the center of the through hole 205, and the particle sizes of those dielectric particles 31 may become smaller from the center of the through hole 205 toward that one base part 203.

Further, the through hole 205 may be filled with dielectric particles, and the particle sizes of those dielectric particles may become smaller from the center of the through hole 205 toward the inner circumferential surface of the through hole 205.

(Discharge Device)

By combining the dielectric structure 1 according to the first embodiment, an AC power supply applying an AC voltage to the first assembly 6, and a DC power supply applying a DC voltage to the second assembly 7, a discharge device able to reform the fluid supplied to the through hole 5 and able to remove the particulate state impurity in the fluid can be configured. This is true for the dielectric structures 201, 301, 401, and 501 according to the second to fifth embodiments as well.

Note that, in the third embodiment, the DC power supply applying voltage to the second assembly 307 (third electrode 310 and fourth electrode 311) may be the DC power supply directly applying positive/negative voltages to the third electrode 310 and fourth electrode 311 or one configured by combination of a power supply applying a positive DC voltage between the second electrode 309 and the third electrode 310 and a power supply applying a negative DC voltage between the first electrode 308 and the fourth electrode 311. This is true for the fourth embodiment as well.

Further, for example, after a DC voltage is applied to the second assembly to adsorb the particulate state impurity at the surface of the base member 2, an AC voltage may be applied to the second assembly as well. By application of the AC voltage, a discharge region is formed, so the particulate state impurity adsorbed at the surface of the base member 2 can be decomposed by the plasma, and the fluid can be reformed.

Figure 37:
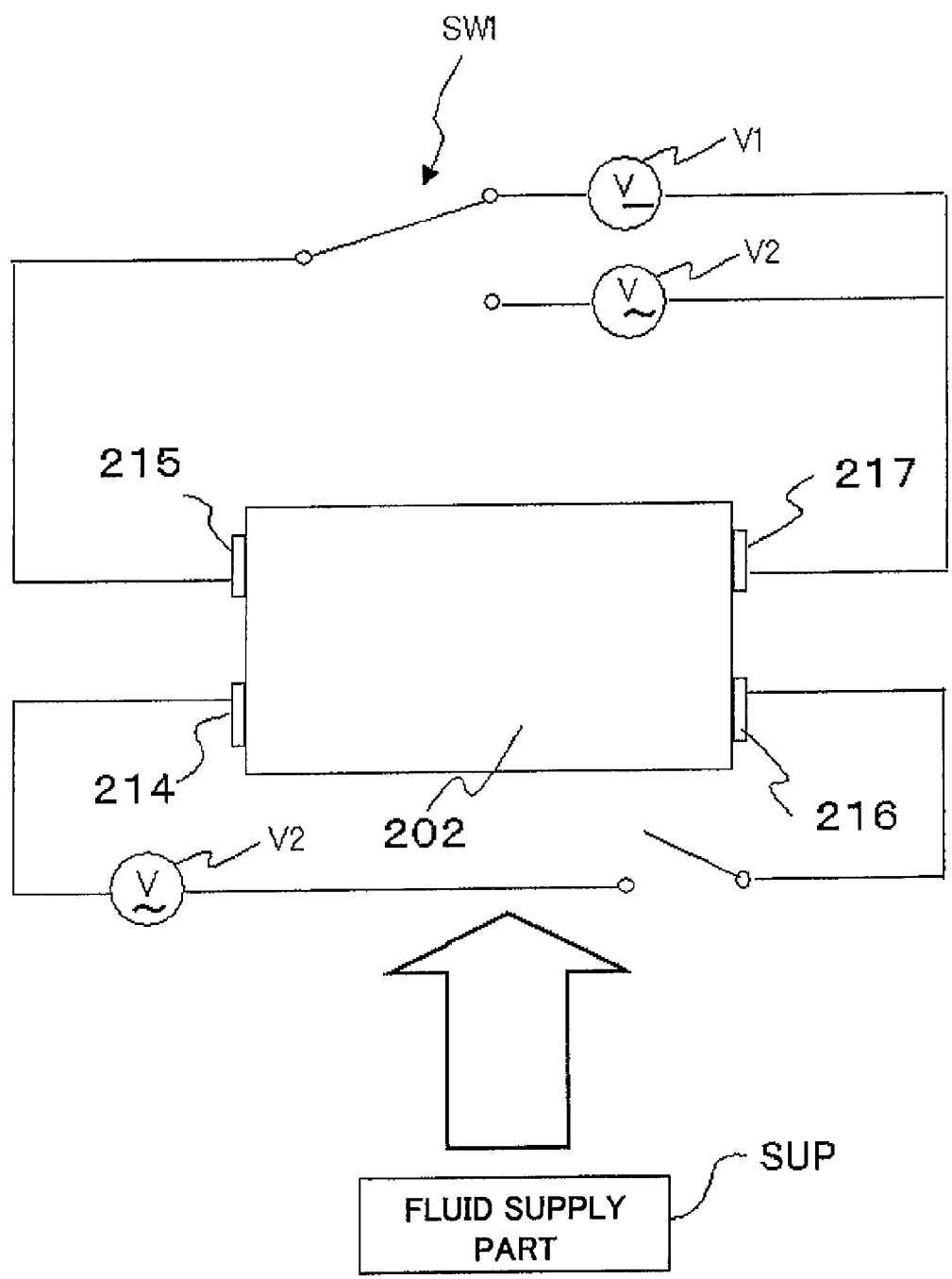
[FIG. 37]

In order to control the voltage applied between electrodes in this way, as shown in FIG. 37, use can be made of a a DC power supply V1, AC power supply V2, and switching part SW1 such as switch switching the power supply to be connected to second assembly between the DC power supply V1 and the AC power supply V2.

If the voltage to be applied between electrodes is controlled in this way, even the particulate state impurity which was contained in the fluid supplied from a fluid supply part SUP and could not be decomposed by the first generated plasma is charged and adsorbed at the surface of the base member, then decomposed again by the plasma, so the fluid can be reformed. Therefore, removal of the particulate state impurity can be more sufficiently carried out. Further, it is possible to remove the particulate state impurity deposited on the base member as well, therefore it becomes possible to suppress more the increase of the pressure loss of the fluid. As a result, the particulate state impurity in the fluid can be more stably reacted for a long period, and the fluid can be reformed.

Note that, here, the explanation was given by using the dielectric structure according to the third embodiment, but this same can be applied to the dielectric structures according to the first, second, fourth, and fifth embodiments as well.

(Sixth Embodiment)

Figure 38:
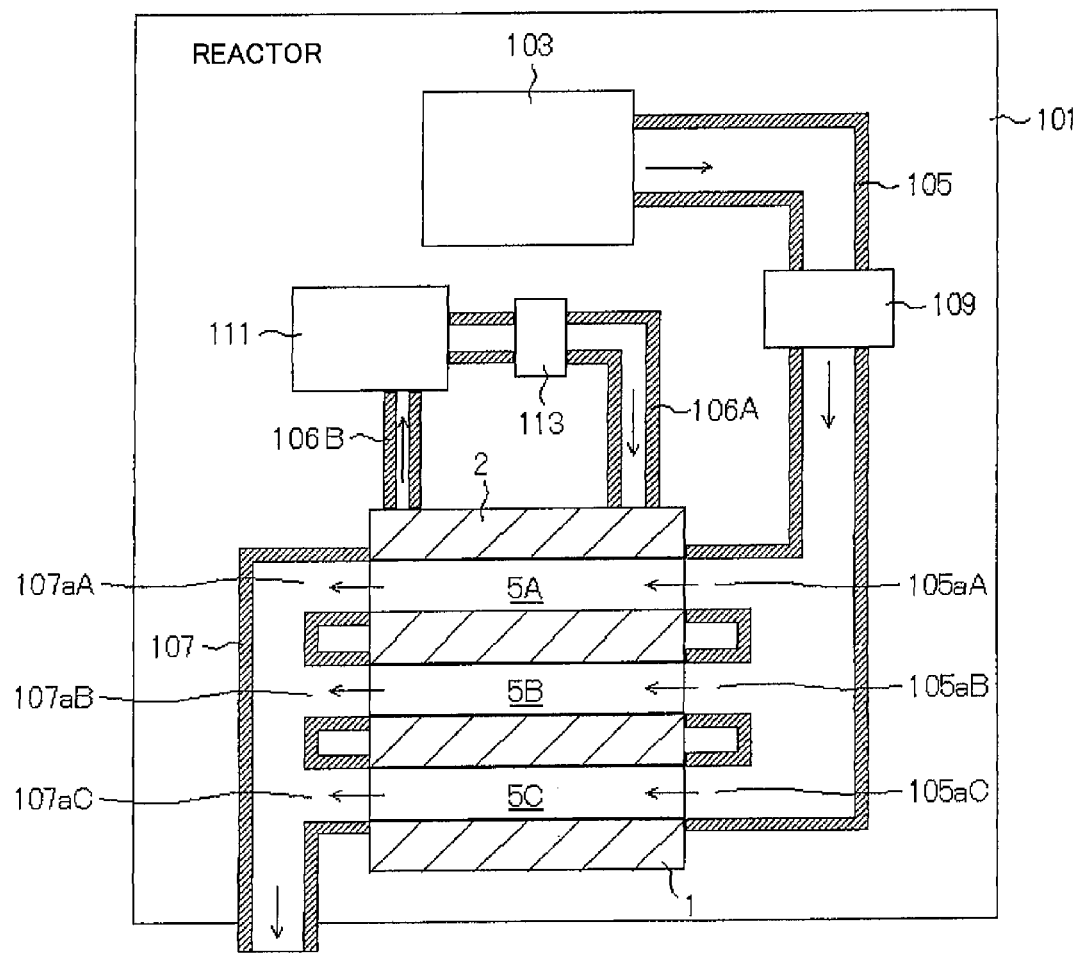
[FIG. 38]

FIG. 38 is a conceptual diagram showing the structural configuration of a reactor 100 according to a sixth embodiment of the present invention.

The reactor 100 is provided with any of the dielectric structures of the first to fifth embodiments explained above. Note that, in the following description, an explanation will be given by using notations of the first embodiment as representative of the first to fifth embodiments.

The reactor 100 is configured as a device for treating a treated fluid by the dielectric structure 1 and ejecting the result. The treated fluid is, for example, an exhaust gas of an internal combustion engine of an automobile. Here, NOx is decomposed by a chemical change in the through hole 5 (hereinafter, also referred to as a "discharge space"). Further, for example, the treated fluid is a chlorofluorocarbon used as a cooling medium for a refrigerator or air-conditioner. The chlorofluorocarbon is decomposed by the chemical change in the discharge space 5. Note that, in the following description, in the reactor 100, a portion other than the dielectric structure 1 will be sometimes referred to as a reactor body 101.

The reactor body 101 is provided with a fluid source 103 supplying the treated fluid, a feed pipe 105 (an example of the supply part) guiding the treated fluid from the fluid source 103 to the dielectric structure 1, an exhaust pipe 107 exhausting the treated fluid treated by the dielectric structure 1, a treated fluid pump 109 for controlling flow of the treated fluid, a coolant source 111 supplying the cooling medium, a supply use flow pipe 106A (an example of the cooling part) guiding the cooling medium from the coolant source 111 to the dielectric structure 1, an emission use flow pipe 106B guiding the cooling medium from the dielectric structure 1 to the cooling source 111, and a cooling medium pump 113 (an example of the cooling part) for controlling the flow of the cooling medium.

The fluid source 103 is a source generating treated fluid such as an internal combustion engine of an automobile emitting exhaust gas as the treated fluid. Alternatively, the fluid source 103 is one holding the treated fluid such as a tank holding the used cooling medium of a refrigerator or air conditioner.

The feed pipe 105 communicates at one end with the space for generating or holding the treated fluid of the fluid source 103 and communicates at the other end with the discharge space 5 of the dielectric structure 1. The dielectric structure 1 side of the feed pipe 105 is branched to a first branch part 105aA, second branch part 105aB, and third branch part 105aC (hereinafter, simply referred to as the "branch parts 105a", these sometimes not differentiated) corresponding to the number of discharge spaces 5, and the first branch part 105aA to third branch part 105aC communicate with the discharge space 5A to discharge space 5C.

One end side of the exhaust pipe 107 communicates with the discharge space 5 of the dielectric structure 1 from the side opposite to the feed pipe 105, while the other end side is opened to the atmosphere or communicates with a not shown space holding the treated fluid after treatment or applying another treatment to the treated fluid after treatment. The dielectric structure 1 side of the exhaust pipe 107 is branched to a first branch part 107aA, second branch part 107aB, and third branch part 107aC (hereinafter, simply referred to as the "branch parts 107a", these sometimes not discriminated) corresponding to the number of discharge spaces 5, while the first branch part 107aA to third branch part 107aC communicate with the discharge space 5A to discharge space 5C. Note that, the exhaust pipe 107 may be omitted as well. For example, the treated fluid after treatment may be directly exhausted into the atmosphere from the discharge spaces 5.

The feed pipe 105 and exhaust pipe 107 are formed by a metal, resin, or other suitable material. The feed pipe 105 and exhaust pipe 107 may have flexability or may not have it. The connection of the branch part 105a and branch part 107a with the first through hole 5 is carried out by, for example, making ends of the branch part 105a and branch part 107a abut against a side surface which does not have an opening of the first through hole 5 in the base member 2 and fixing the branch part 105a, branch part 107a, and base member 2 by a suitable fixing member such as binder or screw member. Note that, it is also possible to connect these by inserting the branch part 105a and branch part 107a into the discharge space 5 or by integrally forming a projected annular portion of an outflow connection pipe or the like with the base member 2 in the end portion of the discharge space 5 and inserting that projected portion into the branch part 105a and branch part 107a.

The treated fluid pump 109 is provided in at least one of the feed pipe 105 or exhaust pipe 107. FIG. 38 exemplifies a case of providing this in the feed pipe 105. Note that, in a case where the fluid source 103 is an internal combustion engine or other case where the treated fluid is made to flow by the power of the fluid source 103, the treated fluid pump 109 may be omitted as well. Further, it is also possible to provide the treated fluid pump 109 in the dielectric structure 1. The treated fluid pump 109 may be configured by a suitable pump such as a rotary pump or reciprocating pump.

The coolant source 111 includes, for example, a heat exchanger, makes the temperature of the cooling medium from the exhaust flow pipe 106B fall by the heat exchanger, and supplies the medium to the feed flow pipe 106A. Note that, it is sufficient that the coolant source 111 can supply the cooling medium. It does not have to receive the cooling medium from the exhaust flow pipe 106B to recirculate the cooling medium. Namely, the cooling medium from the exhaust flow pipe 106B may be exhaust to a place different from the coolant source 111. For example, in a case where tap water is utilized as the cooling medium, the water from the exhaust flow pipe 106B may be exhausted to a place different from the water source of the coolant source 111. Conversely, in a case of a configuration where the cooling medium is recirculated, the coolant source 111 may be omitted.

One end of the supply flow pipe 106A communicates with the coolant source 111, while the other end communicates with the discharge space 5 (flow passage) of the dielectric structure 1 through the inflow connection pipe etc. as explained above. One end of the exhaust flow pipe 106B communicates with the discharge space 5 of the dielectric structure 1 through the outflow connection pipe or the like integrally provided in the base member 2, while the other end communicates with the coolant source 111. The flow pipe 106 is formed by a metal, plastic, or other suitable material. The flow pipe 106 may have flexibility or may not have it.

The cooling medium pump 113 is provided in at least one of the feed flow pipe 106A or exhaust flow pipe 106B. FIG. 38 exemplifies a case where it is provided in the feed flow pipe 106A. Note that, in a case where power for a suitable flow of the cooling medium can be obtained, for example the coolant source 111 is a tank located at a high position and the cooling medium can be made to flow by gravity, the cooling medium pump 113 may be omitted. Further, it is also possible to provide the cooling medium pump 113 in the dielectric structure 1. The cooling medium pump 113 may be configured by a suitable pump such as a rotary pump or a reciprocating pump.

Figure 39:
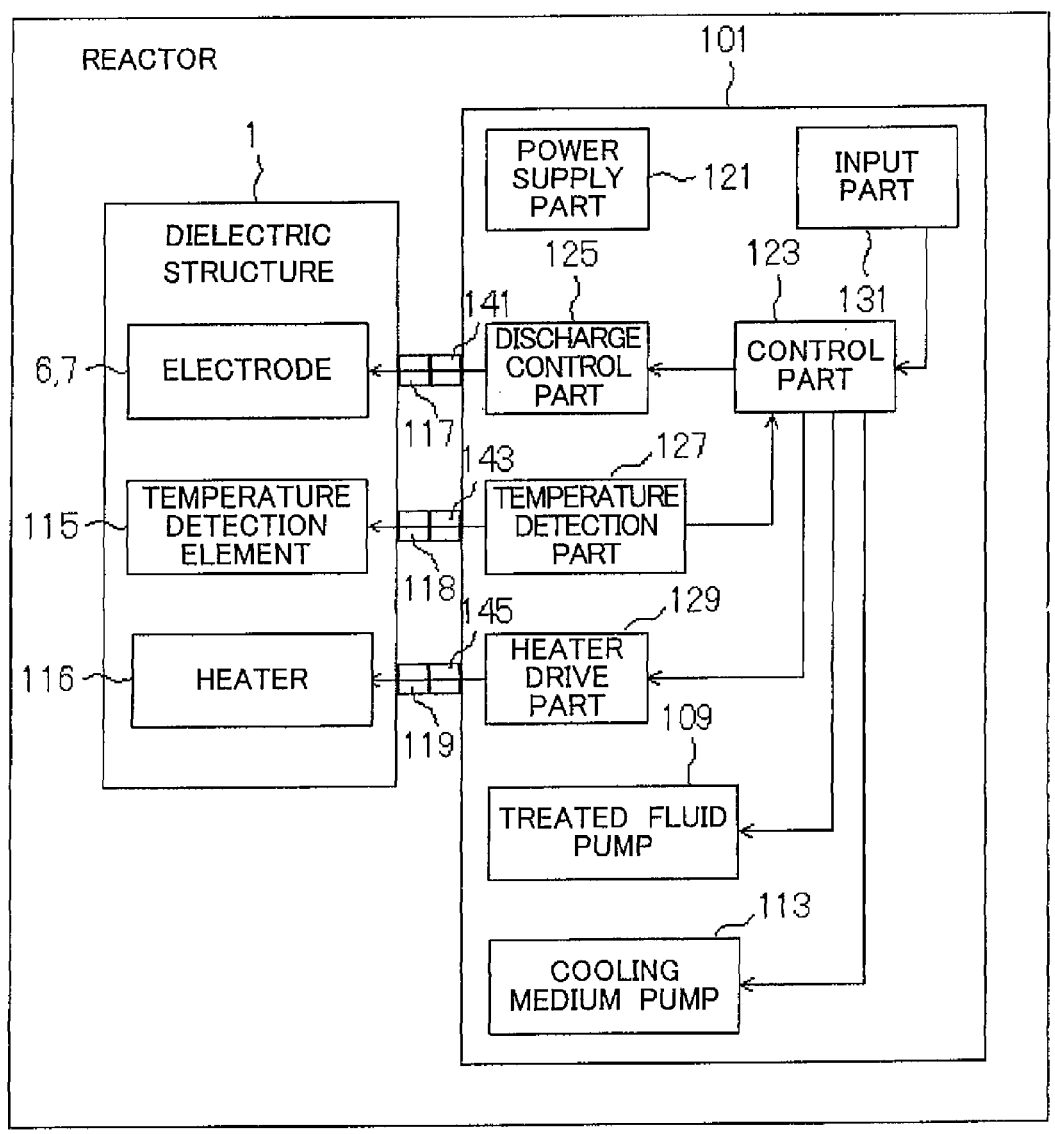
[FIG. 39]

FIG. 39 is a block diagram showing the configuration of an electrical system of the reactor 100. Here, as an example, assume that a temperature detection element 115 for detecting the temperature of the base member 2 and a heater 116 for heating the base member 2 are provided inside the base member 2. Further, assume that, at the surface of the base member 2, a sensor terminal 118 for outputting an electric signal from the temperature detection element 115 and a heater terminal 119 for supplying electric power to the heater 116 are exposed. Note that, in the following description, the external terminals 214 to 216 will be referred to as the conductor terminal 117 together.

The reactor body 101 is provided with a device side conductor terminal 141, device side sensor terminal 143, and device side heater terminal 145 which are connected to the conductor terminal 117, sensor terminal 118, and heater terminal 119. The dielectric structure 1 is driven and controlled by supply of electric power from the reactor body 101 through these terminals. Specifically, this is as follows.

The power supply part 121 includes, for example, a battery, converts a DC power from the battery to an AC power or DC power of a suitable voltage, and supplies the same. Alternatively, it converts an AC power having a commercial frequency to an AC power or DC power of a suitable voltage and supplies the same. The electric power of the power supply part 121 is supplied to the control part 123, discharge control part 125, temperature detection part 127, heater drive part 129, treated fluid pump 109, and cooling medium pump 113.

The discharge control part 125 converts the electric power supplied from the power supply part 121 to an AC power of a voltage in accordance with the control signal from the control part 123 and supplies the electric power after the conversion through the device side conductor terminal 141 and conductor terminal 117 to the first assembly 6. The discharge control part 125 includes, for example, an inverter, transformer, or other power supply circuit. In the first space 23, discharge in an amount in accordance with the voltage applied by the discharge control part 125 is carried out.

Further, the discharge control part 125 converts the electric power supplied from the power supply part 121 to a DC voltage of a voltage in accordance with the control signal from the control part 123 and supplies the electric power after the conversion through the device side conductor terminal 141 and conductor terminal 117 to the second assembly 7. The discharge control part 125 includes, for example, an inverter, transformer, or other power supply circuit. In the second space 24, a potential gradient in accordance with the voltage applied by the discharge control part 125 is formed, the second space 24 is electrically charged positive or negative corresponding to the potential gradient, and the particulate state impurity passed through the second space 24 can be charged.

The temperature detection part 127, for example, when the temperature detection element 115 is configured by a resistor having a resistance value varying according to the temperature change, converts the electric power supplied from the power supply part 121 to a DC power or AC power of a suitable voltage and supplies that converted electric power through the device side sensor terminal 143 and sensor terminal 118 to the temperature detection element 115. Then, the temperature detection element 115 detects the resistance value of the temperature detection element 115 and outputs a signal in accordance with that detected resistance value to the control part 123. The temperature detection element 115 may calculate the temperature of the temperature detection element 115 based on the detected resistance value and output the signal in accordance with that calculated value to the control part 123 as well.

The heater drive part 129 converts the electric power supplied from the power supply part 121 to a DC power or AC power of a voltage in accordance with the control signal from the control part 123 and supplies that converted power through the device side heater conductor 145 and heater terminal 119 to the heater 116. The heater drive part 129 includes, for example, a rectification circuit, transformer, or other power supply circuit. In the heater 116, heat generation in an amount in accordance with the voltage applied by the heater drive part 129 is carried out.

Each of the treated fluid pump 109 and the cooling medium pump 113 includes, for example, although particularly not shown, a motor as the drive source of the pump and a motor driver driving the motor. The motor driver converts the electric power supplied from the power supply part 121 to an AC power or DC power of a voltage in accordance with the control signal from the control part 123 and applies the result to the motor. The motor rotates at a speed in accordance with the applied voltage. Consequently, a force in accordance with the applied voltage is applied to the treated fluid and cooling medium.

The input part 131 accepts an operation of a user and outputs a signal in accordance with the operation of the user to the control part 123. For example, the input part 131 accepts an operation for setting various types of parameters concerned with a drive start operation of the reactor 100, drive suspension operation, temperature setting, and flow rate control, and outputs signals in accordance with operations. The input part 131 is configured by, for example, a control panel including various types of switches and a keyboard.

The control part 123 is configured by for example a computer provided with a CPU, ROM, RAM, and external memory device although particularly not shown. The control part 123 outputs control signals to the discharge control part 125, heater drive part 129, treated fluid pump 109, and cooling medium pump 113 based on signals from the temperature detection part 127 and input part 131.

For example, when the signal in accordance with the drive start operation of the reactor 100 is input from the input part 131, the control part 123 outputs a control signal to the discharge control part 125 so as to start the supply of the electric power to the conductor terminal 117, while outputs the control signal to the discharge control part 125 so as to suspend the supply of the electric power to the conductor terminal 117 when a signal in accordance with the drive suspension operation of the reactor 100 is input from the input part 131.

Further, for example, when judging that the temperature detected by the temperature detection part 127 does not reach a predetermined target temperature set as a temperature high enough to efficiently generate a surface discharge by the dielectric structure 1, the control part 123 outputs a control signal to the discharge control part 125 so as to increase the electric power supplied to the first assembly 6 more than the electric power supplied at the time of normal running, while outputs a control signal to the discharge control part 125 so as to maintain the electric power supplied to the first assembly 6 at the level of supply at the time of normal running where the dielectric structure 1 reaches the target temperature.

Further, for example, when judging that the temperature detected by the temperature detection part 127 does not reach the predetermined target temperature set as the temperature high enough to efficiently generate plasma by the dielectric structure 1, the control part 123 supplies the electric power to the heater 116 or outputs a control signal to the heater drive part 129 so as to increase the electric power which is supplied to the heater 116. Then, when the dielectric structure 1 reaches the target temperature, it outputs a control signal to the heater drive part 129 so as to reduce the electric power supplied to the heater 116 or suspend the supply of electric power to the heater 116.

Further, for example, the control part 123 compares the temperature detected by the temperature detection part 127 with the temperature at which the dielectric structure 1 can efficiently generate a surface discharge or the predetermined target temperature set as the temperature at which the dielectric structure 1 or reactor body 101 is safely driven and outputs a control signal to the cooling medium pump 113 so as to raise the flow rate of the cooling medium when the detected temperature is higher than the target temperature or makes the flow rate of the cooling medium lower when the former is lower than the latter.

Further, for example, when judging that the temperature detected by the temperature detection part 127 does not reach the predetermined target temperature set as the temperature at which the dielectric structure 1 can efficiently generate a surface discharge, the control part 123 outputs a control signal to the treated fluid pump 109 so as to make the flow rate of the treated fluid lower. When judging that the detected temperature has reached the predetermined target temperature, the control part 123 outputs a control signal so as to make the flow rate of the treated fluid higher.

Further, for example, the control part 123 compares the temperature detected by the temperature detection part 127 with the predetermined temperature range set as the temperature at which the dielectric structure 1 and reactor body 101 are safely driven and outputs a control signal to a report part such as a not shown display device or speaker to report the occurrence of an abnormality where the detected temperature exceeds the set temperature range.

According to the above sixth embodiment, the reactor 100 is provided with the dielectric structure 1 of the first embodiment, the feed pipe 105 supplying the treated fluid to the discharge space 5, and the exhaust pipe 107 for exhausting the reacted fluid obtained by chemically changing the treated fluid by plasma generation in the discharge space 5. Therefore, in the same way as the first embodiment, the effects of improvement of durability of the dielectric structure 1 and reduction of size of the dielectric structure 1 are obtained. Consequently, the effects of improvement of durability and reduction of size of the reactor 100 are obtained.

Note that, in the present invention, various modifications are possible within a range not out of the gist of the present invention. For example, in the above explanation, reforming the exhaust gas of a diesel engine etc. used in an automobile, ship, electric generator, or the like was explained, but the present invention may be applied to a dielectric structure used for other purposes and a reactor of the same. For example, it can be applied to a dielectric structure mounted in an air cleaner used for elimination of odors, breakdown of dioxins, breakdown of pollen, and so on, in a plasma etching system, in a thin film forming system, etc. and a reactor of the same. Further, it is possible to apply the present invention to a dielectric structure and reactor for reacting or decomposing a fluid passing through the discharge space by surface discharge.

The invention claimed is:

1. A plasma generator, comprising:
a first member containing a dielectric material; and
an electrode group, wherein
the electrode group includes a plurality of electrodes and comprises a first assembly including a portion of the plurality of electrodes and a second assembly including a portion of the plurality of electrodes,
the first assembly generates plasma in a first space contacting the first member in accordance with an AC voltage,
the second assembly generates an electric field in a second space contacting the first member and communicating with the first space in accordance with a DC voltage, and
at least one electrode of the first assembly and at least one electrode of the second assembly are provided at a surface of or in an internal portion of the first member.

2. The plasma generator according to claim 1, wherein one or more electrodes of a portion of the first assembly and one or more electrodes of a portion of the second assembly are the same electrodes.

3. The plasma generator according to claim 1, wherein the first assembly and the second assembly are provided in the internal portion or at the surface of the first member.

4. The plasma generator according to claim 1, wherein electrodes of the first assembly and the second assembly are arranged in columnar shapes.

5. The plasma generator according to claim 4, wherein the first member has a first surface and a second surface on a back side thereof and has a first through hole penetrating between the first and the second surface,
the electrodes of the first assembly and the second assembly, between the first surface and the second surface, are arranged in a line in an order of the first assembly and the second assembly along a penetration direction of the first through hole, and each has a through hole through which the first through hole passes, and
the first space and the second space are located in the first through hole.

6. The plasma generator according to claim 1, wherein a first electrode included in the one or more electrodes of the portion of the first assembly has a plurality of first partial electrodes which are arranged along the first space and are electrically connected to each other, a second electrode included in the one or more electrodes of the portion of the first assembly has a plurality of second partial electrodes which are arranged along the first space and are electrically connected to each other, and the second partial electrodes are located between the first partial electrodes.

7. The plasma generator according to claim 1, wherein the first space is provided between the one or more electrodes of the portion of the first assembly and the one or more electrodes of another portion of the first assembly.

8. The plasma generator according to claim 1, further comprising a second member which includes a dielectric material and is configured to face the first member,
wherein
the electrode group further comprises a third assembly including a portion of the plurality of electrodes,
at least one or more electrodes of a portion of the third assembly is provided at a surface or in a internal portion of the second member, and
the first space is located, between the first member and the second member.

9. The plasma generator according to claim 7, wherein the first space is smaller than the second space in cross-sectional area of the cross-section vertical to an arrangement direction from the first space to the second space.

10. A discharge device, comprising:
the plasma generator according to claim 1;
an AC power supply connected to the first assembly; and
a DC power supply connected to the second assembly.

11. A discharge device, comprising:
the plasma generator according to claim 1;
a first AC power supply connected to the first assembly;
a DC power supply selectively connected to the second assembly;
a second AC power supply selectively connected to the second assembly; and
a switch configured to switch a power supply to be connected to the second assembly between the DC power supply and the second AC power supply.

12. A reactor, comprising:
the discharge device according to claim 10; and
a fluid supply source configured to supply a fluid into the first space and the second space from a side of the first space.

13. The plasma generator according to claim 6, wherein:
the first electrode and the second electrode generate plasma in the first space in accordance with the AC voltage,
the first partial electrodes are arranged in a first direction from the first space to the second space and in a second direction crossing the first direction.

14. A plasma generator, comprising:
a first member comprising:
 a dielectric material;
 a first surface:
 a second surface on a back side thereof: and
 a first through hole penetrating between the first surface and the second surface;
an electrode group in the first member, comprising a first electrode, a second electrode and a third electrode, the first to third electrodes are arranged along a direction of the first through hole in an order of the first to third electrodes, and each comprising a through hole through which the first through hole passes;
a first space located in the first through hole, the first space extending from the first electrode to the second electrode: and
a second space located in the first through hole, the second space extending from the second electrode to the third electrode, the second space located adjacent to the first space, wherein the first electrode and the second electrode generate plasma in the first space in accordance with an AC voltage, the second electrode and the third electrode generate an electric field in the second space in accordance with an DC voltage.

15. A plasma generator, comprising:
a first base comprising:
   a first electrode; and
   a second electrode located adjacent to the first electrode;
a second base comprising a surface facing a surface of the first base through a through hole,
the second base comprising:
   a third electrode facing the first electrode through the through hole; and
   a fourth electrode located adjacent to the third electrode, the fourth electrode facing the second electrode through the through hole;
a first space located in the through hole, the first space located between the first electrode and the third electrode: and
a second space located in the first through hole, the second space located between the second electrode and the fourth electrode, the second space located adjacent to the first space, wherein the first electrode and the third electrode generate plasma in the first space in accordance with an AC voltage, the second electrode and the fourth electrode generate an electric field in the second space in accordance with an DC voltage.

16. The plasma generator according to claim 1, wherein the second assembly generates the electric field in the second space in accordance with the DC voltage while the AC voltage is applied.

17. The plasma generator according to claim 14, wherein the second electrode and the third electrode generate the electric field in the second space in accordance with the DC voltage while the AC voltage is applied.

18. The plasma generator according to claim 15, wherein the second electrode and the fourth electrode generate the electric field in the second space in accordance with the DC voltage while the AC voltage is applied.

* * * * *